(12) United States Patent
Shimada et al.

(10) Patent No.: US 6,316,577 B1
(45) Date of Patent: Nov. 13, 2001

(54) ELECTROPHOTOGRAPHIC PHOTOCONDUCTOR AND AROMATIC POLYCARBONATE RESIN FOR USE THEREIN

(75) Inventors: Tomoyuki Shimada, Shizuoka-ken; Masaomi Sasaki; Masafumi Ohta, both of Susono; Akihiro Imai; Mitsutoshi Anzai, both of Kawasaki; Tamotsu Aruga, Mishima; Kazukiyo Nagai, Numazu; Katsuhiro Morooka, Kawasaki, all of (JP)

(73) Assignee: Hodogaya Chemical Co., Ltd., Kanagawa-ken (JP); a part interest ( * ) Notice: Subject to any disclaimer, the term of this patent is extended or adjusted under 35 U.S.C. 154(b) by 0 days.

(21) Appl. No.: 09/480,636

(22) Filed: Jan. 10, 2000

Related U.S. Application Data

(62) Division of application No. 08/671,722, filed on Jun. 28, 1996.

(30) Foreign Application Priority Data

| Jun. 30, 1995 | (JP) | 7-165977 |
| Jul. 21, 1995 | (JP) | 7-207817 |
| Aug. 4, 1995 | (JP) | 7-199943 |
| Aug. 31, 1995 | (JP) | 7-223641 |
| Jun. 26, 1996 | (JP) | 8-166238 |
| Jun. 27, 1996 | (JP) | 8-167566 |
| Jun. 28, 1996 | (JP) | 8-169774 |

(51) Int. Cl.$^7$ .................................................. C08G 64/00
(52) U.S. Cl. ................................................ 528/196; 528/198
(58) Field of Search ................................. 528/196, 198

(56) References Cited

U.S. PATENT DOCUMENTS

| 4,801,517 | * | 1/1989 | Frechet et al. | 430/59 |
| 4,806,443 | * | 2/1989 | Yanus et al. | 430/56 |
| 4,806,444 | * | 2/1989 | Yanus et al. | 430/56 |
| 4,937,165 | * | 6/1990 | Ong et al. | 430/59 |
| 4,959,288 | * | 9/1990 | Ong et al. | 430/59 |
| 5,030,532 | * | 7/1991 | Limburg et al. | 430/56 |
| 5,034,296 | * | 7/1991 | Ong et al. | 430/59 |

* cited by examiner

Primary Examiner—Terressa Boykin

(57) ABSTRACT

An electrophotographic photoconductor includes an electro-conductive support, and a photoconductive layer formed thereon containing as an effective component an aromatic polycarbonate resin having a structural unit of formula (I), two structural units of formulae (I) and (II), or a repeat unit of formula (III):

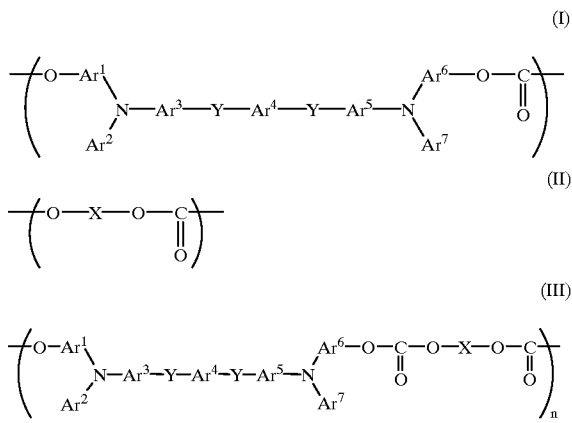

wherein $Ar^1$ to $Ar^7$, Y, X, and n are as specified in the specification.

22 Claims, 20 Drawing Sheets

F I G. 1
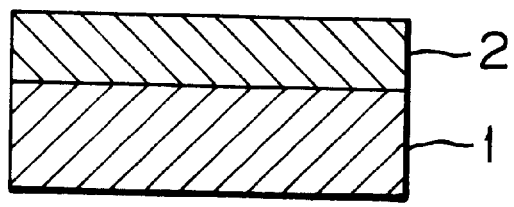
F I G. 2
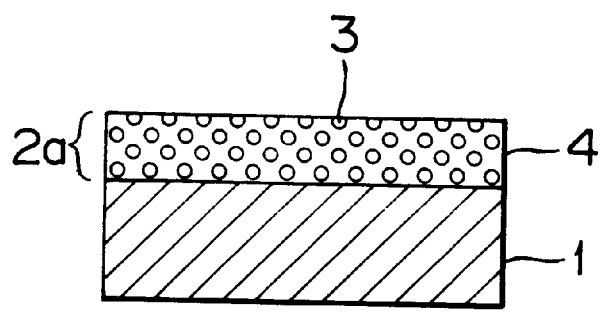
F I G. 3
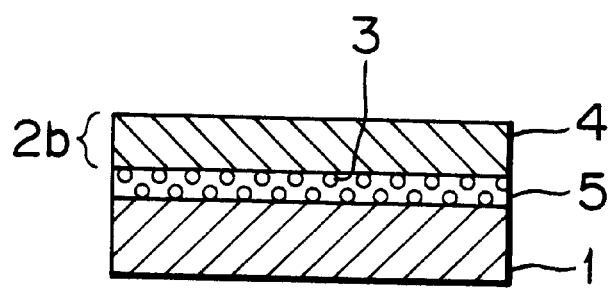

ELECTROPHOTOGRAPHIC PHOTOCONDUCTOR AND AROMATIC POLYCARBONATE RESIN FOR USE THEREIN

This application is a Division of application Ser. No. 08/671,722 Filed on Jun. 28, 1996 now U.S. Pat. No. 6,027,846.

BACKGROUND OF THE INVENTION

1. Field of the Invention

The present invention relates to an electrophotographic photoconductor comprising an electroconductive support, and a photoconductive layer formed thereon, comprising an aromatic polycarbonate resin as an effective component. In addition, the present invention also relates to the above-mentioned aromatic polycarbonate resin with charge transporting properties.

2. Discussion of Background

Recently organic photoconductors are used in many copying machines and printers. These organic photoconductors have a layered structure comprising a charge generation layer (CGL) and a charge transport layer (CTL) which are successively overlaid on an electroconductive support. The charge transport layer (CTL) is a film-shaped layer comprising a binder resin and a low-molecular-weight charge transport material (CTM) dissolved therein. The addition of such a low-molecular-weight charge transport material (CTM) to the binder resin lowers the intrinsic mechanical strength of the binder resin, so that the CTL film is fragile and has a low tensile strength. Such lowering of the mechanical strength of the CTL causes the wearing of the photoconductor or forms scratches and cracks in the surface of the photoconductor.

Although some vinyl polymers such as polyvinyl anthracene, polyvinyl pyrene and poly-N-vinylcarbazole have been studied as high-molecular-weight photoconductive materials for forming a charge transporting complex for use in the conventional organic photoconductor, such polymers are not satisfactory from the viewpoint of photosensitivity.

In addition, high-molecular-weight materials having charge transporting properties have been also studied to eliminate the shortcomings of the above-mentioned layered photoconductor. For instance, there are proposed an acrylic resin having a triphenylamine structure as reported by M. Stolka et al., in "J. Polym. Sci., vol 21, 969 (1983)"; a vinyl polymer having a hydrazone structure as described in "Japan Hard Copy '89 p. 67"; and polycarbonate resins having a triarylamine structure as disclosed in U.S. Pat. Nos. 4,801, 517, 4,806,443, 4,806,444, 4,937,165, 4,959,288, 5,030,532, 5,034,296, and 5,080,989, and Japanese Laid-Open Patent applications Nos. 64-9964, 3-221522, 2-304456, 4-11627, 4-175337, 4-18371, 4-31404, and 4-133065. However, any materials have not yet been put to practical use.

According to the report of "Physical Review B46 6705 (1992)" by M. A. Abkowitz et al., it is confirmed that the drift mobility of a high-molecular weight charge transporting material is lower than that of a low-molecular weight material by one figure. This report is based on the comparison between the photoconductor comprising a low-molecular weight tetraarylbenzidine derivative dispersed in the photoconductive layer and the one comprising a high-molecular polycarbonate having a tetraarybenzidine structure in its molecule. The reason for this has not been clarified, but it is suggested that the photoconductor employing the high-molecular weight charge transporting material produces poor results in terms of the photosensitivity and the residual potential although the mechanical strength of the photoconductor is improved.

Coventionally known representative aromatic polycarbonates are obtained by allowing 2,2-bis(4-hydroxyphenyl) propane (hereinafter referred to as bisphenol A) to react with a carbonate precursor material such as phosgene or diphenylcarbonate. Such polycarbonates made from bisphenol A are used in many fields because of excellent characteristics, such as high transparency, high heat resistance, high dimensional accuracy, and high mechanical strength.

For example, this kind of polycarbonate resin is intensively studied as a binder resin for use in an organic photoconductor in the field of electrophotography. A variety of aromatic polycarbonate resins have been proposed as the binder resins for use in the charge transport layer of the layered photoconductor.

As previously mentioned, however, the mechanical strength of the aforementioned aromatic polycarbonate resin is decreased by the addition of the low-molecular-weight charge transporting material in the charge transport layer of the layered electrophotographic photoconductor.

SUMMARY OF THE INVENTION

It is therefore a first object of the present invention to provide an electrophotographic photoconductor free from the conventional shortcomings, which can show high photosensitivity and high durability.

A second object of the present invention is to provide an aromatic polycarbonate resin that is remarkably useful as a high-molecular-weight charge transport material for use in an organic electrophotographic photoconductor.

The above-mentioned first object of the present invention can be achieved by an electrophotographic photoconductor comprising an electroconductive support, and a photoconductive layer formed thereon comprising as an effective component an aromatic polycarbonate resin comprising a structural unit of formula (I):

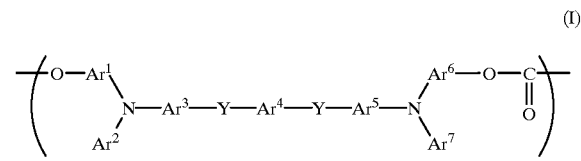

wherein $Ar^1$, $Ar^3$, $Ar^4$, $Ar^5$ and $Ar^6$ each may be the same or different, and is an arylene group which may have a substituent; $Ar^2$ and $Ar^7$ each may be the same or different, and is an aryl group which may have a substituent; and Y is ethylene group or vinylene group.

The first object of the present invention can also be achieved by an electrophotographic photoconductor comprising an electroconductive support, and a photoconductive layer formed thereon comprising as an effective component an aromatic polycarbonate resin comprising a structural unit of formula (I) and a structural unit of formula (II):

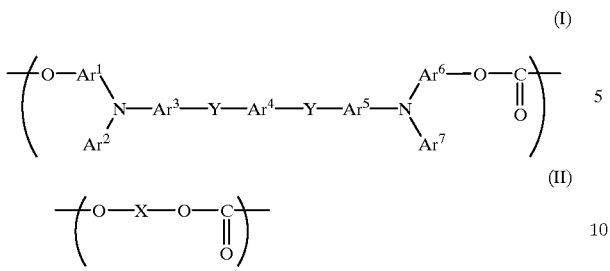

wherein $Ar^1$, $Ar^3$, $Ar^4$, $Ar^5$ and $Ar^6$ each may be the same or different, and is an arylene group which may have a substituent; $Ar^2$ and $Ar^7$ each may be the same or different, and is an aryl group which may have a substituent; Y is ethylene group or vinylene group; and X is a bivalent aliphatic group, a bivalent cyclic aliphatic group, a bivalent aromatic group, a bivalent group prepared by bonding any of the above-mentioned bivalent groups,

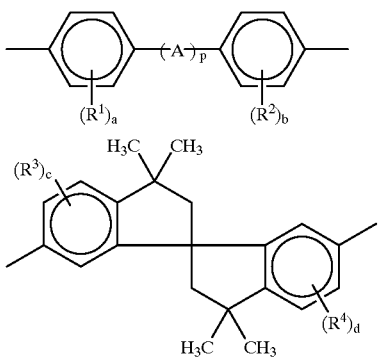

in which $R^1$, $R^2$, $R^3$ and $R^4$ each is an alkyl group which may have a substituent, an aryl group which may have a substituent or a halogen atom; a and b each is an integer of 0 to 4; c and d each is an integer of 0 to 3; and p is an integer of 0 or 1, and when p=1, A is a straight-chain alkylene group having 2 to 12 carbon atoms, —O—, —S—, —SO—, —SO$_2$—, —CO—,

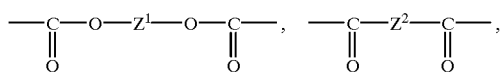

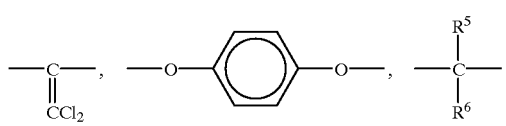

in which $Z^1$ and $Z^2$ each is a bivalent aliphatic group which may have a substituent, or an arylene group which may have a substituent; $R^5$, $R^6$, $R^7$, $R^8$, $R^9$, $R^{10}$ and $R^{11}$ each is a hydrogen atom, a halogen atom, an alkyl group having 1 to 5 carbon atoms which may have a substituent, an alkoxyl group having 1 to 5 carbon atoms which may have a substituent, or an aryl group which may have a substituent, and $R^5$ and $R^6$ may form a carbocyclic ring of heterocyclic ring having 5 to 12 carbon atoms, or $R^5$ and $R^6$ may form a carbocyclic ring or heterocyclic ring in combination with $R^1$ and $R^2$; q is an integer of 0 or 1, and when q=1, $R^{12}$ is an alkylene group having 1 to 4 carbon atoms; r is an integer of 0 or 1, and when r=1, $R^{13}$ is an alkylene group having 1 to 4 carbon atoms; $R^{14}$ and $R^{15}$ each is an alkyl group having 1 to 5 carbon atoms which may have a substituent or an aryl group which may have a substituent; e is an integer of 0 to 4; f is an integar of 0 to 20; and g is an integer of 0 to 2,000.

The above-mentioned first object of the present invention can also be achieved by an electrophotographic photoconductor comprising an electroconductive support, and a photoconductive layer formed thereon comprising as an effective component an aromatic polycarbonate resin comprising a repeat unit of formula (III):

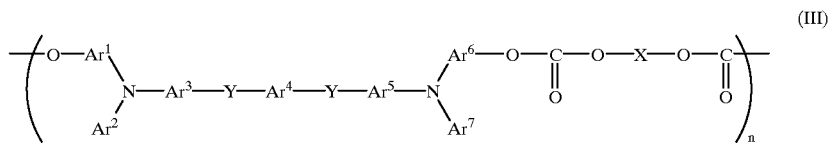

where $Ar^1$ to $Ar^7$, X and Y are the same as those previously defined; and n is an integer of 2 to 5,000.

The second object of the present invention can be achieved by an aromatic polycarbonate resin comprising a structural unit of formula (I)-1:

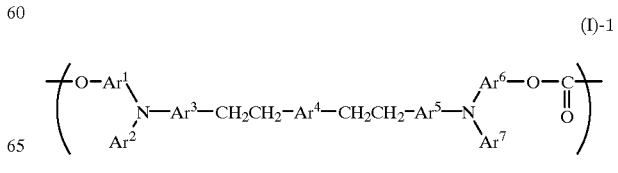

wherein $Ar^1$, $Ar^3$, $Ar^4$, $Ar^5$ and $Ar^6$ each may be the same or different, and is an arylene group which may have a substituent; and $Ar^2$ and $Ar^7$ each may be the same or different, and is an aryl group which may have a substituent.

The second object of the present invention can also be achieved by an aromatic polycarbonate resin comprising the previously mentioned structural unit of formula (I)-1 and structural unit of formula (II).

The above-mentioned second object of the present invention can also be achieved by an aromatic polycarbonate resin comprising a repeat unit of formula (III)-1:

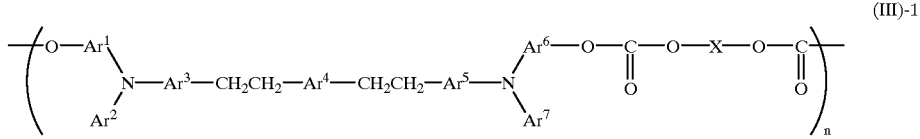

(III)-1 wherein $Ar^1$ to $Ar^7$, and X are the same as those previously defined; and n is an integer of 2 to 5,000.

Alternatively, the second object of the present invention can be achieved by an aromatic polycarbonate resin comprising a structural unit of formula (I)-2:

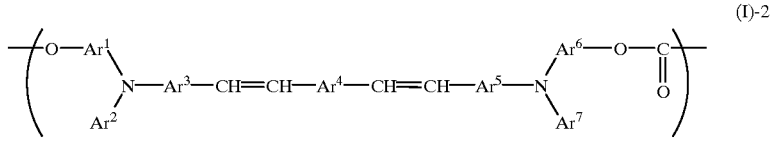

(I)-2 wherein $Ar^1$, $Ar^3$, $Ar^4$, $Ar^5$ and $Ar^6$ each may be the same or different, and is an arylene group which may have a substituent; and $Ar^2$ and $Ar^7$ each may be the same or different, and is an aryl group which may have a substituent.

The second object of the present invention can also be achieved by an aromatic polycarbonate resin comprising the previously mentioned structural unit of formula (I)-2 and structural unit of formula (II).

The above-mentioned second object of the present invention can also be achieved by an aromatic polycarbonate resin comprising a repeat unit of formula (III)-2:

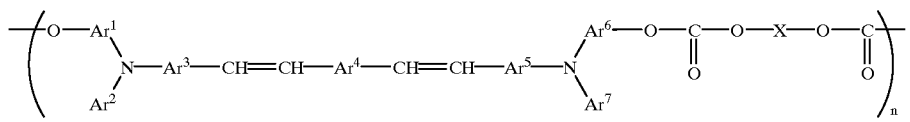

(III)-2 wherein $Ar^1$ to $Ar^7$, and X are the same as those previously defined; and n is an integer of 2 to 5,000.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic cross-sectional view of a first example of an electrophotographic photoconductor according to the present invention.

FIG. 2 is a schematic cross-sectional view of a second example of an electrophotographic photoconductor according to the present invention.

FIG. 3 is a schematic cross-sectional view of a third example of an electrophotographic photoconductor according to the present invention.

DESCRIPTION OF THE PREFERRED EMBODIMENTS

Figure 4:
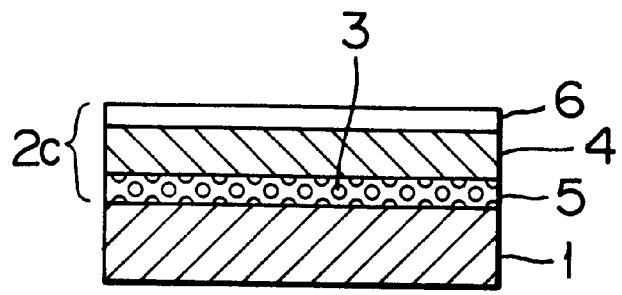
FIG. 4 is a schematic cross-sectional view of a fourth example of an electrophotographic photoconductor according to the present invention.

An aromatic polycarbonate resin for use in the photoconductive layer of the electrophotographic photoconductor according to the present invention comprises at least a structural unit represented by formula (I) or (IV) which is provided with charge transporting properties, or consists essentially of a structural unit of formula (I) or (IV).

Alternatively, the aromatic polycarbonate resin according to the present invention is a copolymer resin having a structural unit of formula (I) or (IV) with the charge transporting properties, and a structural unit of formula (II) capable of imparting other properties than the charge transporting properties. In addition, the aromatic polycarbonate resin of the present invention is an alternating copolymer resin comprising a repeat unit of formula (III) or (V) having the charge transporting properties.

The aforementioned structural unit of formula (IV) for use in the polycarbonate resin of the present invention is as follows:

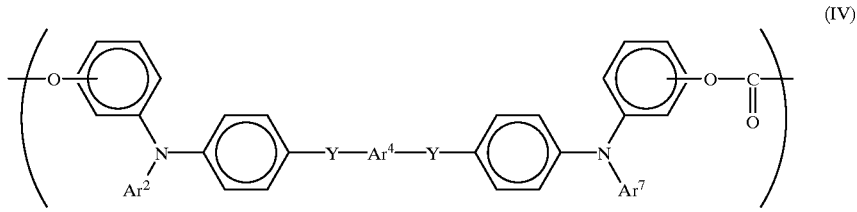
(IV)

wherein $Ar^2$, $Ar^4$, $Ar^7$, and Y are the same as those as previously defined.

The aforementioned repeat unit of formula (V) for use in the polycarbonate resin of the present invention is as follows:

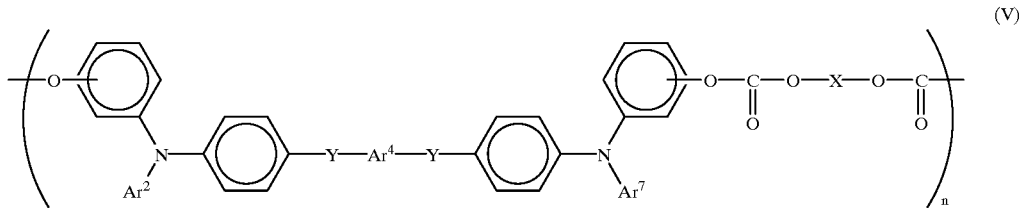
(V)

wherein $Ar^2$, $Ar^4$, $Ar^7$, X and Y are the same as those as previously defined; and n is an integer of 2 to 5000.

Those aromatic polycarbonate resins have charge transporting properties and high mechanical strength, so that the electrical, optical and mechanical characteristics required for the photoconductive layer of the electrophotographic photoconductor are satisfied. Consequently, the photoconductor of the present invention can exhibit high photosensitivity and excellent durability.

The above-mentioned aromatic polycarbonate resins, which are novel compounds, can be obtained by the method of synthesizing a conventional polycarbonate resin, that is, polymerization of a bisphenol and a carbonic acid derivative.

To be more specific, the aromatic polycarbonate resin comprising the structural unit of formula (I) according to the present invention can be produced by the ester interchange between a diol having the charge transporting properties, represented by the following formula (VI) or (VII) and a bisarylcarbonate compound, or by the polymerization of the diol of formula (VI) or (VII) with a halogenated carbonyl compound such as a phosgene in accordance with solution polymerization or interfacial polymerization, or by the polymerization of the diol with a chloroformate such as bischloroformate derived from the diol:

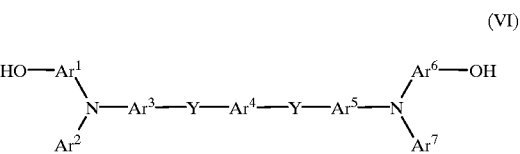
(VI)

-continued
(VII)

HO—⟨⟩—N(Ar²)—⟨⟩—Y—Ar⁴—Y—⟨⟩—N(Ar⁷)—⟨⟩—OH wherein $Ar^1$ to $Ar^7$ and Y are the same as those previously defined in formulae (I) and (II).

In addition to the phosgene, trichloromethyl chloroformate that is a dimer of phosgene, and bis(trichloromethyl) carbonate that is a trimer of phosgene are usable as the halogenated carbonyl compounds in the above-mentioned polymerization. Further, halogenated carbonyl compounds derived from other halogen atoms than chlorine, for example, carbonyl bromide, carbonyl iodide and carbonyl fluoride are also employed.

Those conventional synthesis methods are described in the reference, such as "Handbook of Polycarbonate Resin" (issued by The Nikkan Kogyo Shimbun Ltd.).

When a diol of the following formula (VIII) is employed in combination with the diol of formula (VI) or (VII) with the charge transporting properties in the course of the polymerization, there can be produced a copolymer polycarbonate resin with improved mechanical characteristics. In this case, a plurality of kinds of diol compounds represented by formula (VIII) may be employed.

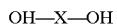 (VIII)

wherein X is the same as that previously defined in formula (II).

In such a synthesis method, the ratio of the diol represented by formula (VI) or (VII) which is provided with the charge transporting properties to the diol of formula (VIII) can be selected within a wide range in light of the desired characteristics of the obtained aromatic polycarbonate resin. Further, a variety of copolymers, such as a random copolymer, an alternating copolymer, a block copolymer, a random alternating copolymer, or a random block copolymer can be obtained according to the polymerization procedure.

For instance, a random copolymer comprising the structural unit of formula (I) or (IV) and the structural unit of formula (II) can be obtained when the diol of formula (VI) or (VII) with the charge transporting properties and the diol of formula (VIII) are uniformly mixed prior to the condensation reaction with the phosgene. A random block copolymer can be obtained by the addition of a plurality of diols in the course of the reaction. Further, an alternating copolymer comprising a repeat unit of formula (III) or (V) can be produced by carrying out the condensation reaction of a bischloroformate compound derived from the diol of formula (VIII) with the diol having the charge transporting properties, represented by formula (VI) or (VII). In such a case, the above-mentioned alternating copolymer comprising a repeat unit of formula (III) or (V) can be similarly produced by carrying out the condensation reaction of a bischloroformate compound derived from the diol of formula (VI) or (VII) with the diol of formula (VIII). Further, a random alternating copolymer can be produced by employing a plurality of bischloroformate compounds and diol compounds in the course of the aforementioned condensation reaction between the bischloroformate compound and the diol.

The interfacial polymerization is carried out at the interface between two phased of an alkaline aqueous solution of a diol and an organic solvent which is substantially incompatible with water and capable of dissolving a polycarbonate therein in the presence of the carbonic acid derivative and a catalyst. In this case, a polycarbonate resin with a narrow molecular-weight distribution can be speedily obtained by emulsifying the reactive medium through the high-speed stirring operation or addition of an emulsifying material.

As a base for preparing the alkaline aqueous solution, there can be employed an alkali metal and an alkaline earth metal. Specific examples of the base include hydroxides such as sodium hydroxide, potassium hydroxide and calcium hydroxide; and carbonates such as sodium carbonate, potassium carbonate, calcium carbonate and sodium hydrogencarbonate. Those bases may be used alone or in combination. Of those bases, sodium hydroxide and potassium hydroxide are preferable. In addition, distilled water or ion exchange water are preferably employed for the preparation of the above-mentioned alkaline aqueous solution.

Examples of the organic solvent used in the above-mentioned interfacial polymerization are aliphatic halogenated hydrocarbon solvents such as dichloromethane, 1,2-dichloroethane, 1,2-dichloroethylene, trichloroethane, tetrachloroethane and dichloropropane; aromatic halogenated hydrocarbon solvents such as chlorobenzene and dichlorobenzene; and mixed solvents thereof. Further, aromatic hydrocarbon solvents such as toluene, xylene and ethylbenzene, or aliphatic hydrocarbon solvents such as hexane and cyclohexane may be added to the above-mentioned solvents. Of those organic solvents, dichloromethane and chlorobenzene are preferable in the present invention.

Examples of the catalyst used in the preparation of the polycarbonate resin are a tertiary amine, a quaternary ammonium salt, a tertiary phosphine, a quaternary phosphonium salt, a nitrogen-containing heterocyclic compound and salts thereof, an iminoether and salts thereof, and a compound having amide group.

Specific examples of such a catalyst include trimethylamine, triethylamine, tri-n-propylamine, tri-n-hexylamine, N,N,N,',N'-tetramethyl-1,4-tetramethylenediamine, 4-pyrrolidinopyridine, N,N'-dimethylpiperazine, N-ethylpiperidene, benzyltrimethylammonium chloride, benzltriethylammonium chloride, tetramethylammonium chloride, tetraethylammonium bromide, phenyltriethylammonium chloride, triethylphosphine, triphenylphosphine, diphenylbutylphosphine, tetra(hydroxymethyl) phosphonium chloride, benzyltriethylphosphonium chloride, benzyltriphenylphosphonium chloride, 4-methylpyridine, 1-methylimidazole, 1,2-dimethylimidazole, 3-methylpyridazine, 4,6-dimethylpyrimidine, 1-cyclohexyl-3,5-dimethylpyrazole, and 2,3,5,6,-tetramethylpyrazine.

Those catalysts may be used alone or in combination. Of the above-mentioned catalysts, the tertiary amine, in particular, a tertiary amine having 3 to 30 carbon atoms, such as triethylamine is preferably employed in the present invention. Before and/or after the carbonic acid derivatives such as phosgene and bischloroformate are placed in the reaction system, any of the above-mentioned catalysts may be added thereto.

To control the molecular weight of the obtained polycarbonate resin, it is desirable to employ a terminator as a molecular weight modifier for any of the above-mentioned polymerization reactions. Consequently, a substituent derived from the terminator may be bonded to the end of the molecule of the obtained polycarbonate resin.

As the terminator for use in the present invention, a monovalent aromatic hydroxy compound and haloformate derivatives thereof, and a monovalent carboxylic acid and halide derivatives thereof can be used alone or in combination.

Specific examples of the monovalent aromatic hydroxy compound are phenols such as phenol, p-cresol, o-ethylphenol, p-ethylphenol, p-isopropylphenol, p-tert-butylphenol, p-cumylphenol, p-cyclohexylphenol, p-octylphenol, p-nonylphenol, 2,4-xylenol, p-methoxyphenol, p-hexyloxyphenol, p-decyloxyphenol, o-chlorophenol, m-chlorophenol, p-chlorophenol, p-bromophenol, pentabromophenol, pentachlorophenol, p-phenylphenol, p- isopropenylphenol, 2,4-bis(1-methyl-1- phenylethyl)phenol, β-naphthol, α-naphthol, p-(2,4,4-trimethylchromanyl)-phenol, and 2-(4-methoxyphenyl)-2-(4-hydroxyphenyl)-propane. In addition, alkali metal salts and alkaline earth metal salts of the above phenols can also be employed.

Specific examples of the monovalent carboxylic acid are aliphatic acids such as acetic acid, propionic acid, butyric acid, valeric acid, caproic acid, heptanic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 3,5-dimethylcaproic acid and phenoxyacetic acid; and benzoic acids such as p-methylbenzoic acid, p-tert-butylbenzoic acid, p-butoxybenzoic acid, p-octyloxybenzoic acid, p-phenylbenzoic acid, p-benzylbenzoic acid and p-chlorobenzoic acid. In addition, alkali metal salts and alkaline earth metal salts of the above-mentioned aliphatic acids and benzoic acids can also be employed.

Of those terminators, the monovalent aromatic hydroxy compound, such as phenol, p-tert-butylphenol, or p-cumylphenol is preferable.

It is preferable that the aromatic polycarbonate resin for use in the photoconductor of the present invention have a number-average molecular weight of 1,000 to 500,000, more preferably in the range of 10,000 to 200,000 when expressed by the styrene-reduced value.

Furthermore, a branching agent may be added in a small amount during the polymerization in order to improve the mechanical properties of the obtained polycarbonate resin. Any compounds having three or more reactive groups, which may be the same or different, selected from the group consisting of an aromatic hydroxyl group, a haloformate group, a carboxylic acid group, a carboxylic acid halide group, and an active halogen atom can be used as the branching agent for use in the present invention.

Specific examples of the branching agent for use in the present invention are as follows:
phloroglucinol,
4,6-dimethyl-2,4,6-tris(4-hydroxyphenyl)-2-heptene,
4,6-dimethyl-2,4,6-tris(4-hydroxyphenyl)heptane,
1,3,5-tris(4-hydroxyphenyl)benzene,
1,1,1-tris(4-hydroxyphenyl)ethane,
1,1,2-tris(4-hydroxyphenyl)propane,
α,α,α'-tris(4-hydroxyphenyl)-1-ethyl-4-isopropylbenzene,
2,4-bis[α-methyl-α-(4-hydroxyphenyl)ethyl]phenol,
2-(4-hydroxyphenyl)-2-(2,4-dihydroxyphenyl)-propane,
tris(4-hydroxyphenyl)phosphine,
1,1,4,4-tetrakis(4-hydroxyphenyl)cyclohexane,
2,2-bis[4,4-bis(4-hydroxyphenyl)cyclohexyl]-propane,
α,α,α',α'-tetrakis(4-hydroxyphenyl)-1,4-diethylbenzene,
2,2,5,5-tetrakis(4-hydroxyphenyl)hexane,
1,1,2,3-tetrakis(4-hydroxyphenyl)propane,
1,4-bis(4,4'-dihydroxytriphenylmethyl)benzene,
3,3',5,5'-tetrahydroxydiphenyl ether,
3,5-dihydroxybenzoic acid,
3,5-bis(chlorocarbonyloxy)benzoic acid,
4-hydroxyisophthalic acid,
4-chlorocarbonyloxyisophthalic acid,
5-hydroxyphthalic acid,
5-chlorocarbonyloxyphthalic acid,
trimesic trichloride, and
cyanuric chloride.

Those branching agents may be used alone or in combination.

To prevent the oxidation of the diol in the alkaline aqueous solution, an antioxidant such as hydrosulfite may be used in the polymerization reaction.

The interfacial polymerization reaction is generally carried out at temperature in the range of 0 to 40° C., and terminated in several minutes to 5 hours. It is desirable to maintain the reaction system to pH 10 or more.

In the case of the solution polymerization, the diol is dissolved in a proper solvent to prepare a solution of the diol, and a deacidifying agent is added thereto. Then, the bischloroformate compound or the phosgene is added to the above prepared mixture. In this case, tertiary amine compounds such as trimethylamine, triethylamine and tripropylamine, and pyridine can be used as the deacidifying agents. Examples of the solvent for use in the above-mentioned polymerization reaction are halogenated hydrocarbon solvents such as dichloromethane, dichloroethane, trichloroethane, tetrachloroethane, trichloroethylene, and chloroform; cyclic ethers such as tetrahydrofuran and dioxane; and pyridine. In addition, the same molecular weight modifier and branching agent as those employed in the interfacial polymerization can be used. The reaction temperature is generally in the range of 0 to 40° C. In this case, the polymerization is generally terminated in several minutes to 5 hours.

In the case where the polycarbonate resin is synthesized by the ester interchange method, the diol and the bisarylcarbonate are mixed in the presence of an inert gas, and the reaction is carried out at a temperature in the range of 120 to 350° C. under reduced pressure. The pressure in the reaction system is stepwise reduced up to 1 mmHg or less in order to distill away the phenols generated during the reaction from the reaction system. The reaction is commonly terminated in about one to 4 hours. When necessary, the molecular weight modifier and the antioxidant may be added to the reaction system. As the bisarylcarbonate compound, diphenyl carbonate, di-p-tolyl carbonate, phenyl-p-tolyl carbonate, di-p-chlorophenyl carbonate and dinaphthyl carbonate can be employed.

The polycarbonate resin thus synthesized is purified by removing the catalyst and the antioxidant used in the polymerization; unreacted diol and terminator; and impurities such as an inorganic salt generated during the polymerization, and then subjected to the preparation of the photoconductive layer of the electrophotographic photoconductor according to the present invention. The previously mentioned "Handbook of Polycarbonate Resin" (issued by Nikkan Kogyo Shimbun Ltd.) can be referred to for such a procedure for purifying the polycarbonate resin.

To the aromatic polycarbonate resin produced by the previously mentioned methods, various additives such as an antioxidant, a light stabilizer, a thermal stabilizer, a lubricant and a plasticizer can be added when necessary.

The diol represented by the formula (VI), which is an intermediate for preparation of the aromatic polycarbonate resin according to the present invention, will now be explained in detail.

In the present invention, there can be employed the following dihydroxyl-group-containing diamine compound represented by formula (1), which is a novel compound, as the diol of formula (VI):

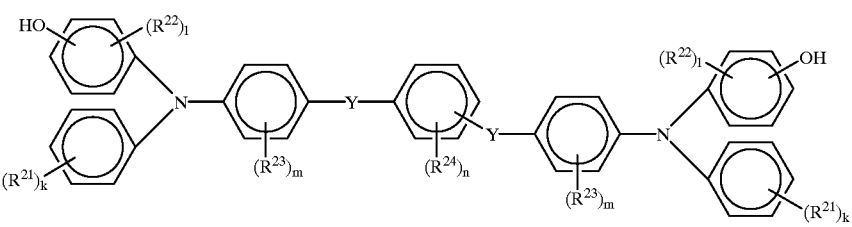

(1)

wherein $R^{21}$, $R^{22}$, $R^{23}$ and $R^{24}$ each is an alkyl group which may have a substituent, a halogen atom, or an aryl group which may have a substituent; Y is vinylene group or ethylene group; k is an integer of 0 to 5; and l, m and n each is an integer of 0 to 4.

Namely, such a dihydroxyl-group-containing diamine compound can be used as an intermediate for preparation of the aromatic polycarbonate resin according to the present invention.

In the formula (1), the alkyl group represented by $R^{21}$ to $R^{24}$ is a straight-chain or branched alkyl group having 1 to 5 carbon atoms. The above alkyl group may have a substituent such as a fluorine atom, cyano group, or a phenyl group which may have a substituent selected from the group consisting of a halogen atom and an alkyl group having 1 to 5 carbon atoms.

Specific examples of the above alkyl group include methyl group, ethyl group, n-propyl group, i-propyl group, tert-butyl group, sec-butyl group, n-butyl group, i-butyl group, trifluoromethyl group, 2-cyanoethyl group, benzyl group, 4-chlorobenzyl group, 4-methylbenzyl group and 4-phenylbenzyl group.

Examples of the aryl group represented by $R^{21}$ to $R^{24}$ are phenyl group, naphthyl group, biphenylyl group, terphenylyl group, pyrenyl group, fluorenyl group, 9,9-dimethyl-2-fluorenyl group, azulenyl group, anthryl group, triphenylenyl group, and chrysenyl group.

The above-mentioned aryl group may have a substituent such as a lower alkyl group, a lower alkoxyl group or a halogen atom.

Further, the aryl group represented by the following formula (2) can be employed:

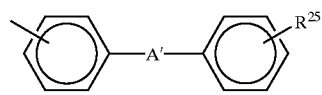

(2)

wherein A' is selected from the group consisting of —O—, —S—, —SO—, —SO$_2$—, —CO— and the following bivalent groups:

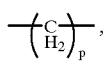, 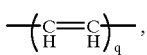

-continued

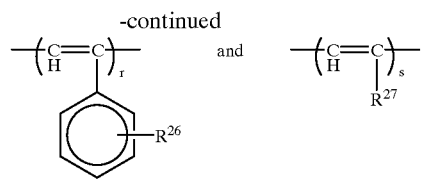

in which $R^{25}$, $R^{26}$ and $R^{27}$ each is a hydrogen atom, an alkyl group which may have a substituent, an alkoxyl group, a halogen atom, an aryl group which may have a substituent, an amino group, nitro group, or cyano group; and p, q, r and s each is an integer of 1 to 12.

The same alkyl group and aryl group as defined in the description of $R^{21}$ to $R^{24}$ are employed for $R^{25}$ to $R^{27}$. With respect to the amino group represented by $R^{25}$ to $R^{27}$, a group of the following formula can be employed:

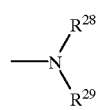

in which $R^{28}$ and $R^{29}$ each is an alkyl group which may have a substituent, or an aryl group which may have a substituent.

The same alkyl group and aryl group as defined in the description of $R^{21}$ to $R^{24}$ are employed for $R^{28}$ and $R^{29}$. In addition, $R^{28}$ and $R^{29}$ may form a ring together, or in combination with the carbon atom of the aryl group. Namely, there can be employed piperidino group, morpholino group, and julolidyl group.

Examples of the halogen atom represented by $R^{21}$ to $R^{27}$ are fluorine atom, chlorine atom, bromine atom, and iodine atom. Those halogen atoms can also be used as the substituents.

The method of producing the dihydroxyl-group-containing diamine compound of formula (1) will now be explained in accordance with the reaction schemes shown below.

A corresponding aldehyde compound having an alkoxyl group, represented by formula (3), is allowed to react with a corresponding bis(phosphonate) of formula (4) by the modified Wittig reaction, so that a distyrylbenzene compound of formula (5) can be obtained:

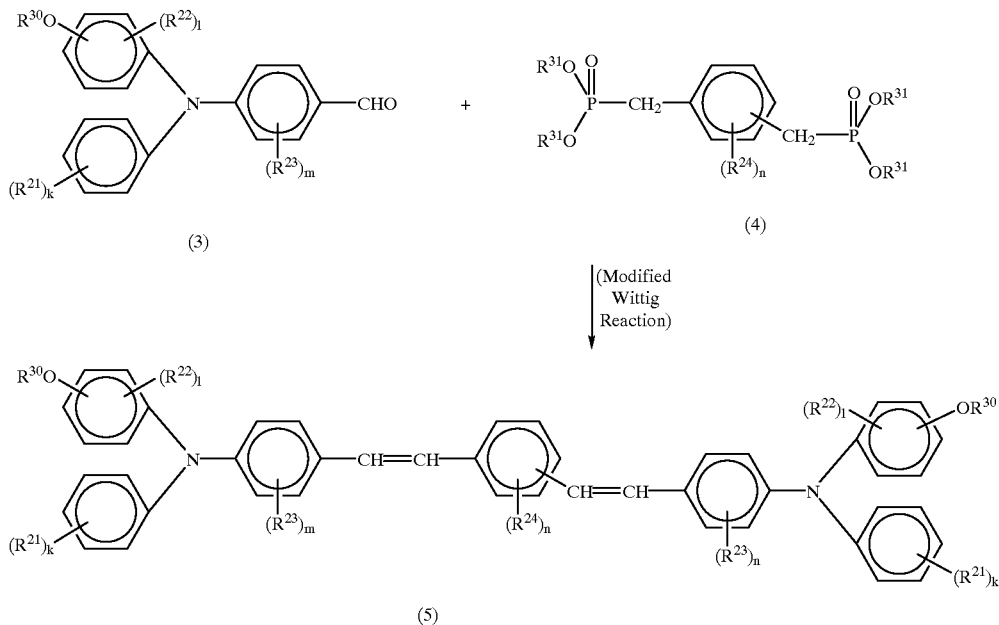

(3) + (4) →(Modified Wittig Reaction)→ (5)

wherein $R^{21}$ to $R^{24}$, k, l, m and n are the same as those previously defined; and $R^{30}$ and $R^{31}$ each is a lower alkyl group.

Furthermore, the cleavage of the ether linkage of the alkoxyl group is carried out in the distyrylbenzene compound of formula (5), so that a dihydroxyl-group-containing diamine compound of formula (1-a) can be obtained.

Alternatively, the distyrylbenzene compound of formula (5) is reduced to obtain a diphenethylbenzene compound of formula (6). The cleavage of the ether linkage of the alkoxyl group is carried out in the diphenethylbenzene compound of formula (6), so that a dihydroxyl-group-containing diamine compound of formula (1-b) can be obtained.

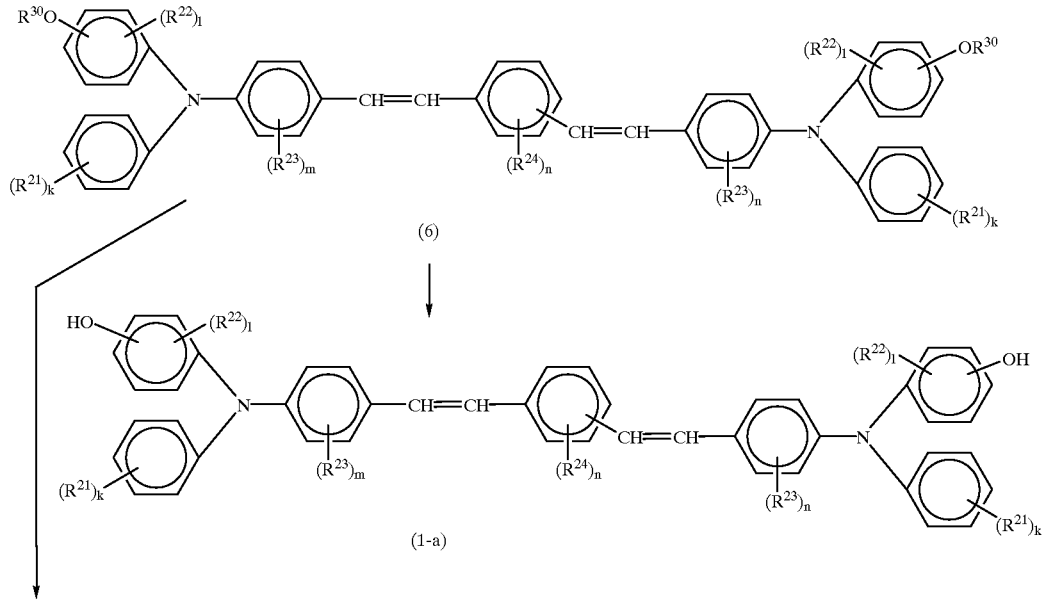

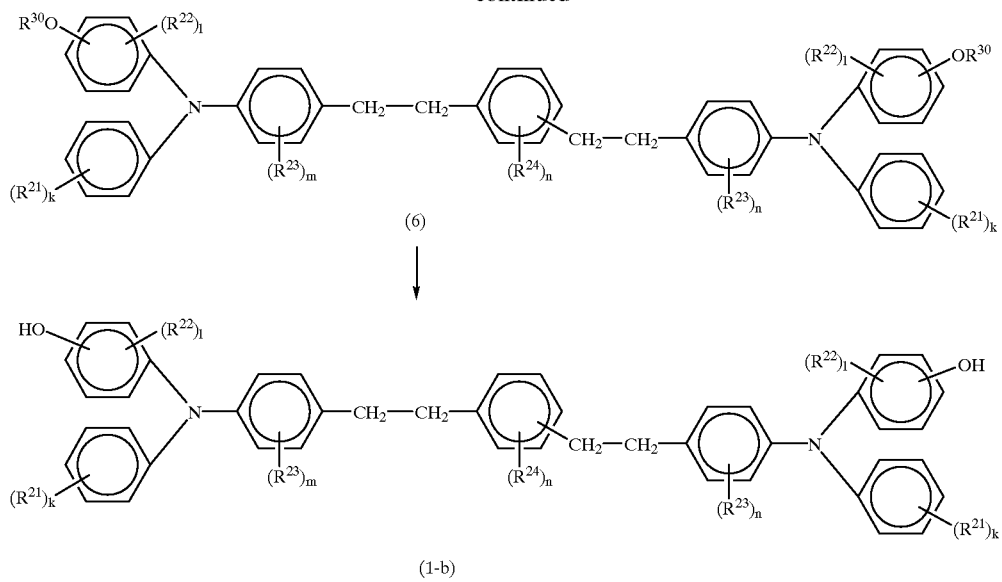

(1-b)

The condensation reaction between the aldehyde compound of formula (3) and the bis(phosphonate) compound of formula (4), which is conventionally known as the modified Wittig reaction, is preferably carried out in the presence of a basic catalyst.

In this case, potassium hydroxide, sodium amide, and alcoholate such as sodium methylate, potassium methylate and potassium-t-butoxide can be used as the basic catalysts.

Examples of the reaction solvent used in the above-mentioned condensation reaction are methanol, ethanol, propanol, toluene, xylene, dioxane, N,N-dimethylformamide, dimethyl sulfoxide, and tetrahydrofuran.

The reaction temperature may be determined within a wide range depending on (1) the stability of the employed solvent with respect to the employed basic catalyst, (2) the reactivity of the condensed components, and (3) the reactivity of the employed basic catalyst as a condensation agent in the solvent. For instance, when a polar solvent is employed, the reaction temperature is in the range of room temperature to 100° C., preferably in the range of room temperature to 80° C. The reaction temperature may be further increased when it is desired to curtail the reaction time, or the activity of a condensation agent to be employed is low.

The cleavage of the ether linkage of the alkoxyl group in the distyrylbenzene compound of formula (5) or diphenethylbenzene compound of formula (6) can be carried out by using sodium thioethoxide or trimethylsilyl iodide.

When the above-mentioned sodium thioethoxide is employed for the cleavage of the ether linkage, a solvent such as N,N-dimethylformamide or triamide of hexamethyl phosphoric acid is preferably employed. The reaction temperature is in the range of room temperature to 180° C., preferably in the range of 10 to 150° C. The reaction time varies with the reactivity of the alkoxyl group, so that the reaction may be terminated in about 20 minutes or it may take 10 hours or more. The cleavage of the ether linkage can be carried out similarly by using sodium thiomethoxide instead of sodium thioethoxide.

When trimethylsilyl iodide is employed for the cleavage of the ether linkage, dichloromethane, chloroform, carbon tetrachloride, sulfolane or acetonitrile are preferably employed as the solvents. The reaction temperature is in the range of room temperature to 100° C. In stead of trimethylsilyl iodide, trimethylsilyl chloride and sodium iodide may be employed.

Furthermore, the cleavage of the ether linkage can be carried out by using a reagent such as hydriodic acid.

It is preferable to carry out the reduction of the distyrylbenzene compound of formula (5) by catalytic hydrogenation. The catalytic hydrogenation generally employs a homogeneous catalyst or heterogeneous catalyst. As the homogeneous catalyst there can be employed complex compounds of metals belonging to the group VIII, such as rhodium, ruthenium, iridium and cobalt; while as the heterogeneous catalyst there can be employed platinum compounds, Raney nickel, and a composite prepared by causing platinum, palladium, rhodium or ruthenium to be supported on active carbon, alumina or barium sulfate.

In the present invention, the heterogeneous catalyst is preferably employed because after-treatment can be facilitated.

For the heterogeneous catalyst reaction, the reaction system is placed in a sealed condition with a gas phase being replaced with hydrogen gas of 1 atmospheric pressure, and the reaction is carried out with vigorous stirring. The hydrogen gas is supplied to the reaction system through a reducing valve according to the absorbed amount. The reaction is terminated when the theoretical amount of the hydrogen gas has been absorbed. In this case, the reaction may be carried out at room temperature. When the absorption of the hydrogen gas is slow, the reaction temperature may be increased. As the reaction solvent, methanol, ethanol, propanol, tetrahydrofuran, dioxane and acetic acid can be employed.

The bis(phosphonate) compound of formula (4) can be readily produced by allowing a corresponding dihalogen compound to react with trialkyl phosphite under the application of heat thereto without any solvent, or in an organic solvent such as toluene, xylene or N,N-dimethylformamide.

The polycarbonate resin according to the present invention will now be explained in detail.

In formulae (I), (III), (IV) and (V), $Ar^2$ and $Ar^7$ each is an aryl group which may have a substituent as previously mentioned.

Examples of the aryl group represented by $Ar^2$ and $Ar^7$ include phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidenephenyl group, 5H-dibenzo[a,d]cyclo-heptenylidenephenyl group, thienyl group, benzothienyl group, furyl group, benzofuranyl group, carbazolyl group, pyridinyl group, pyrrolidyl group, oxazolyl group, and a group represented by the following formula (IX):

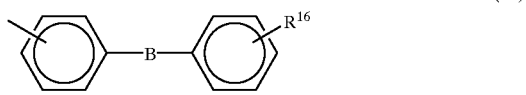

(IX)

wherein $R^{16}$ is a hydrogen atom, an alkyl group which may have a substituent, an alkoxyl group which may have a substituent, a halogen atom, an aryl group which may have a substituent, an amino group, nitro group or cyano group; and B is selected from the group consisting of —O—, —S—, —SO—, —SO$_2$—, —CO—, and the following bivalent groups:

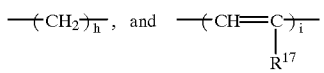

in which h is an integer of 1 to 12; i is an integer of 1 to 3; and $R^{17}$ is a hydrogen atom, an alkyl group which may have a substituent, or an aryl group which may have a substituent.

Examples of the substituent of the above-mentioned aryl group represented by $Ar^2$ and $Ar^7$ include a halogen atom such as fluorine atom, chlorine atom, bromine atom and iodine atom, cyano group, nitro group, an alkyl group which may have a substituent, an alkoxyl group which may have a substituent, and an amino group represented by the following formula (X):

(X)

in which $R^{18}$ and $R^{19}$ each is an alkyl group which may have a substituent, or an aryl group which may have a substituent, and $R^{18}$ and $R^{19}$ may form a ring together or in combination with a carbon atom of the aryl group to constitute piperidino group, morpholino group or julolidyl group.

The alkyl group for use in the present invention is a straight chain or branched alkyl group having 1 to 5 carbon atoms. The alkyl group may have a substituent such as a fluorine atom, cyano group, or a phenyl group which may have a substituent selected from the group consisting of a halogen atom and a straight chain or branched alkyl group having 1 to 5 carbon atoms.

Specific examples of such an alkyl group are methyl group, ethyl group, n-propyl group, iso-propyl group, tert-butyl group, sec-butyl group, n-butyl group, iso-butyl group, trifluoromethyl group, 2-cyanoethyl group, benzyl group, 4-chlorobenzyl group, and 4-methylbenzyl group.

The same alkyl groups as mentioned above can be used for the alkoxyl group for use in the present invention.

In the formula (I), $Ar^1$, $Ar^3$, $Ar^4$, $Ar^5$ and $Ar^6$ each is an arylene group. In this case, there can be employed any bivalent groups derived from the substituted or unsubstituted aryl group represented by $Ar^2$ and $Ar^7$.

According to the present invention, the photoconductive layer of the electrophotoconductor comprises as an effective component a polycarbonate resin comprising the structural unit of formula (I) which is provided with the charge transporting properties. To control the mechanical characteristics of the obtained polycarbonate resin, a copolymer resin comprising the structural unit of formula (I) and the structural unit for use in the conventionally known polycarbonate resin, for example, as described in the previously mentioned "Handbook of Polycarbonate Resin" (issued by The Nikkan Kogyo Shimbun Ltd.) can be employed. The structural unit of formula (II) is one of the conventionally known structural units for use in the polycarbonate resin, which can be preferably employed in the present invention.

The structural unit of formula (II) will now be explained by referring to the diol of formula (VIII) that is the starting material for the structural unit of formula (II).

In the case where X in the diol of formula (VIII) represents a bivalent aliphatic group or bivalent cyclic aliphatic group, the representative examples of the obtained diol are as follows: ethylene glycol, diethylene glycol, triethylene glycol, polyethylene glycol, polytetramethylene ether glycol, 1,3-propanediol, 1,4-butanediol, 1,5-pentanediol, 3-methyl-1,5-pentanediol, 1,6-hexanediol, 1,5-hexanediol, 1,7-heptanediol, 1,8-octanediol, 1,9-nonanediol, 1,10-decanediol, 1,11-undecanediol, 1,12-dodecanediol, neopentyl glycol, 2-ethyl-1,6-hexanediol, 2-methyl-1,3-propanediol, 2-ethyl-1,3-propanediol, 2,2-dimethyl-1,3-propanediol, 1,3-cyclohexanediol, 1,4-cyclohexanediol, cyclohexane-1,4-dimethanol, 2,2-bis(4-hydroxycyclohexyl)propane, xylylenediol, 1,4-bis(2-hydroxyethyl)benzene, 1,4-bis(3-hydroxypropyl)benzene, 1,4-bis(4-hydroxybutyl)benzene, 1,4-bis(5-hydroxypentyl)benzene, and 1,4-bis(6-hydroxyhexyl)benzene.

In the case where X in the diol of formula (VIII) represents a bivalent aromatic group, there can be employed any bivalent groups derived from the same substituted or unsubstituted aryl group as defined in the description of $Ar^2$ and $Ar^7$. In addition, X represents the following bivalent groups:

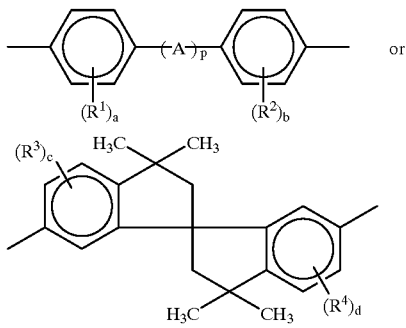

in which $R^1$, $R^2$, $R^3$ and $R^4$ each is an alkyl group which may have a substituent, an aryl group which may have a substituent or a halogen atom; a and b each is an integer of 0 to 4; c and d each is an integer of 0 to 3; and p is an integer of 0 or 1, and when p=1, A is a straight-chain alkylene group having 2 to 12 carbon atoms, —O—, —S—, —SO—, —SO$_2$—, —CO—,

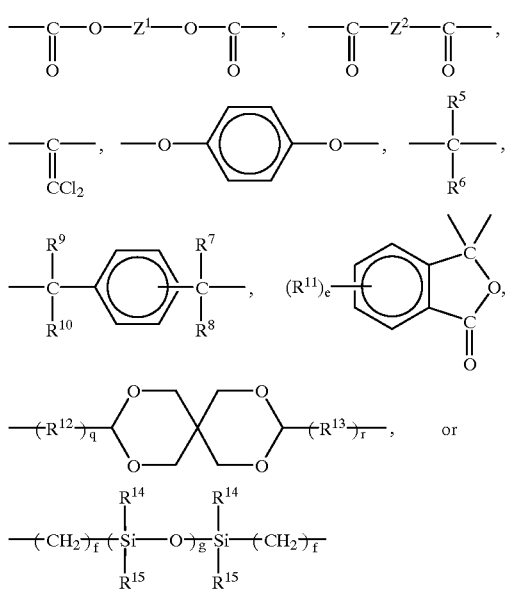

in which $Z^1$ and $Z^2$ each is a bivalent aliphatic group which may have a substituent, or an arylene group which may have a substituent; $R^5$, $R^6$, $R^7$, $R^8$, $R^9$, $R^{10}$ and $R^{11}$ each is a hydrogen atom, a halogen atom, an alkyl group having 1 to 5 carbon atoms which may have a substituent, an alkoxyl group having 1 to 5 carbon atoms which may have a substituent, or an aryl group which may have a substituent, and $R^5$ and $R^6$ may form a carbocyclic ring or heterocyclic ring having 5 to 12 carbon atoms, or $R^5$ and $R^6$ may form a carbocyclic ring or heterocyclic ring in combination with $R^1$ and $R^2$; q is an integer of 0 or 1, and when q=1, $R^{12}$ is an alkylene group having 1 to 4 carbon atoms; r is an integer of 0 or 1, and when r=1, $R^{13}$ is an alkylene group having 1 to 4 carbon atoms; $R^{14}$ and $R^{15}$ each is an alkyl group having 1 to 5 carbon atoms which may have a substituent or an aryl group which may have a substituent; e is an integer of 0 to 4; f is an integer of 0 to 20; and g is an integer of 0 to 2000.

In the above-mentioned bivalent groups, the same substituted or unsubstituted alkyl group, and the same substituted or unsubstituted aryl group as defined in the description of the structural unit of formula (I) can be employed for $R^1$, $R^2$, $R^3$ and $R^4$.

Examples of a halogen atom represented by $R^1$, $R^2$, $R^3$ and $R^4$ are a fluorine atom, a chlorine atom, a bromine atom and an iodine atom.

When $Z^1$ and $Z^2$ each represents a substituted or unsubstituted bivalent aliphatic group, there can be employed any bivalent groups obtained by removing the hydroxyl groups from the diol of formula (VIII) in which X represents a bivalent aliphatic group or a bivalent cyclic aliphatic group. On the other hand, when $Z^1$ and $Z^2$ each represents a substituted or unsubstituted arylene group, there can be employed any bivalent groups derived from the previously defined substituted or unsubstituted aryl group.

Preferable examples of the diol of formula (VIII) in which X represents a bivalent aromatic group are as follows:
bis(4-hydroxyphenyl)methane,
bis(2-methyl-4-hydroxyphenyl)methane,
bis(3-methyl-4-hydroxyphenyl)methane,
1,1-bis(4-hydroxyphenyl)ethane,
1,2-bis(4-hydroxyphenyl)ethane,
bis(4-hydroxyphenyl)phenylmethane,
bis(4-hydroxyphenyl)diphenylmethane,
2-(4-hydroxyphenyl)-2-(3-hydroxyphenyl)propane,
1,1-bis(4-hydroxyphenyl)-2-methylpropane,
2,2-bis(4-hydroxyphenyl)butane,
1,1-bis(4-hydroxyphenyl)-3-methylbutane,
2,2-bis(4-hydroxyphenyl)pentane,
2,2-bis(4-hydroxyphenyl)-4-methylpentane,
2,2-bis(4-hydroxyphenyl)hexane,
4,4-bis(4-hydroxyphenyl)heptane,
2,2-bis(4-hydroxyphenyl)hexane,
bis(3,5-dimethyl-4-hydroxyphenyl)methane,
2,2-bis(3-methyl-4-hydroxyphenyl)propane,
2,2-bis(3-isopropyl-4-hydroxyphenyl)propane,
2,2-bis(3-sec-butyl-4-hydroxyphenyl)propane,
2,2-bis(3-tert-butyl-4-hydroxyphenyl)propane,
2,2-bis(3-cyclohexyl-4-hydroxyphenyl)propane,
2,2-bis(3-allyl-4-hydroxyphenyl)propane,
2,2-bis(3-phenyl-4-hydroxyphenyl)propane,
2,2-bis(3,5-dimethyl-4-hydroxyphenyl)propane,
2,2-bis(3-chloro-4-hydroxyphenyl)propane,
2,2-bis(3,5-dichloro-4-hydroxyphenyl)propane,
2,2-bis(3-bromo-4-hydroxyphenyl)propane,
2,2-bis(3,5-dibromo-4-hydroxyphenyl)propane,
2,2-bis(4-hydroxyphenyl)hexafluoropropane,
1,1-bis(4-hydroxyphenyl)cyclopentane,
1,1-bis(4-hydroxyphenyl)cyclohexane,
1,1-bis(3-methyl-4-hydroxyphenyl)cyclohexane,
1,1-bis(3,5-dimethyl-4-hydroxyphenyl)cyclohexane,
1,1-bis(3,5-dichloro-4-hydroxyphenyl)cyclohexane,
1,1-bis(4-hydroxyphenyl)-3,3,5-trimethylcyclohexane,
1,1-bis(4-hydroxyphenyl)cycloheptane,
2,2-bis(4-hydroxyphenyl)norbornane,
2,2-bis(4-hydroxyphenyl)adamantane,
4,4'-dihydroxydiphenyl ether,
4,4'-dihydroxy-3,3'-dimethyldiphenyl ether,
ethylene glycol bis(4-hydroxyphenyl) ether,
4,4'-dihydroxydiphenylsulfide,
3,3'-dimethyl-4,4'-dihydroxydiphenylsulfide,
3,3',5,5'-tetramethyl-4,4'-dihydroxydiphenylsulfide,
4,4'-dihydroxydiphenylsulfoxide,
3,3'-dimethyl-4,4'-dihydroxydiphenylsulfoxide,
4,4'-dihydroxydiphenylsulfone,
3,3'-dimethyl-4,4'-dihydroxydiphenylsulfone,
3,3'-diphenyl-4,4'-dihydroxydiphenylsulfone,
3,3'-dichloro-4,4'-dihydroxydiphenylsulfone,
bis(4-hydroxyphenyl)ketone,
bis(3-methyl-4-hydroxyphenyl)ketone,
3,3,3',3'-tetramethyl-6,6'-dihydroxyspiro(bis)indane,
3,3',4,4'-tetrahydro-4,4,4',4'-tetramethyl-2,2'-spirobi(2H-1-benzopyrane-7,7'-diol,
trans-2,3-bis(4-hydroxyphenyl)-2-butene,
9,9-bis(4-hydroxyphenyl)fluorene,
9,9-bis(4-hydroxyphenyl)xanthene,
1,6-bis(4-hydroxyphenyl)-1,6-hexanedione,
α,α,α',α'-tetramethyl-α,α'-bis(4-hydroxyphenyl)-p-xylene,
α,α,α',α'-tetramethyl-α,α'-bis(4-hydroxyphenyl)-m-xylene,
2,6-dihydroxydibenzo-p-dioxane,
2,6-dihydroxythianthrene,
2,7-dihydroxyphenoxathine,
9,10-dimethyl-2,7-dihydroxyphenazine,
3,6-dihydroxydibenzofuran,
3,6-dihydroxydibenzothiophene,
4,4'-dihydroxybiphenyl,
1,4-dihydroxynaphthalene,
2,7-dihydroxypyrene,
hydroquinone,
resorcin,
ethylene glycol-bis(4-hydroxybenzoate), diethylene glycol-bis(4-hydroxybenzoate),
triethylene glycol-bis(4-hydroxybenzoate),
1,3-bis(4-hydroxyphenyl)-tetramethyldisiloxane, and
phenol-modified silicone oil.

Further, an aromatic diol having an ester linkage produced by the reaction between 2 moles of a diol and one mole of isophthaloyl chloride or terephthaloyl chloride is also usable.

In the polycarbonate resin comprising the structural unit of formula (I) and the structural unit of formula (II), the molar ratio of a component composed of the structural unit of formula (I) with respect to the total amount of the polycarbonate resin may be freely determined, but preferably 5 mol % or more, more preferably 20 mol % or more because the total amount of the structural unit of formula (I) has an effect on the charge transporting properties of the obtained polycarbonate resin.

In the photoconductors according to the present invention, at least one of the previously mentioned aromatic polycarbonate resins is contained in the photoconductive layers 2, 2a, 2b, 2c, 2d, and 2e. The aromatic polycarbonate resin can be employed in different ways, for example, as shown in FIGS. 1 through 6.

In the photoconductor as shown in FIG. 1, a photoconductive layer 2 is formed on an electroconductive support 1, which photoconductive layer 2 comprises an aromatic polycarbonate resin of the present invention and a sensitizing dye, with the addition thereto of a binder agent (binder resin) when necessary. In this photoconductor, the aromatic polycarbonate resin works as a photoconductive material, through which charge carriers which are necessary for the light decay of the photoconductor are generated and transported. However, the aromatic polycarbonate resin itself scarcely absorbs light in the visible light range and, therefore, it is necessary to add a sensitizing dye which absorbs light in the visible light range in order to form latent electrostatic images by use of visible light.

Referring to FIG. 2, there is shown an enlarged cross-sectional view of another embodiment of an electrophotographic photoconductor according to the present invention. In this photoconductor, there is formed a photoconductive layer 2a on an electroconductive support 1. The photoconductive layer 2a comprises a charge transport medium 4 comprising (i) an aromatic polycarbonate resin of the present invention, optionally in combination with a binder agent, and (ii) a charge generation material 3 dispersed in the charge transport medium 4. In this embodiment, the aromatic polycarbonate resin (or a mixture of the aromatic polycarbonate resin and the binder agent) constitutes the charge transport medium 4. The charge generation material 3, which is, for example, an inorganic material or an organic pigment, generates charge carriers. The charge transport medium 4 accepts the charge carriers generated by the charge generation material 3 and transports those charge carriers.

In this electrophotographic photoconductor, it is basically necessary that the light-absorption wavelength regions of the charge generation material 3 and the aromatic polycarbonate resin not overlap in the visible light range. This is because, in order that the charge generation material 3 produce charge carriers efficiently, it is necessary that light pass through the charge transport medium 4 and reach the surface of the charge generation material 3. Since the aromatic polycarbonate resin comprising the structural unit of formula (I) do not substantially absorb light in the visible range, it can work effectively as a charge transport material when used with the charge generation material 3 which absorbs the light in the visible region and generates charge carriers. The charge transport medium 4 may further comprise a low-molecular weight charge transport material in combination.

Referring to FIG. 3, there is shown an enlarged cross-sectional view of a further embodiment of an electrophotographic photoconductor according to the present invention. In the figure, there is formed on an electroconductive support 1 a two-layered photoconductive layer 2b comprising a charge generation layer 5 containing the charge generation material 3, and a charge transport layer 4 comprising an aromatic polycarbonate resin of the present invention.

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and accepted and transported by the charge transport layer 4. The generation and transportation of the charge carriers are performed by the same mechanism as that in the photoconductor shown in FIG. 2.

In this case, the charge transport layer 4 comprises the aromatic polycarbonate resin, optionally in combination with a binder agent. Furthermore, in order to increase the efficiency of generating the charge carriers, the charge generation layer 5 may further comprise the aromatic polycarbonate resin of the present invention. In addition, the photoconductive layer 2b including the charge generation layer 5 and the charge transport layer 4 may further comprise a low-molecular weight charge transport material for the same reason as mentioned above. This can be applied to the embodiments of FIGS. 4 to 6 to be described later.

In the electrophotographic photoconductor of FIG. 3, a protective layer 6 may be provided on the charge transport layer 4 as shown in FIG. 4. The protective layer 6 may comprise the aromatic polycarbonate resin of the present invention, optionally in combination with a binder agent. As a matter of course, it is effective that the protective layer 6 be provided on a charge transport layer in which a low-molecular weight charge transport material is dispersed. The protective layer 6 may be provided on the photoconductive layer 2a of the photoconductor as shown in FIG. 2.

Figure 5:
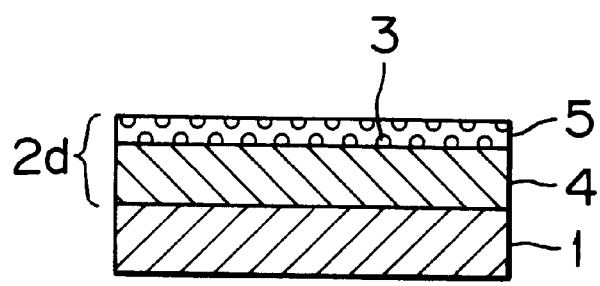
FIG. 5 is a schematic cross-sectional view of a fifth example of an electrophotographic photoconductor according to the present invention.

Referring to FIG. 5, there is shown still another embodiment of an electrophotographic photoconductor according to the present invention. In this figure, the overlaying order of the charge generation layer 5 and the charge transport layer 4 comprising the aromatic polycarbonate resin is reversed in view of the electrophotographic photoconductor as shown in FIG. 3. The mechanism of the generation and transportation of charge carriers is substantially the same as that of the photoconductor shown in FIG. 3.

Figure 6:
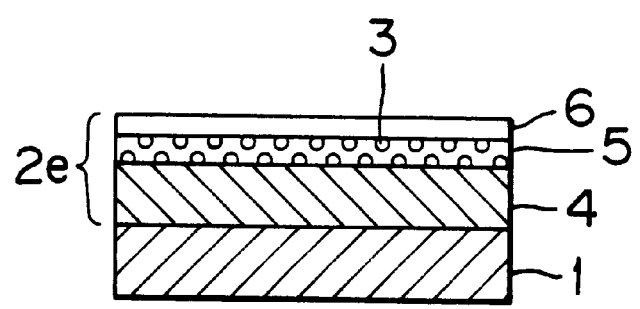
FIG. 6 is a schematic cross-sectional view of a sixth example of an electrophotographic photoconductor according to the present invention.

In the above photoconductor of FIG. 5, a protective layer 6 may be formed on the charge generation layer 5 as shown in FIG. 6 in light of the mechanical strength of the photoconductor.

When the electrophotographic photoconductor according to the present invention as shown in FIG. 1 is prepared, at least one aromatic polycarbonate resin of the present invention is dissolved in a solvent, with the addition thereto of a binder agent when necessary. To the thus prepared solution, a sensitizing dye is added, so that a photoconductive layer coating liquid is prepared. The thus prepared photoconductive layer coating liquid is coated on an electroconductive support 1 and dried, so that a photoconductive layer 2 is formed on the electroconductive support 1.

It is preferable that the thickness of the photoconductive layer 2 be in the range of 3 to 50 $\mu$m, more preferably in the range of 5 to 20 μm. It is preferable that the amount of the aromatic polycarbonate resin of the present invention be in the range of 30 to 100 wt. % of the total weight of the photoconductive layer 2.

It is preferable that the amount of the sensitizing dye for use in the photoconductive layer 2 be in the range of 0.1 to 5 wt. %, more preferably in the range of 0.5 to 3 wt. % of the total weight of the photoconductive layer 2.

Specific examples of the sensitizing dye for use in the present invention are triarylmethane dyes such as Brilliant Green, Victoria Blue B, Methyl Violet, Crystal Violet and Acid Violet 6B; xanthene dyes such as Rhodamine B, Rhodamine 6G, Rhodamine G Extra, Eosin S, Erythrosin, Rose Bengale and Fluoresceine; thiazine dyes such as Methylene Blue; and cyanine dyes such as cyanin.

The electrophotographic photoconductor shown in FIG. 2 can be obtained by the following method:

The finely-divided particles of the charge generation material 3 are dispersed in a solution in which at least one aromatic polycarbonate resin of the present invention, or a mixture of the aromatic polycarbonate resin and the binder agent is dissolved, so that a coating liquid for the photoconductive layer 2a is prepared. The coating liquid thus prepared is coated on the electroconductive support 1 and then dried, whereby the photoconductive layer 2a is provided on the electroconductive support 1.

It is preferable that the thickness of the photoconductive layer 2a be in the range of 3 to 50 μm, more preferably in the range of 5 to 40 μm. It is preferable that the amount of the aromatic polycarbonate resin for use in the photoconductive layer 2a be in the range of 40 to less than 100 wt. % of the total weight of the photoconductive layer 2a.

It is preferable that the amount of the charge generation material 3 for use in the photoconductive layer 2a be in the range of 0.1 to 50 wt. %, more preferably in the range of 1 to 20 wt. % of the total weight of the photoconductive layer 2a.

Specific examples of the charge generation material 3 for used in the present invention are as follows: inorganic materials such as selenium, selenium-tellurium, cadmium sulfide, cadmium sulfide-selenium and α-silicone; and organic pigments such as an azo pigment, for example, C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967); a phthalocyanine pigment such as C.I. Pigment Blue 16 (C.I. 74100); an indigo pigment such as C.I. Vat Brown 5 (C.I. 73410), C.I. Vat Dye (C.I. 73030); and a perylene pigment such as Algol Scarlet B and Indanthrene Scarlet R (made by Bayer Co., Ltd.). These charge generation materials may be used alone or in combination.

The electrophotographic photoconductor shown in FIG. 3 can be obtained by the following method:

To provide the charge generation layer 5 on the electroconductive support 1, the charge generation material is vacuum-deposited on the electroconductive support 1. Alternatively, the finely-divided particles of the charge generation material 3 are dispersed in an appropriate solvent, together with the binder agent when necessary, so that a coating liquid for the charge generation layer 5 is prepared. The thus prepared coating liquid is coated on the electroconductive support 1 and dried, whereby the charge generation layer 5 is formed on the electroconductive support 1. The charge generation layer 5 may be subjected to surface treatment by buffing and adjustment of the thickness thereof if required. On the thus formed charge generation layer 5, a coating liquid in which at least one aromatic polycarbonate resin of the present invention, optionally in combination with a binder agent is dissolved is coated and dried, so that the charge transport layer 4 is formed on the charge generation layer 5. In the charge generation layer 5, the same charge generation materials as employed in the abovementioned photoconductive layer 2a can be used.

The thickness of the charge generation layer 5 is 5 μm or less, preferably 2 μm or less. It is preferable that the thickness of the charge transport layer 4 be in the range of 3 to 50 μm, more preferably in the range of 5 to 40 μm.

When the charge generation layer 5 is provided on the electroconductive support 1 by coating the dispersion in which finely-divided particles of the charge generation material 3 are dispersed in an appropriate solvent, it is preferable that the amount of finely-divided particles of the charge generation material 3 for use in the charge generation layer 5 be in the range of 10 to 100 wt. %, more preferably in the range of about 50 to 100 wt. % of the total weight of the charge generation layer 5. It is preferable that the amount of the aromatic polycarbonate resin of the present invention for use in the charge transport layer 4 be in the range of 40 to 100 wt. % of the total weight of the charge transport layer 4.

The photoconductive layer 2b of the photoconductor shown in FIG. 3 may comprise a low-molecular-weight charge transport material as previously mentioned.

Examples of the low-molecular-weight charge transport material for use in the present invention are as follows: oxazole derivatives, oxadiazole derivatives (Japanese Laid-Open Patent Applications 52-139065 and 52-139066), imidazole derivatives, triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56-81850), triphenylmethane derivatives (Japanese Patent Publication 51-10983), anthracene derivatives (Japanese Laid-Open Patent Application 51-94829), styryl derivatives (Japanese Laid-Open Patent Application 56- 29245 and 58-198043), carbazole derivatives (Japanese Laid-Open Patent Application 58-58522), and pyrene derivatives (Japanese Laid-Open Patent Application 2-94812).

To prepare the photoconductor shown in FIG. 4, a coating liquid for the protective layer 6 is prepared by dissolving the aromatic polycarbonate resin of the present invention, optionally in combination with the binder agent, in a solvent, and the thus obtained coating liquid is coated on the charge transport layer 4 of the photoconductor shown in FIG. 3, and dried.

It is preferable that the thickness of the protective layer 6 be in the range of 0.15 to 10 μm. It is preferable that the amount of the aromatic polycarbonate resin of the present invention for use in the protective layer 6 be in the range of 40 to 100 wt. % of the total weight of the protective layer 6.

The electrophotographic photoconductor shown in FIG. 5 can be obtained by the following method:

The aromatic polycarbonate resin of the present invention, optionally in combination with the binder agent, is dissolved in a solvent to prepare a coating liquid for the charge transport layer 4. The thus prepared coating liquid is coated on the electroconductive support 1 and dried, whereby the charge transport layer 4 is provided on the electroconductive support 1. On the thus formed charge transport layer 4, a coating liquid prepared by dispersing the finely-divided particles of the charge generation material 3 in a solvent in which the binder agent may be dissolved when necessary, is coated by spray coating and dried, so that the charge generation layer 5 is provided on the charge transport layer 4. The amount ratios of the components contained in the charge generation layer 5 and charge transport layer 4 are the same as those previously described in FIG. 3.

The electrophotographic photoconductor shown in FIG. 6 can be fabricated by forming a protective layer 6 on the charge generation layer 5 of the photoconductor shown in FIG. 5.

To obtain any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used in the preparation of the photoconductor according to the present invention are condensation resins such as polyamide, polyurethane, polyester, epoxy resin, polyketone and polycarbonate; and vinyl polymers such as polyvinylketone, polystyrene, poly-N-vinylcarbazole and polyacrylamide. All the resins having insulating properties and adhesion properties can be employed.

Some plasticizers may be added to the above-mentioned binder agents, when necessary. Examples of the plasticizer for use in the present invention are halogenated paraffin, dimethylnaphthalene and dibutyl phthalate. Further, a variety of additives such as an antioxidant, a light stabilizer, a thermal stabilizer and a lubricant may also be contained in the binder agents when necessary.

Furthermore, in the electrophotographic photoconductor according to the present invention, an intermediate layer such as an adhesive layer or a barrier layer may be interposed between the electroconductive support and the photoconductive layer when necessary. Examples of the material for use in the intermediate layer are polyamide, nitrocellulose and aluminum oxide. It is preferable that the thickness of the intermediate layer be 1 μm or less.

When copying is performed by use of the photoconductor according to the present invention, the surface of the photoconductor is uniformly charged to a predetermined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

Other features of this invention will become apparent in the course of the following description of exemplary embodiments, which are given for illustration of the invention and are not intended to be limiting thereof.

PREPARATION EXAMPLE 1

Preparation of 1,4-bis{4-[N-phenyl-N-(4-hydroxyphenyl)-amino]styryl}benzene 159.08 g (0.525 mol) of 4-formyl-4'-methoxy-triphenylamine represented by the following formula (7) and 94.61 g (0.25 mol) of 1,4-bis(diethylphosphonomethyl)benzene represented by the following formula (8) were dissolved in 1600 ml of DMF, and the mixture was cooled to 15° C.

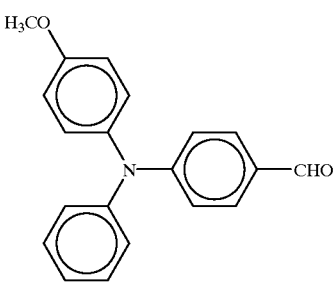

(7)

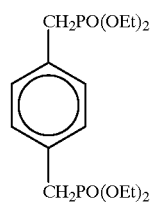

(8)

To the above prepared solution, 6.73 g (0.6 mol) of potassium tert-butoxide (t-BuOK) was added over a period of 40 minutes, with the reaction mixture being maintained at a temperature in the range of 15 to 25° C.

After stirring for 1.5 hours, the reaction mixture was poured into 3000 ml of methanol. The separating crystals were removed from the mixture by filtration, washed with 500 ml of methanol, and dried under reduced pressure, so that 161.3 g of 1,4-bis{4-[N-phenyl-N-(4-methoxyphenyl)amino]styryl}benzene of formula (9) was obtained in a yield of 95.4%.

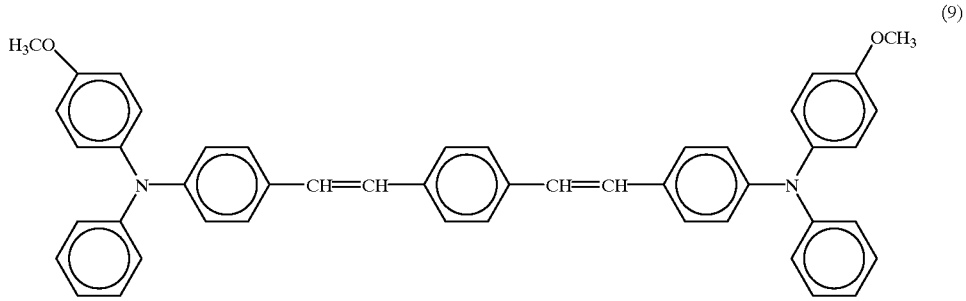

(9)

155.48 g (0.23 mol) of the thus obtained 1,4-bis{4-[N-phenyl-N-(4-methoxyphenyl)amino]styryl}benzene and 116.06 g (1.38 mol) of sodium thioethoxide were added to 2000 ml of dry DMF, and the above prepared mixture was stirred with the application of heat thereto. The compounds were completely dissolved in dry DMF at 60° C., and the reaction mixture was refluxed for an additional 2 hours. Thus, the reaction was terminated. After the reaction mixture was cooled, 2000 ml of ethyl acetate, and 120 g of acetic acid were successively added to the reaction mixture. The thus obtained reaction mixture was washed with water and dried over magnesium sulfate, and then, the solvent was distilled away from the reaction mixture. The obtained crude product was chromatographed on a silica gel column, whereby 131.95 g of 1,4-bis{4-[N-phenyl-N-(4-hydroxyphenyl)amino]styryl}benzene represented by formula (10) was obtained in a yield of 88.5%.

Figure 22:
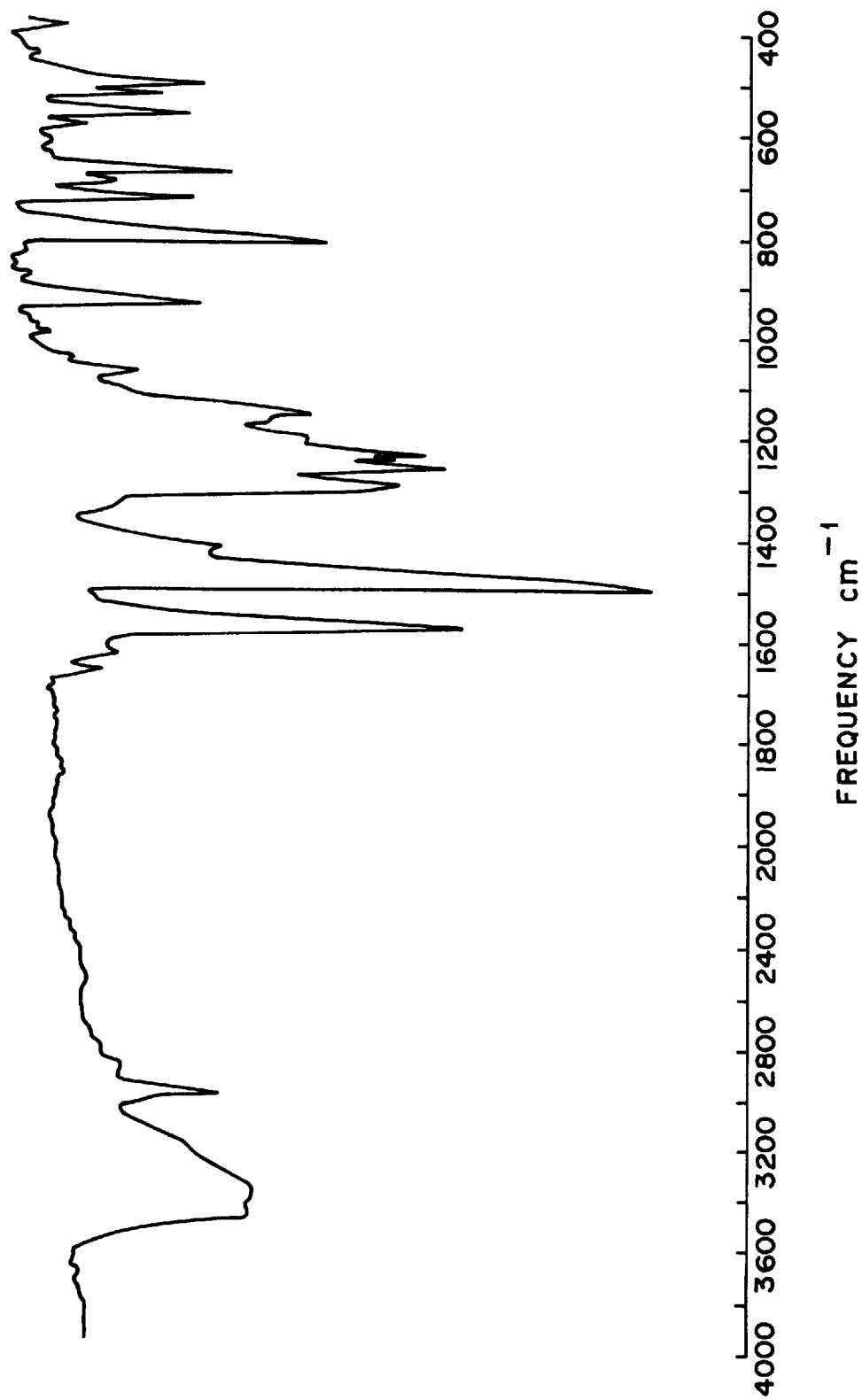
FIG. 22 is an IR spectrum of 1,4-bis{4-[N-phenyl-N-(4-hydroxyphenyl)amino]styryl}benzene obtained in Preparation Example 1.

An infrared spectrum of this product, taken by use of a KBr tablet, is shown in FIG. 22.

PREPARATION EXAMPLE 2

Preparation of 1,4-bis{4-[N-phenyl-N-(4-hydroxyphenyl)-amino]phenethyl}benzene 135.2 g (0.2 mol) of 1,4-bis{4-[N-phenyl-N-(4-methoxyphenyl)amino]styryl}benzene of formula (9) obtained in Preparation Example 1, and 13.52 g of 5% Pd-carbon powder (50% water-containing material) were added to 1200 ml of tetrahydrofuran. Then, hydrogen gas was supplied to a reaction system at room temperature, and the reaction was terminated when the amount of hydrogen gas supplied to the reaction system reached 10 l.

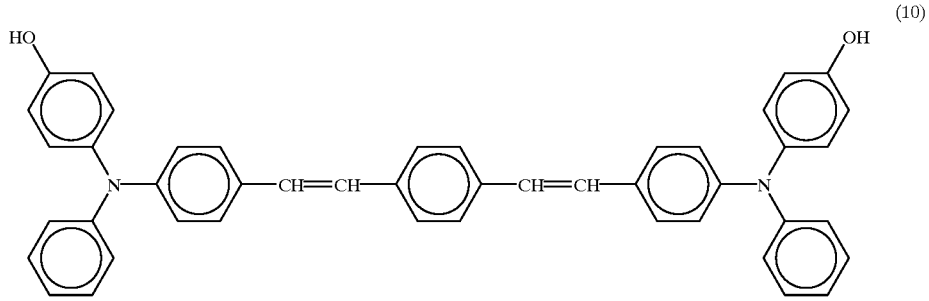

(10)

The melting initiation temperature of the above obtained 1,4-bis{4-[N-phenyl-N-(4-hydroxyphenyl)amino]styryl}benzene was 125° C.

The results of the elemental analysis are as follows:

| | Elemental analysis: | | |
|---|---|---|---|
| | % C | % H | % N |
| Found (*) | 84.5 | 5.9 | 4.3 |
| Calcd. | 85.2 | 5.6 | 4.3 |

(*) The found value was obtained from a solvent adduct.

The catalyst was removed from the reaction mixture by filtration, and the solvent was distilled away from the reaction mixture. A resulting crude product was chromatographed on a silica gel column, whereby 128.9 g of 1,4-bis{4-[N-phenyl-N-(4-methoxyphenyl)amino]phenethyl}benzene represented by the following formula (11) was obtained in a yield of 94.8%.

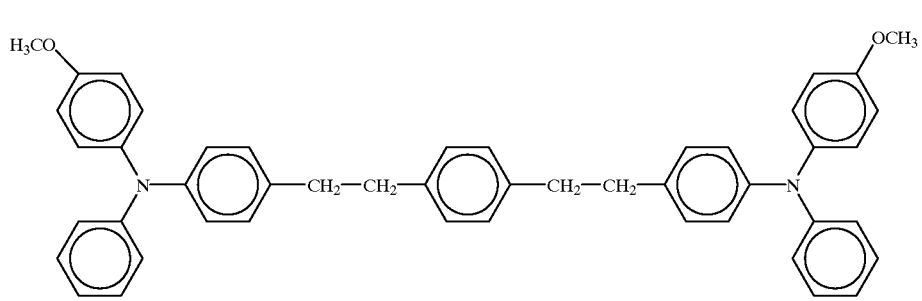

(11)

122.4 g (0.18 mol) of the thus obtained 1,4-bis{4-[N-phenyl-N-(4-methoxyphenyl)amino]phenethyl}benzene and 90.83 g (1.08 mol) of sodium thioethoxide were added to 1500 ml of dry DMF, and the above prepared mixture was stirred with the application of heat thereto. The compounds were completely dissolved in dry DMF at 50° C., and the reaction mixture was refluxed for an additional 2 hours. Thus, the reaction was terminated. After the reaction mixture was cooled, 1500 ml of ethyl acetate, and 96 g of acetic acid were successively added to the reaction mixture. The thus obtained reaction mixture was washed with water and dried over magnesium sulfate, and then, the solvent was distilled away from the reaction mixture. The obtained crude product was chromatographed on a silica gel column, whereby 99.3 g of 1,4-bis{4-[N-phenyl-N-(4-hydroxyphenyl)amino]phenethyl}benzene represented by formula (12) was obtained in a yield of 84.6%.

Figure 23:
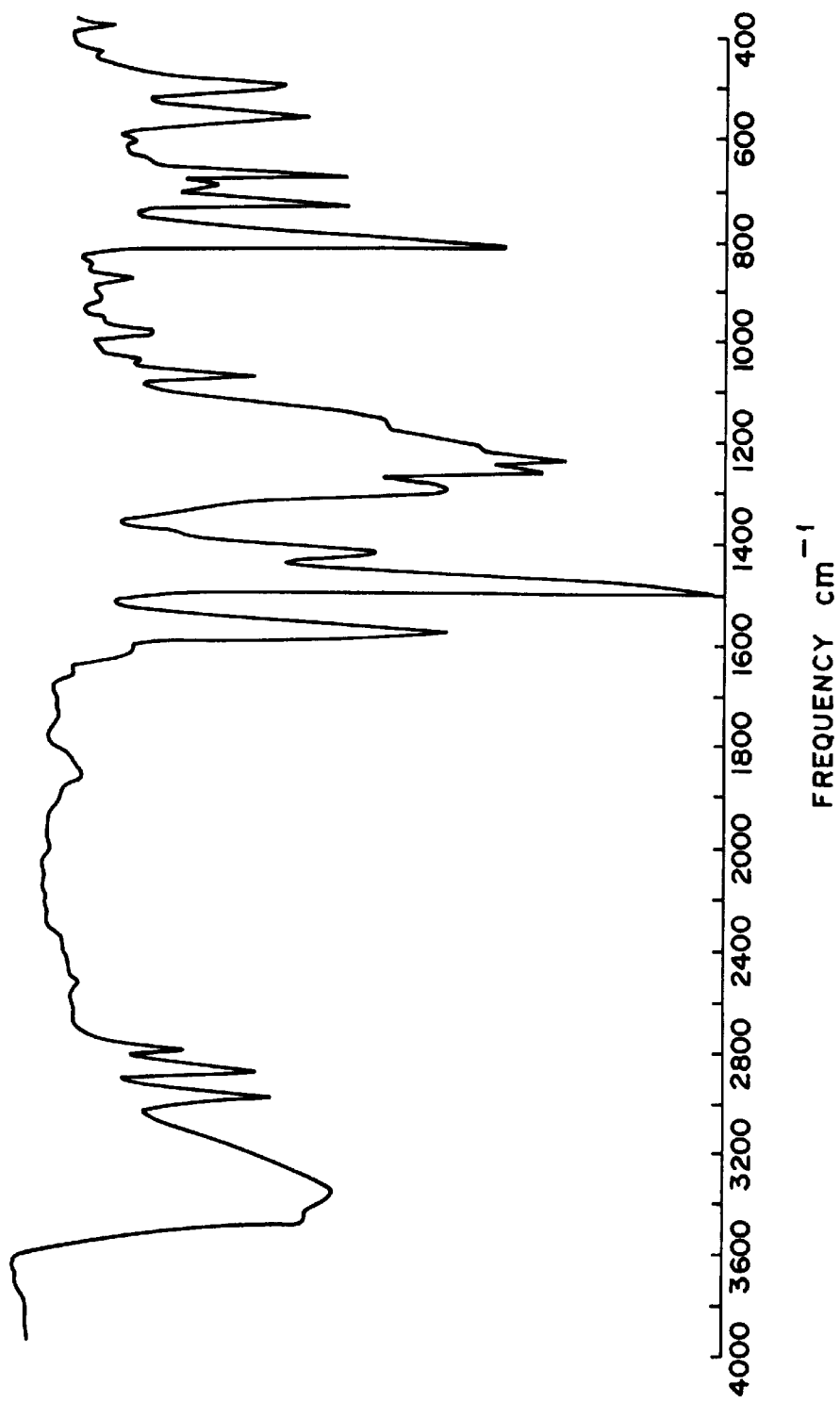
FIG. 23 is an IR spectrum of 1,4-bis{4-[N-phenyl-N-(4-hydroxyphenyl)amino]phenethyl}benzene obtained in Preparation Example 2.

An infrared spectrum of this product, taken by use of a KBr tablet, is shown in FIG. 23.

PREPARATION EXAMPLE 3

Preparation of 1,4-bis{4-[N-(4-methylphenyl)-N-(4-hydroxyphenyl)amino]styryl}benzene 165.90 g (0.525 mol) of 4-formyl-4'-methyl-4"-methoxytriphenylamine represented by the following formula (13) and 94.61 g (0.25 mol) of 1,4-bis(diethylphosphonomethyl)benzene were dissolved in 1600 ml of DMF, and the mixture was cooled to 15° C.

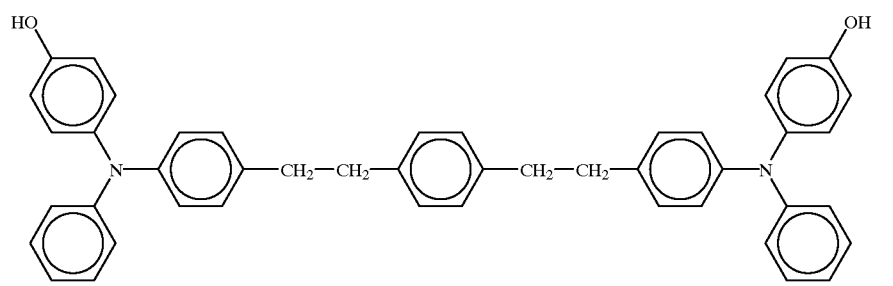

(12)

The melting initiation temperature of the above obtained 1,4-bis{4-[N-phenyl-N-(4-hydroxyphenyl)amino]phenethyl}benzene was 99° C.

The results of the elemental analysis are as follows:

| | Elemental analysis: | | |
|---|---|---|---|
| | % C | % H | % N |
| Found (*) | 83.3 | 6.3 | 4.5 |
| Calcd. | 84.7 | 6.2 | 4.3 |

(*) The found value was obtained from a solvent adduct.

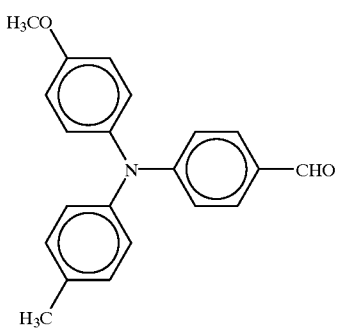

(13)

To the above prepared solution, 66.7 g (0.6 mol) of potassium tert-butoxide (t-BuOK) was added over a period of 40 minutes, with the reaction mixture being maintained at a temperature in the range of 15 to 25° C.

After stirring for 1.5 hours, the reaction mixture was poured into 3000 ml of methanol. The separating crystals were removed from the mixture by filtration, washed with 500 ml of methanol, and dried under reduced pressure, so that 165.09 g of 1,4-bis{4-[N-(4-methylphenyl)-N-(methoxyphenyl)amino]styryl}benzene of formula (14) was obtained in a yield of 93.8%.

The melting point of the above obtained 1,4-bis{4-[N-(4-methylphenyl)-N-(4-hydroxyphenyl)amino]styryl}benzene was 147 to 151° C.

The results of the elemental analysis are as follows:

| | Elemental analysis: | | |
|---|---|---|---|
| | % C | % H | % N |
| Found | 85.1 | 6.3 | 3.6 |

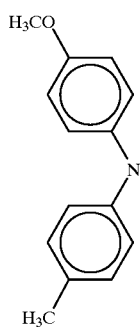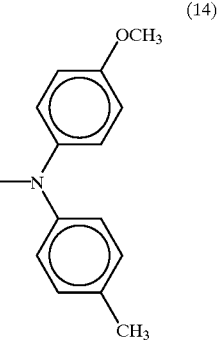

(14)

161.92 g (0.23 mol) of the thus obtained 1,4-bis{4-[N-(4-methylphenyl)-N-(4-methoxyphenyl)amino]styryl}benzene and 116.06 g (1.38 mol) of sodium thioethoxide were added to 2000 ml of dry DMF, and the above prepared mixture was stirred with the application of heat thereto. The compounds were completely dissolved in dry DMF at 60° C., and the reaction mixture was refluxed for an additional 2 hours. Thus, the reaction was terminated. After the reaction mixture was cooled, 2000 ml of ethyl acetate, and 120 g of acetic acid were successively added to the reaction mixture. The thus obtained reaction mixture was washed with water and dried over magnesium sulfate, and then, the solvent was distilled away from the reaction mixture. The obtained crude product was chromatographed on a silica gel column, whereby 134.02 g of 1,4-bis{4-[N-(4-methylphenyl)-N-(4-hydroxyphenyl)amino]styryl}benzene represented by formula (15) was obtained in a yield of 86.2%.

-continued

| | Elemental analysis: | | |
|---|---|---|---|
| | % C | % H | % N |
| Calcd. | 85.2 | 6.0 | 4.1 |

Figure 24:
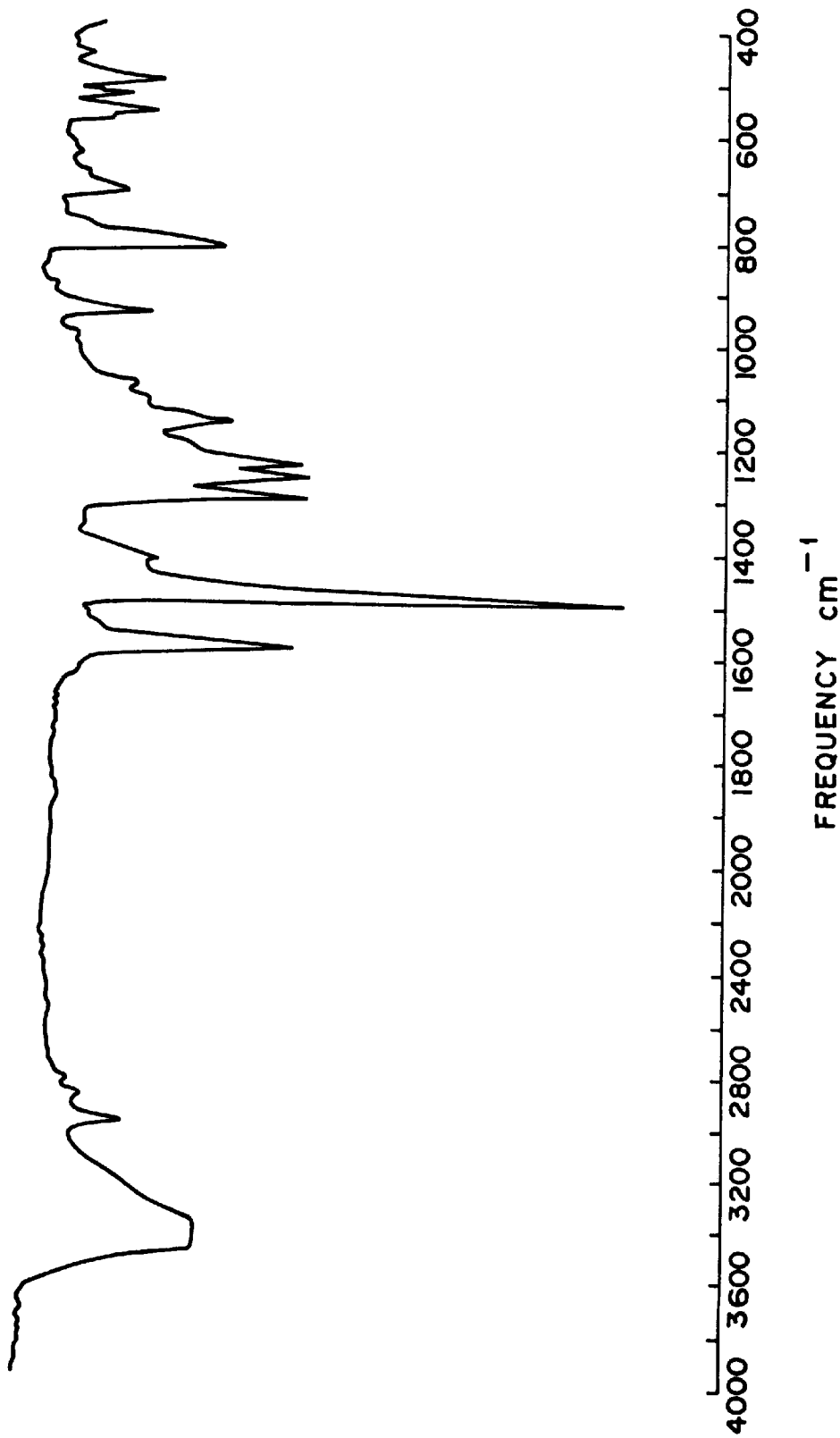
FIG. 24 is an IR spectrum of 1,4-bis{4-[N-4-methylphenyl-N-(4-hydroxyphenyl)amino]styryl}benzene obtained in Preparation Example 3.

An infrared spectrum of this product, taken by use of a KBr tablet, is shown in FIG. 24.

EXAMPLE 1-1

Synthesis of Aromatic Polycarbonate Resin (Compound No. 1)

6.48 g (0.01 mol) of 1,4-bis{4-[N-phenyl-N-(4-hydroxyphenyl)amino]styryl}benzene obtained in Preparation Example 1, represented by formula (10), and 3.04 g (0.03 mol) of triethylamine were dissolved in 50 ml of dry

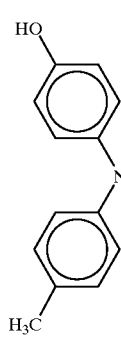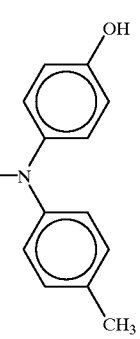

(15)

tetrahydrofuran to prepare a solution (a). A solution (b) prepared by dissolving 2.31 g (0.01 mol) of diethylene glycol bis(chloroformate) in 8 ml of dry tetrahydrofuran was added dropwise to the solution (a) over a period of 30 minutes under water-cooled condition.

After completion of the addition, the above obtained viscous reaction mixture was stirred for 15 minutes, and then a solution prepared by dissolving 0.1 g of phenol in 5 ml of dry tetrahydrofuran was added to the reaction mixture, followed by stirring for 5 minutes.

Thereafter, the obtained viscous reaction mixture was caused to precipitate in methanol, and a crude product was removed from the reaction mixture by filtration. The obtained product was purified by repeating the process of dissolving the product in methylene chloride and precipitating it in methanol twice. Thereafter, the precipitated product was filtered off and dried, so that 6.61 g of an aromatic polycarbonate resin (Compound No. 1) according to the present invention having a repeat unit of the following formula (a) was obtained in a yield was 82.0%.

The IR spectrum indicates the appearance of the characteristic absorption peak due to C=O stretching vibration of carbonate at 1760 cm$^{-1}$.

EXAMPLE 1-2

Synthesis of Aromatic Polycarbonate Resin (Compound No. 2)

6.48 g (0.01 mol) of 1,4-bis{4-[N-phenyl-N-(4-hydroxyphenyl)amino]styryl}benzene obtained in Preparation Example 1, represented by formula (10), and 3.04 g (0.03 mol) of triethylamine were dissolved in 50 ml of dry tetrahydrofuran to prepare a solution (a). A solution (b) prepared by dissolving 3.79 g (0.01 mol) of polytetramethylene ether glycol bis(chloroformate), which was prepared from polytetramethylene ether glycol with an average molecular weight of 250, in 8 ml of dry tetrahydrofuran was added dropwise to the solution (a) over a period of 30 minutes under water-cooled condition.

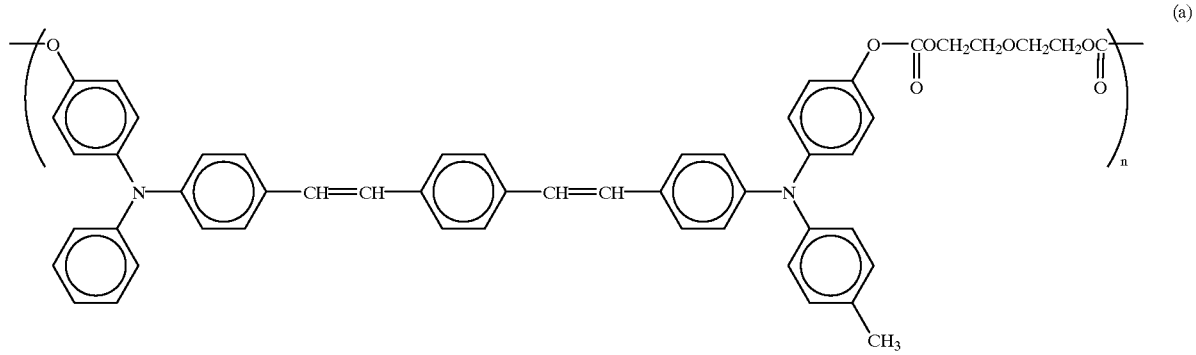

The polystyrene-reduced number-average molecular weight and weight-average molecular weight, which were measured by the gel permeation chromatography, were respectively 41,100 and 177,300.

The results of the elemental analysis of the thus obtained compound are as follows:

| | Elemental analysis: | | |
|---|---|---|---|
| | % C | % H | % N |
| Found | 77.2 | 5.4 | 3.4 |
| Calcd. | 77.4 | 5.2 | 3.5 |

Figure 7:
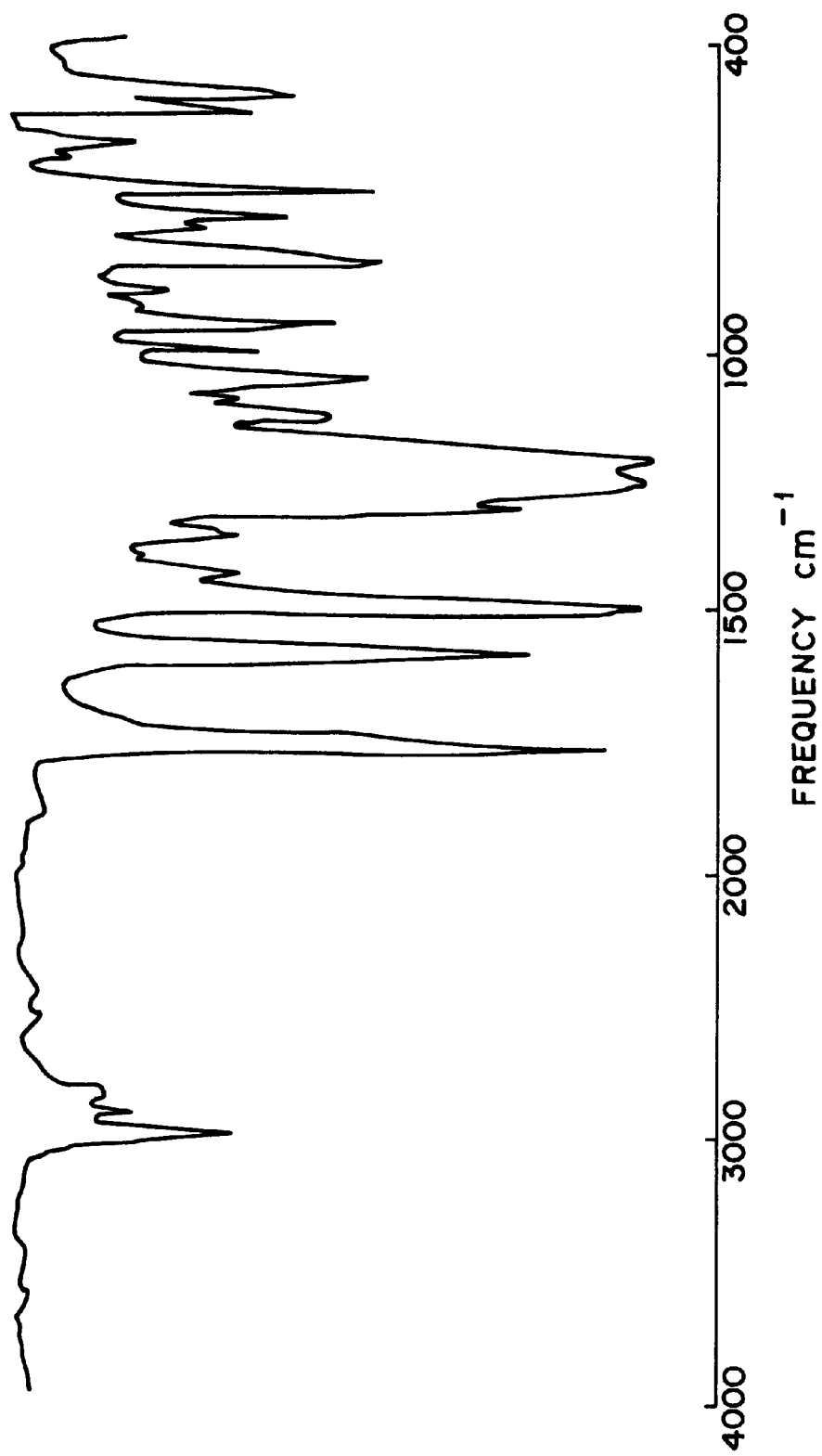
FIGS. 7 to 16 are IR spectra of aromatic polycarbonate resins (Compounds Nos. 1 to 10) respectively synthesized in Example 1-1 to 1-10 according to the present invention, taken by use of an NaCl film.

FIG. 7 shows an infrared spectrum of the aromatic polycarbonate resin (Compound No. 1), taken by use of an NaCl film.

After completion of the addition, the above obtained viscous reaction mixture was stirred for 15 minutes, and then a solution prepared by dissolving 0.1 g of phenol in 5 ml of dry tetrahydrofuran was added to the reaction mixture, followed by stirring for 5 minutes.

Thereafter, the obtained viscous reaction mixture was caused to precipitate in methanol, and a crude product was removed from the reaction mixture by filtration. The obtained product was purified by repeating the process of dissolving the product in tetrahydrofuran and precipitating it in methanol twice. Thereafter, the precipitated product was filtered off and dried, so that 8.28 g of an aromatic polycarbonate resin (Compound No. 2) according to the present invention having a repeat unit of the following formula (b) was obtained in a yield was 86.8%.

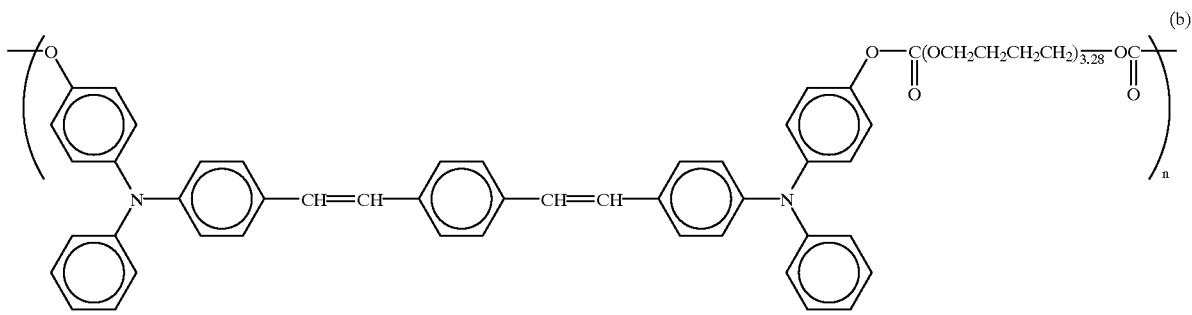

(b)

The polystyrene-reduced number-average molecular weight and weight-average molecular weight, which were measured by the gel permeation chromatography, were respectively 40,400 and 107,000.

The glass transition temperature of the above prepared polycarbonate resin was 86° C.

The results of the elemental analysis of the thus obtained compound are as follows:

| | Elemental analysis: | | |
|---|---|---|---|
| | % C | % H | % N |
| Found | 76.6 | 6.4 | 2.8 |
| Calcd. | 76.9 | 6.3 | 2.9 |

Figure 8:
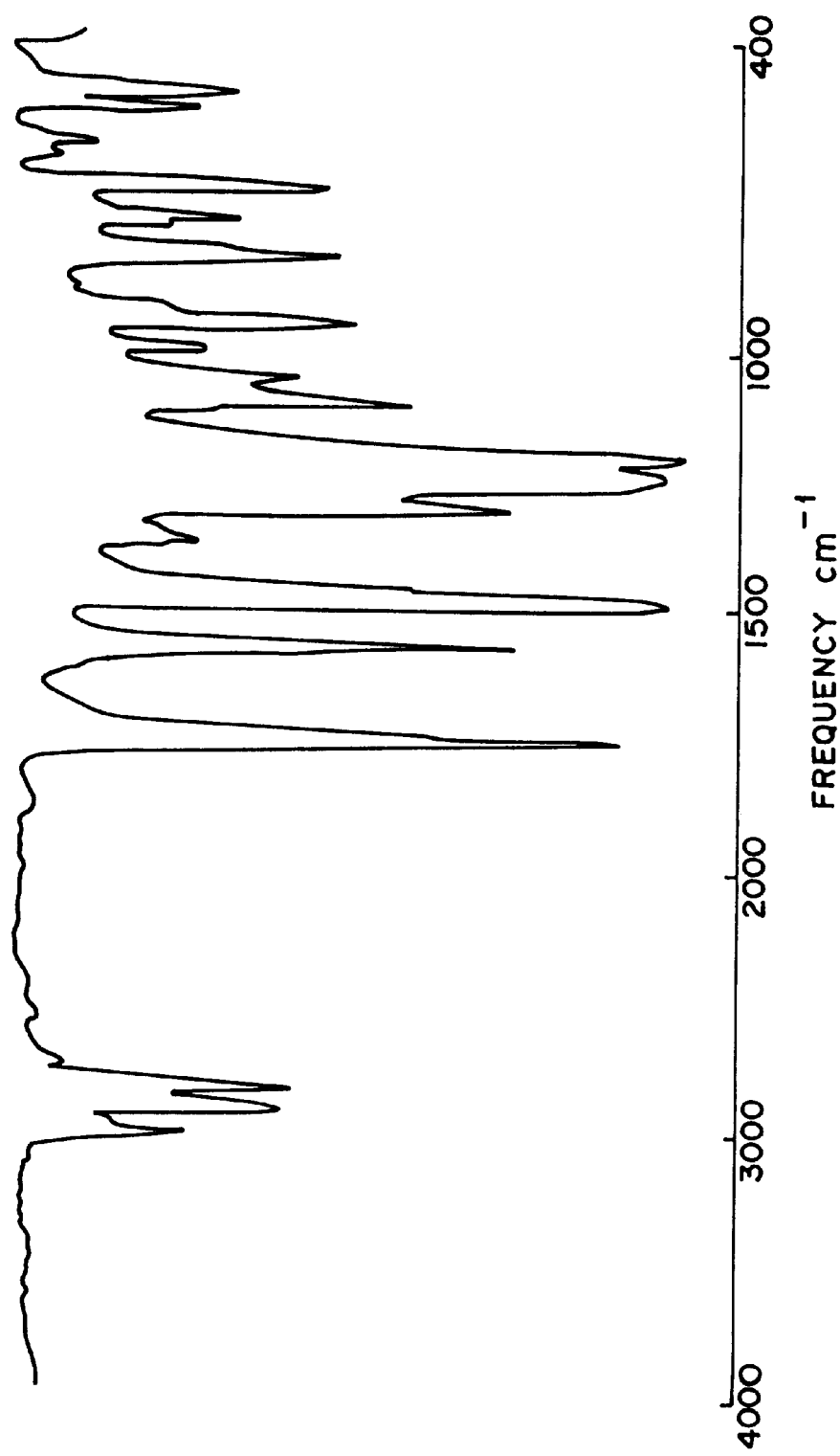
Figure 9:
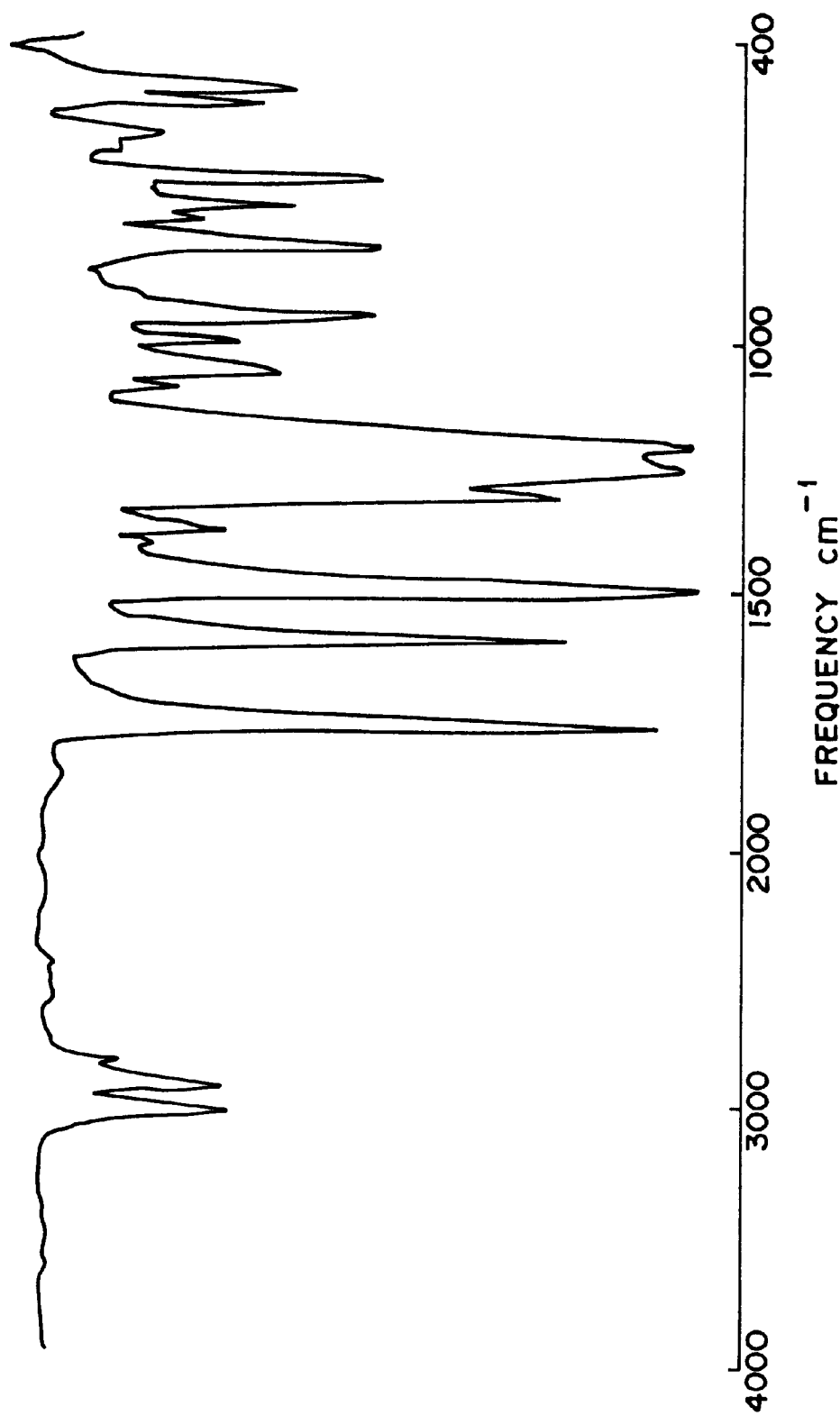
Figure 10:
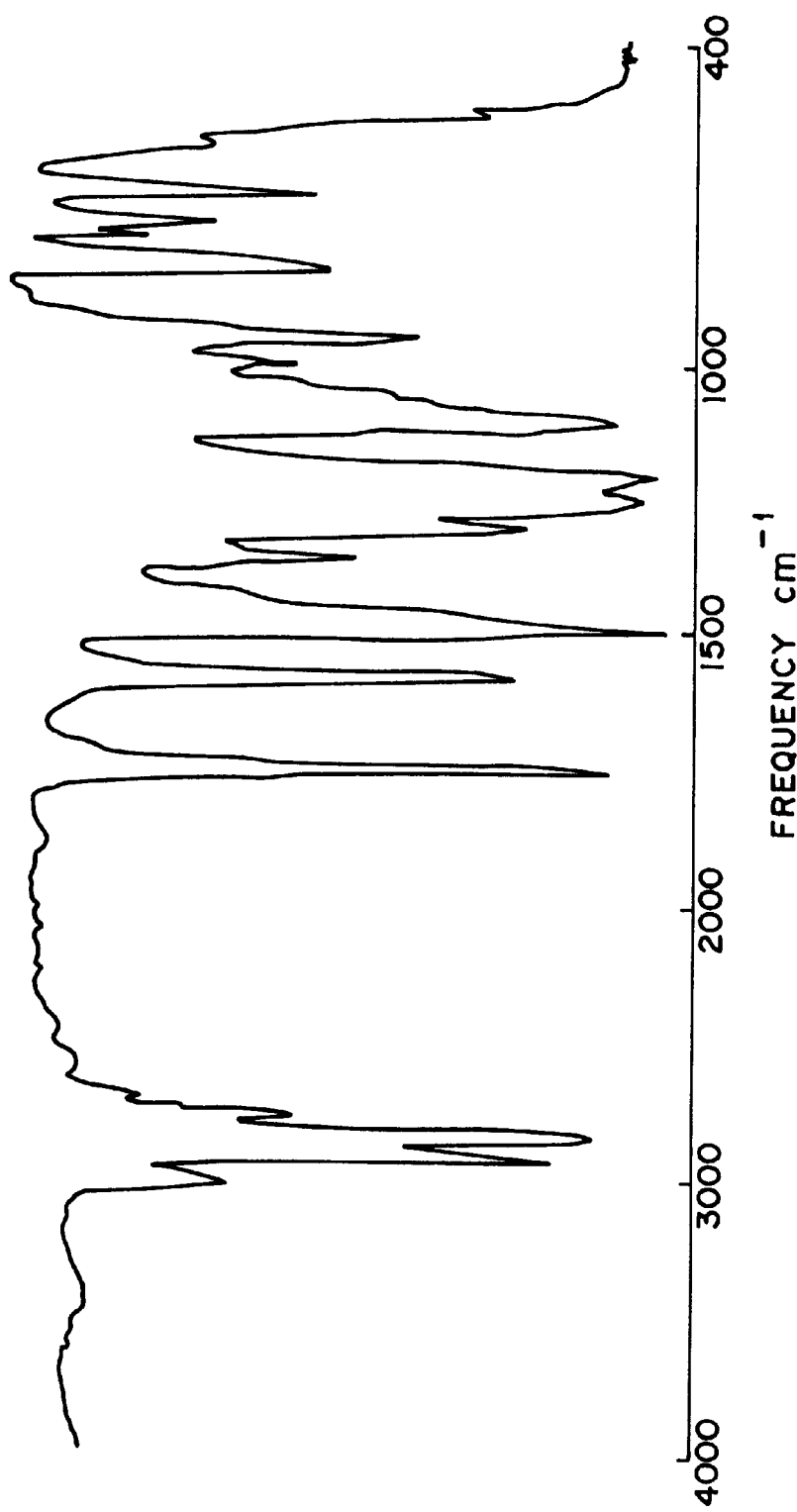
Figure 11:
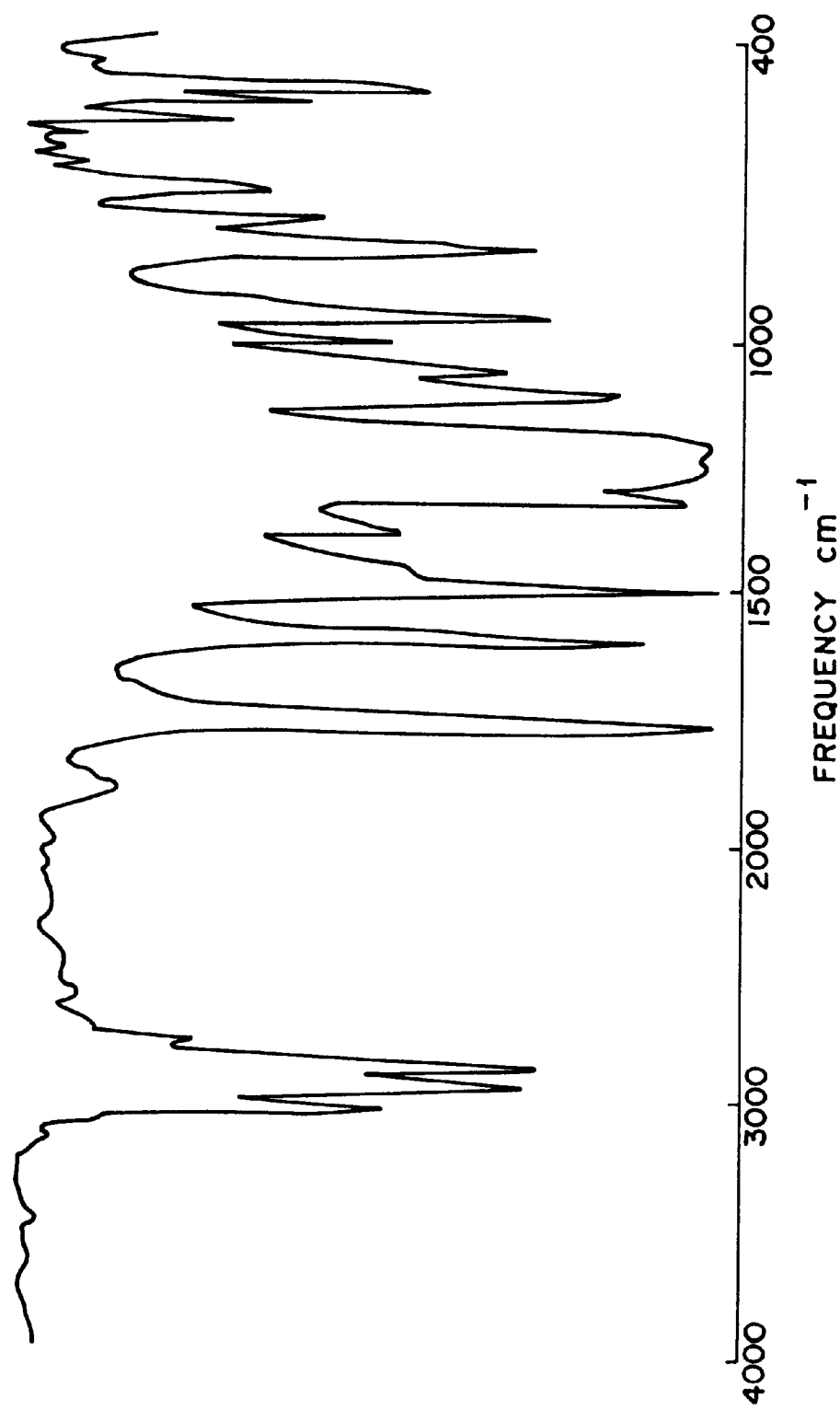
Figure 12:
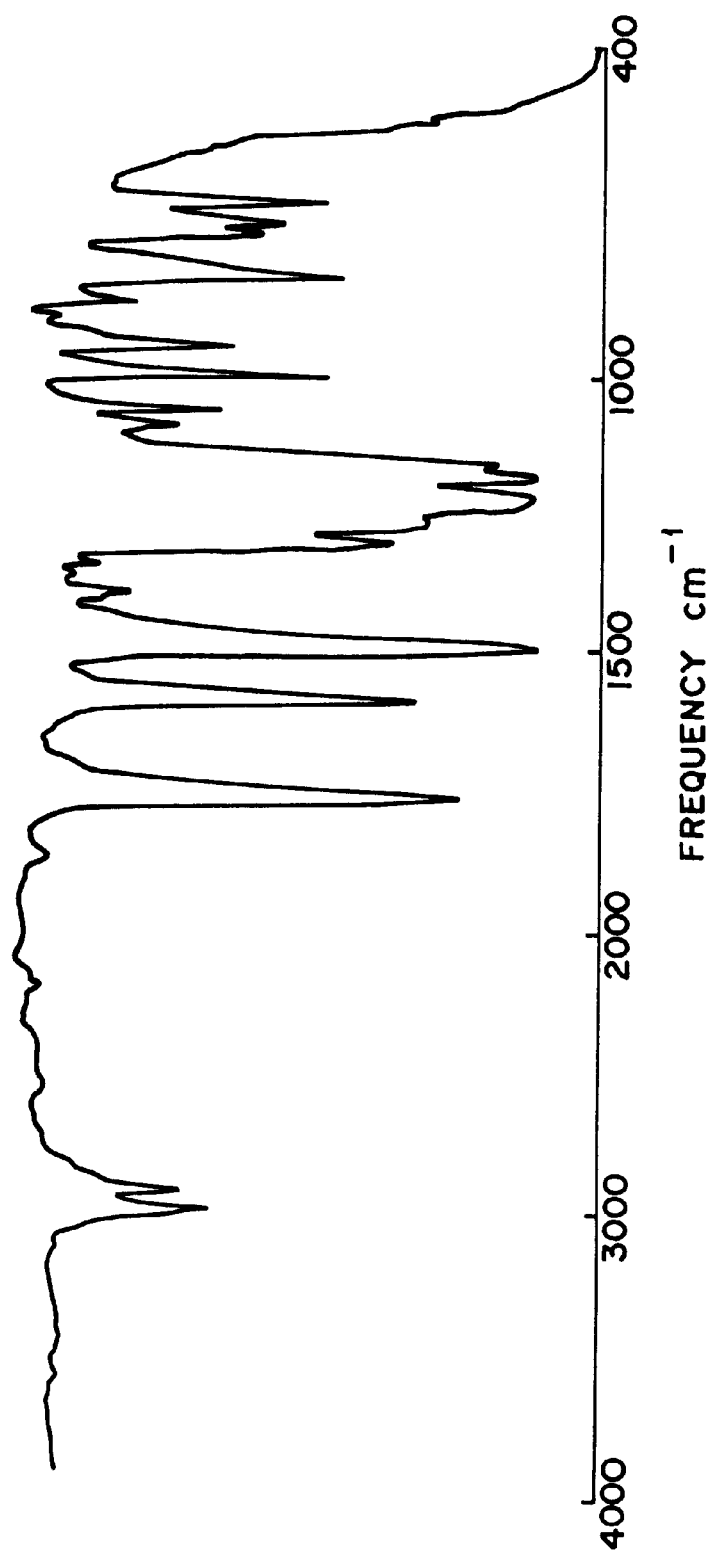
Figure 13:
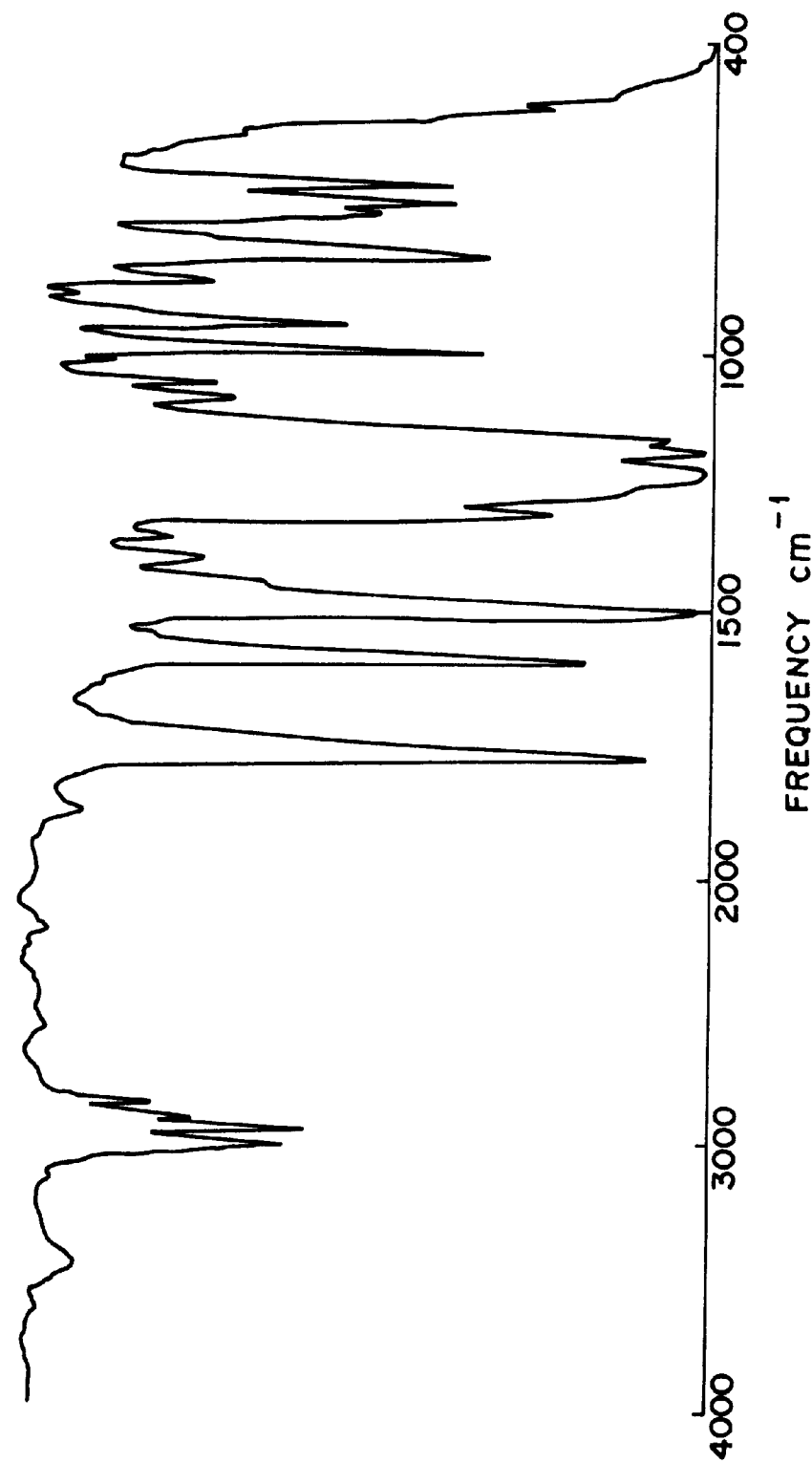
Figure 14:
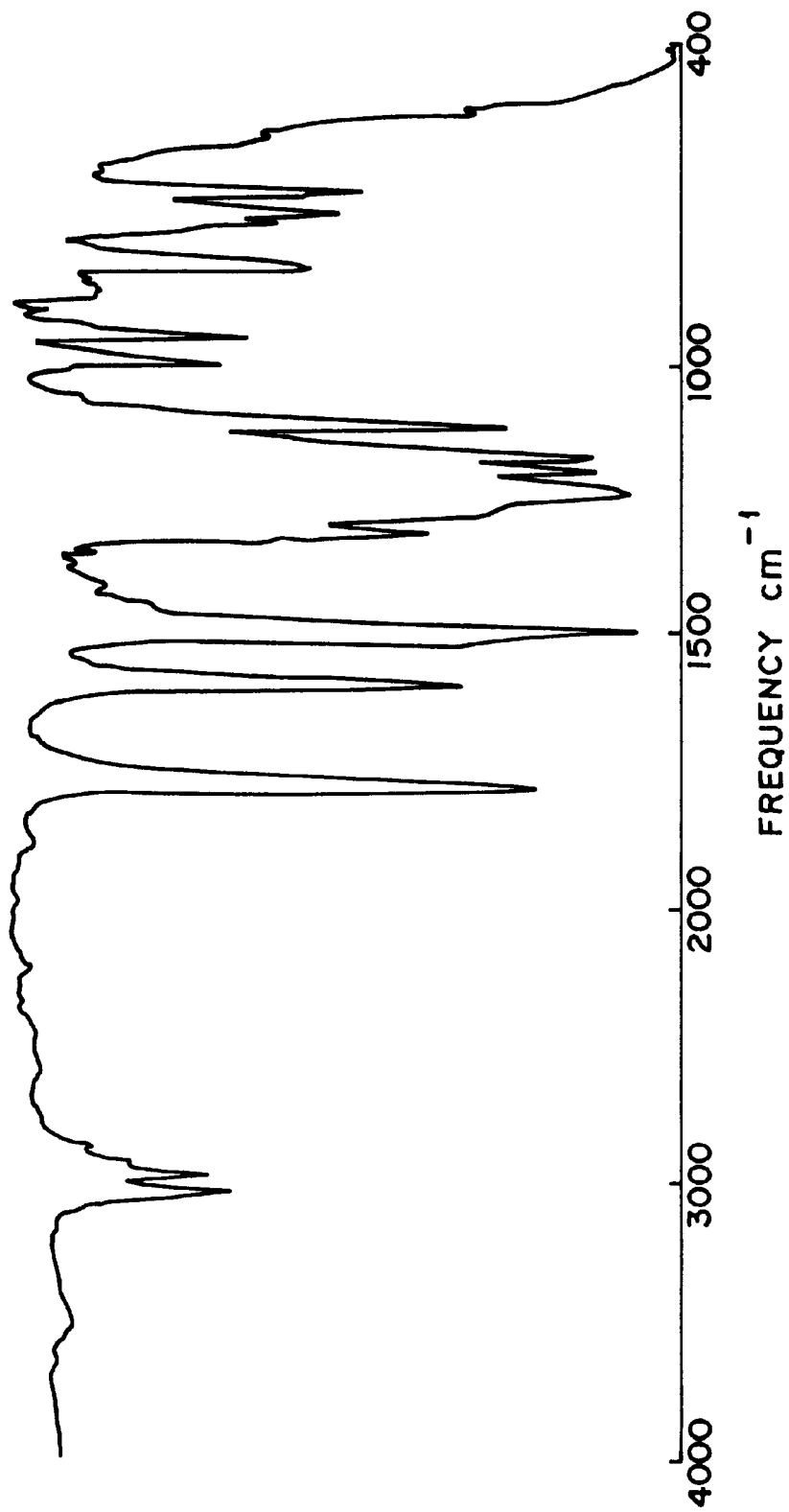
Figure 15:
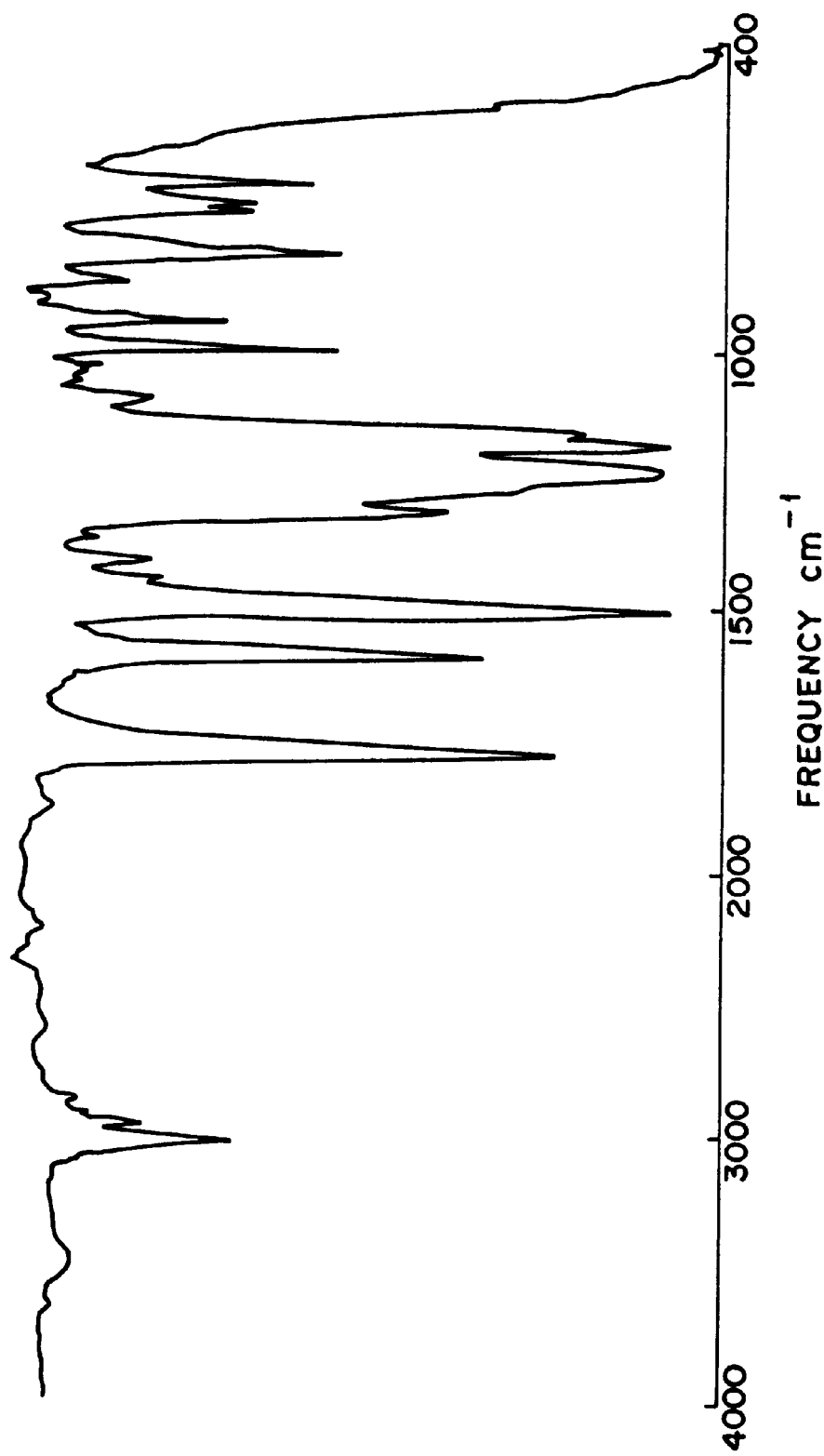
Figure 16:
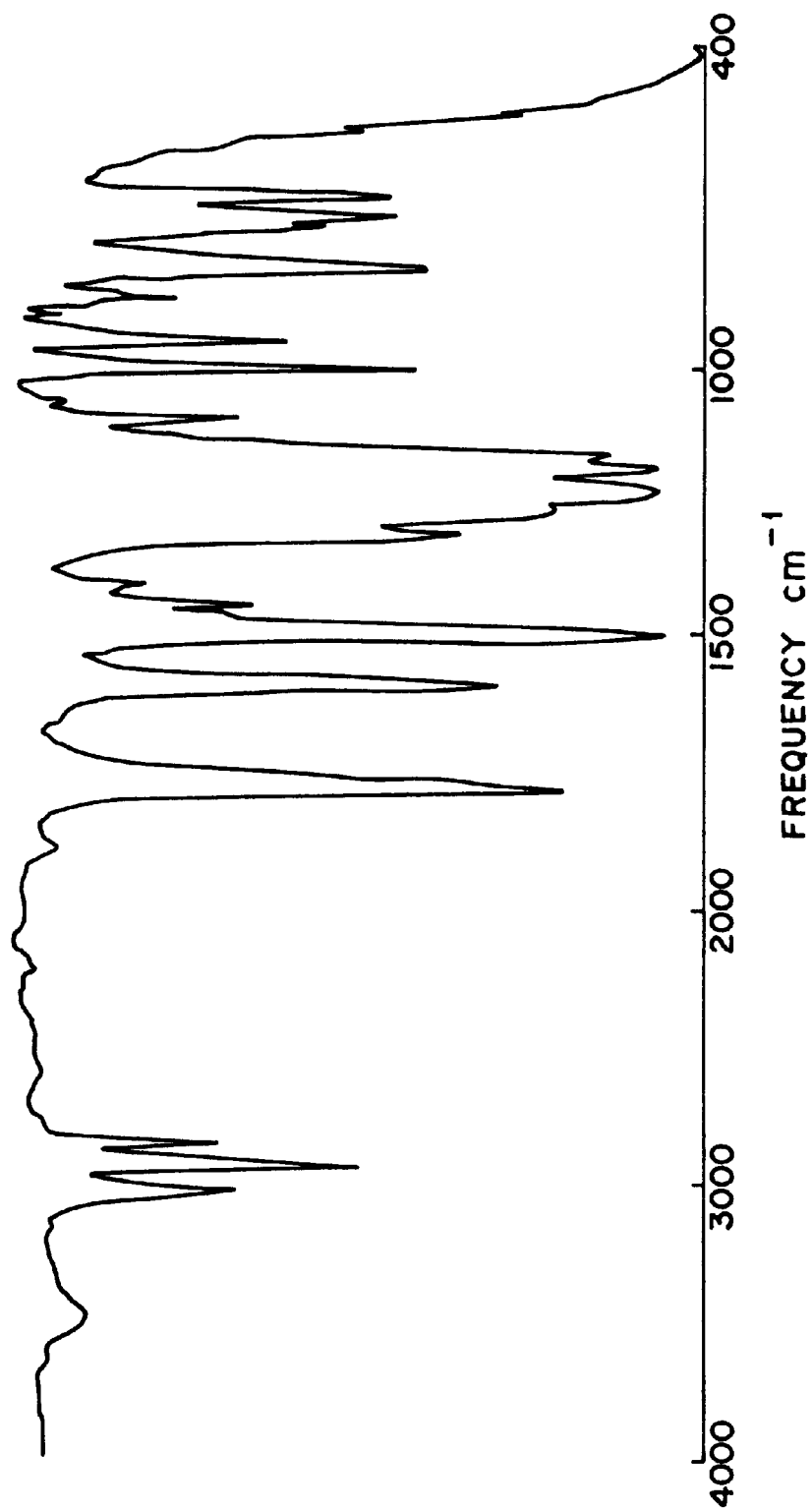

FIG. 8 shows an infrared spectrum of the aromatic polycarbonate resin (Compound No. 2), taken by use of an NaCl film.

The IR spectrum indicates the appearance of the characteristic absorption peak due to C=O stretching vibration of carbonate at 1760 cm$^{-1}$.

EXAMPLES 1-3 TO 1-10

Synthesis of Aromatic Polycarbonate Resins
(Compounds No. 3 to No. 10)

The procedure for preparation of the aromatic polycarbonate resin (Compound No. 1) in Example 1-1 was repeated except that diethylene glycol bis(chloroformate) used in Example 1-1 was replaced by the respective bis (chloroformate) compounds.

Thus, aromatic polycarbonate resins (Compound No. 3 to Compound No. 10) according to the present invention were obtained, each having a repeat unit as shown below.

[Compound No. 3] (c)

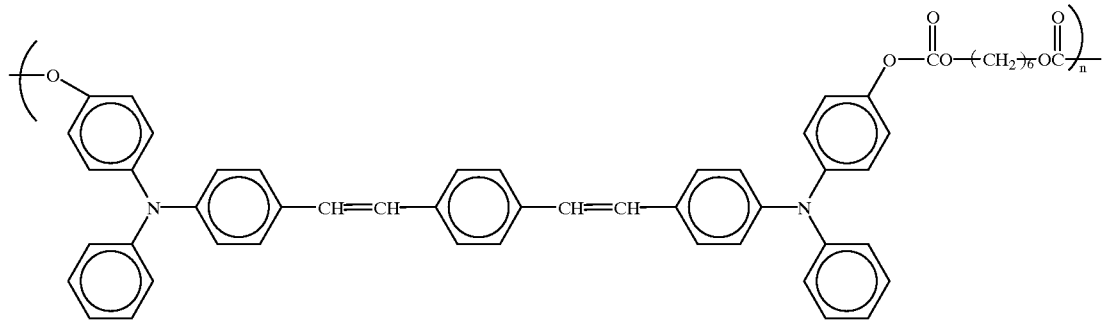

[Compound No. 4] (d)

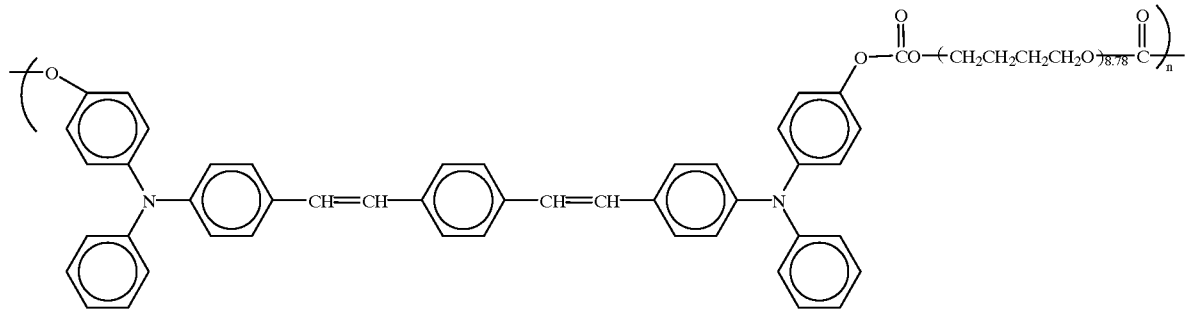

[Compound No. 5] (e)
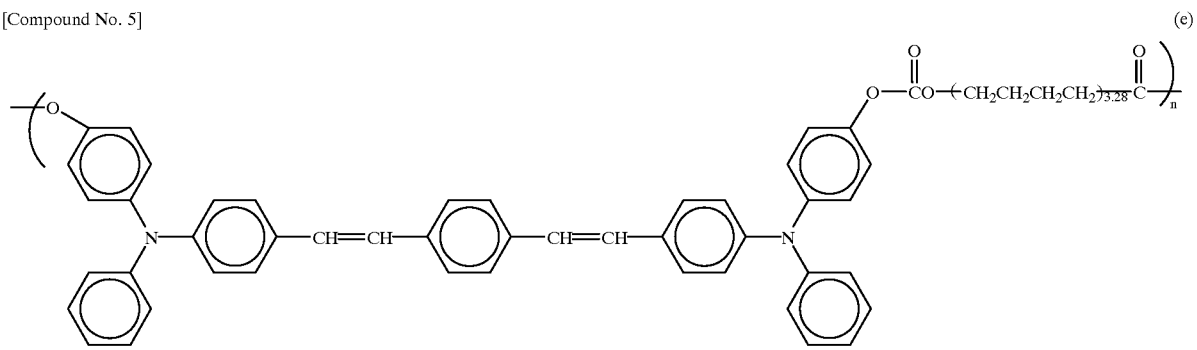
[Compound No. 6] (f)
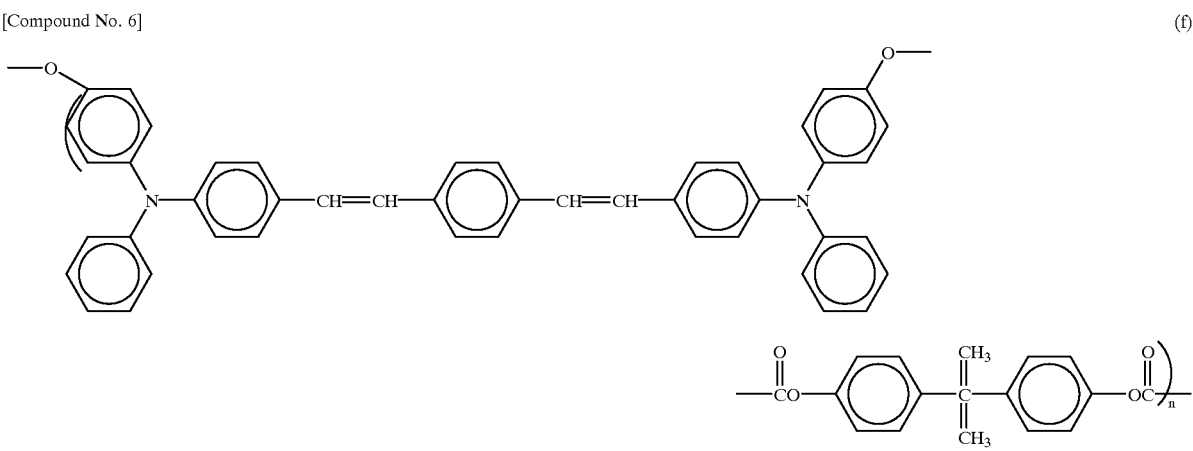
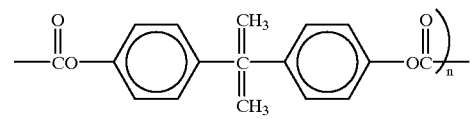
[Compound No. 7] (g)
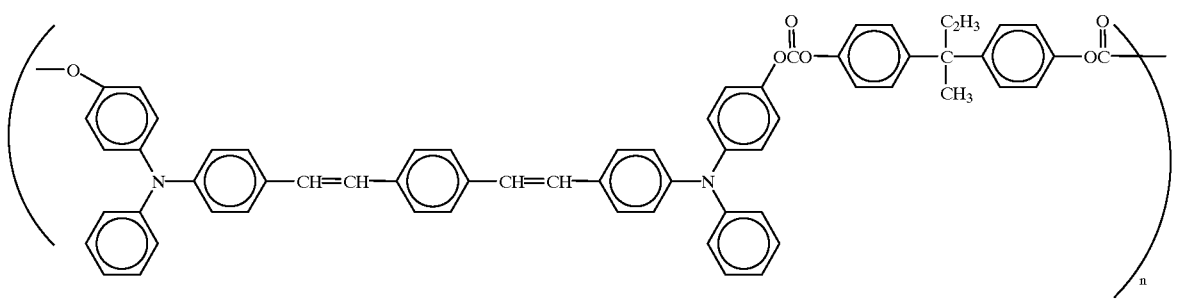
[Compound No. 8] (h)
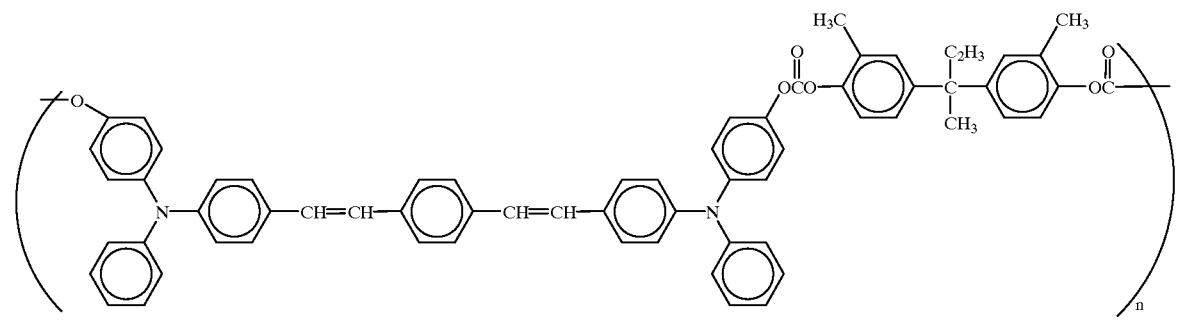

[Compound No. 9]

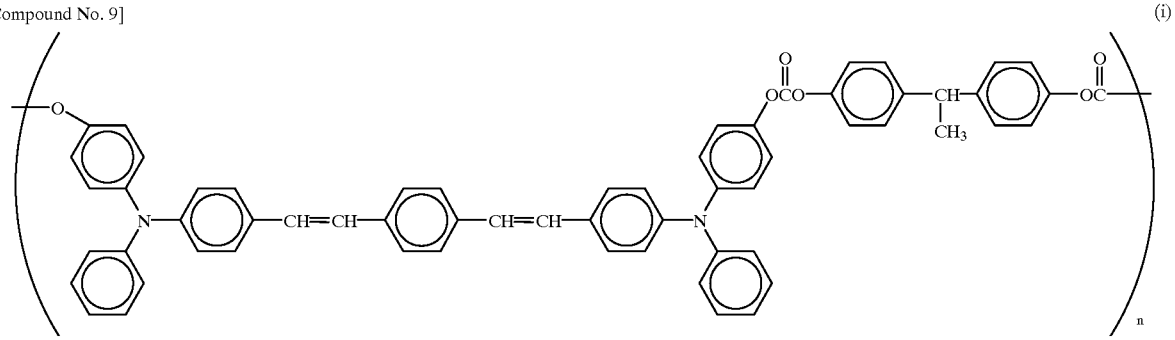

[Compound No. 10]

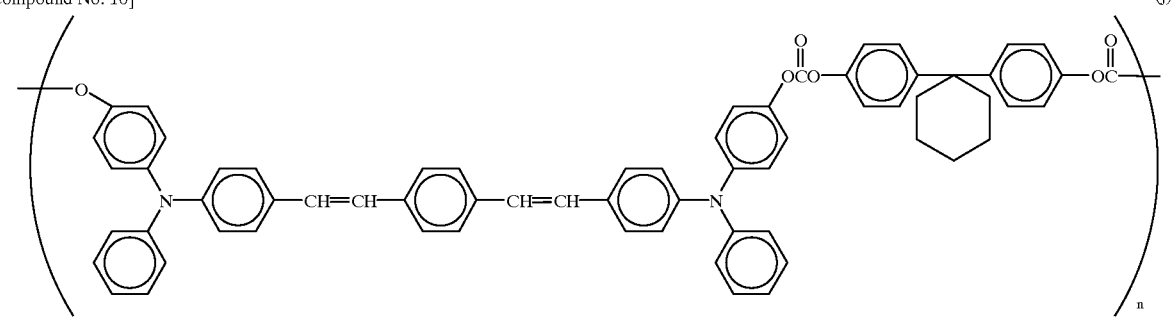

The glass transition temperature (Tg), the polystyrene-reduced number-average molecular weight (Mn), the polystyrene-reduced weight-average molecular weight (Mw), and the results of the elemental analysis of each of the obtained aromatic polycarbonate resins (Compounds No. 3 to No. 10) are shown in Table 1.

FIGS. 9 to 16 respectively show the infrared spectra of the aromatic polycarbonate resins (Compound No. 3 to Compound No. 10) obtained in Examples 1-3 to 1-10, taken by use of an NaCl film.

TABLE 1

| Example No. | Tg (° C.) | Molecular Weight(*) Mn | Molecular Weight(*) Mw | Elemental Analysis % C Found (Calcd.) | Elemental Analysis % H Found (Calcd.) | Elemental Analysis % N Found (Calcd.) |
|---|---|---|---|---|---|---|
| 1-3 | 138 | 41800 | 83200 | 79.1 (79.2) | 5.8 (5.6) | 3.3 (3.4) |
| 1-4 | <25 | 48800 | 94300 | 73.3 (73.9) | 7.9 (7.7) | 2.2 (2.1) |
| 1-5 | 90 | 40100 | 113100 | 77.0 (77.1) | 6.6 (6.5) | 3.0 (2.9) |
| 1-6 | 204.7 | 61400 | 135400 | 81.5 (81.4) | 5.3 (5.2) | 3.0 (3.0) |
| 1-7 | 178.0 | 15800 | 28100 | 80.6 (81.5) | 5.6 (5.3) | 2.4 (3.0) |
| 1-8 | 175.2 | 26400 | 46100 | 81.0 (81.6) | 5.6 (5.5) | 2.5 (2.9) |
| 1-9 | 175.1 | 17500 | 31900 | 80.6 (81.4) | 5.2 (5.1) | 2.5 (3.1) |
| 1-10 | 175.1 | 10900 | 20000 | 80.9 (81.8) | 5.7 (5.4) | 2.4 (2.9) |

(*)The molecular weight is expressed by a polystyrene-reduced value.

EXAMPLE 1-11

Synthesis of Aromatic Polycarbonate Resin (Compound No. 11)

6.52 g (0.01 mol) of 1,4-bis{4-[N-phenyl-N-(4-hydroxyphenyl)amino]phenethyl}benzene obtained in Preparation Example 2, represented by formula (12), and 3.04 g (0.03 mol) of triethylamine were dissolved in 50 ml of dry tetrahydrofuran to prepare a solution (a). A solution (b) prepared by dissolving 2.31 g (0.01 mol) of diethylene glycol bis(chloroformate) in 8 ml of dry tetrahydrofuran was added dropwise to the solution (a) over a period of 30 minutes under water-cooled condition.

After completion of the addition, the above obtained viscous reaction mixture was stirred for 15 minutes, and then a solution prepared by dissolving 0.1 g of phenol in 5 ml of dry tetrahydrofuran was added to the reaction mixture, followed by stirring for 5 minutes.

Thereafter, the obtained viscous reaction mixture was caused to precipitate in methanol, and a crude product was removed from the reaction mixture by filtration. The obtained product was purified by repeating the process of dissolving the product in tetrahydrofuran and precipitating it in methanol twice. Thereafter, the precipitated product was filtered off and dried, so that 7.31 g of an aromatic polycarbonate resin (Compound No. 11) according to the present invention having a repeat unit of the following formula (k) was obtained in a yield was 90.2%.

EXAMPLE 1-12

Synthesis of Aromatic Polycarbonate Resin (Compound No. 12)

6.52 g (0.01 mol) of 1,4-bis{4-[N-phenyl-N-(4-hydroxyphenyl)amino]phenethyl}benzene obtained in Preparation Example 2, represented by formula (12), and

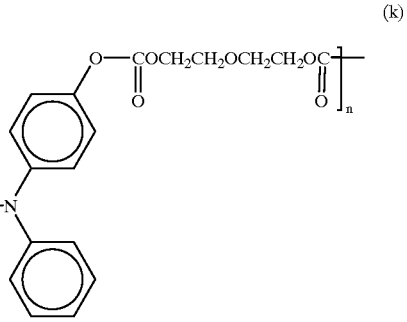

(k)

The polystyrene-reduced number-average molecular weight and weight-average molecular weight, which were measured by the gel permeation chromatography, were respectively 40,500 and 203,700.

The glass transition temperature of the above prepared polycarbonate resin was 103° C.

The results of the elemental analysis of the thus obtained compound are as follows:

| | Elemental analysis: | | |
|---|---|---|---|
| | % C | % H | % N |
| Found | 76.7 | 5.7 | 3.8 |
| Calcd. | 77.0 | 5.7 | 3.5 |

3.04 g (0.03 mol) of triethylamine were dissolved in 50 ml of dry tetrahydrofuran to prepare a solution (a). A solution (b) prepared by dissolving 3.79 g (0.01 mol) of polytetramethylene ether glycol bis(chloroformate), which was prepared from polytetramethylene ether glycol with an average molecular weight of 250, in 8 ml of dry tetrahydrofuran was added dropwise to the solution (a) over a period of 30 minutes under water-cooled condition.

After completion of the addition, the above obtained viscous reaction mixture was stirred for 15 minutes, and then a solution prepared by dissolving 0.1 g of phenol in 5 ml of dry tetrahydrofuran was added to the reaction mixture, followed by stirring for 5 minutes.

Thereafter, the obtained viscous reaction mixture was caused to precipitate in methanol, and a crude product was removed from the reaction mixture by filtration. The obtained product was purified by repeating the process of dissolving the product in tetrahydrofuran and precipitating it in methanol twice. Thereafter, the precipitated product was filtered off and dried, so that 8.72 g of an aromatic polycarbonate resin (Compound No. 12) according to the present invention having a repeat unit of the following formula (l) was obtained in a yield was 91.0%.

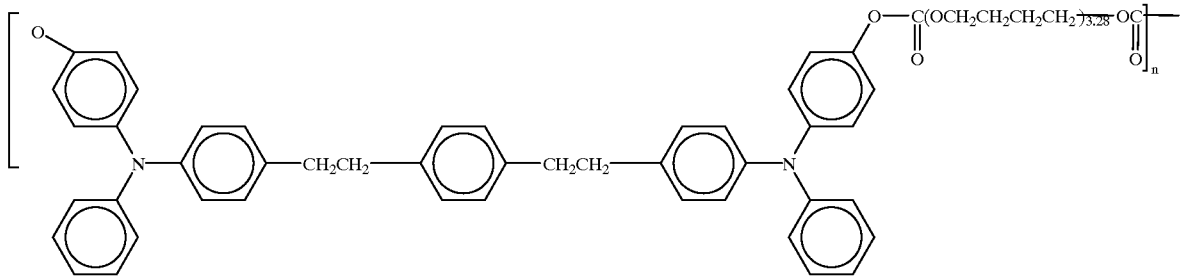

(l)

Figure 17:
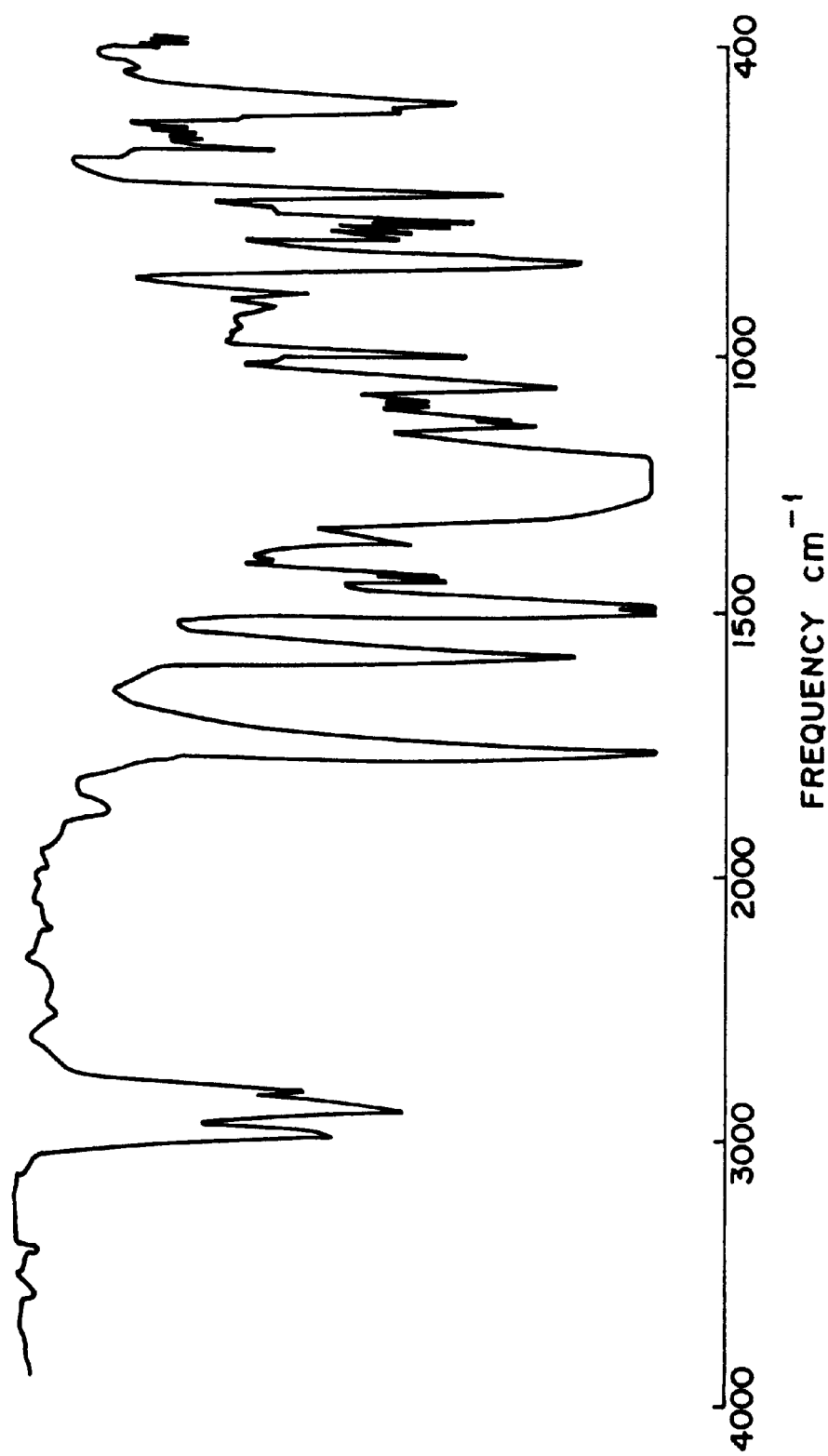
FIGS. 17 to 21 are IR spectra of aromatic polycarbonate resins (Compound Nos. 11 to 15) respectively synthesized in Example 1-11 to 1-15 according to the present invention, taken by use of an NaCl film.

FIG. 17 shows an infrared spectrum of the aromatic polycarbonate resin (Compound No. 11), taken by use of an NaCl film.

The IR spectrum indicates the appearance of the characteristic absorption peak due to C=O stretching vibration of carbonate at 1760 cm$^{-1}$.

The polystyrene-reduced number-average molecular weight and weight-average molecular weight, which were measured by the gel permeation chromatography, were respectively 36,900 and 117,700.

The glass transition temperature of the above prepared polycarbonate resin was 57° C.

The results of the elemental analysis of the thus obtained compound are as follows:

| | Elemental analysis: | | |
|---|---|---|---|
| | % C | % H | % N |
| Found | 76.6 | 6.7 | 3.1 |
| Calcd. | 76.6 | 6.7 | 2.9 |

Figure 18:
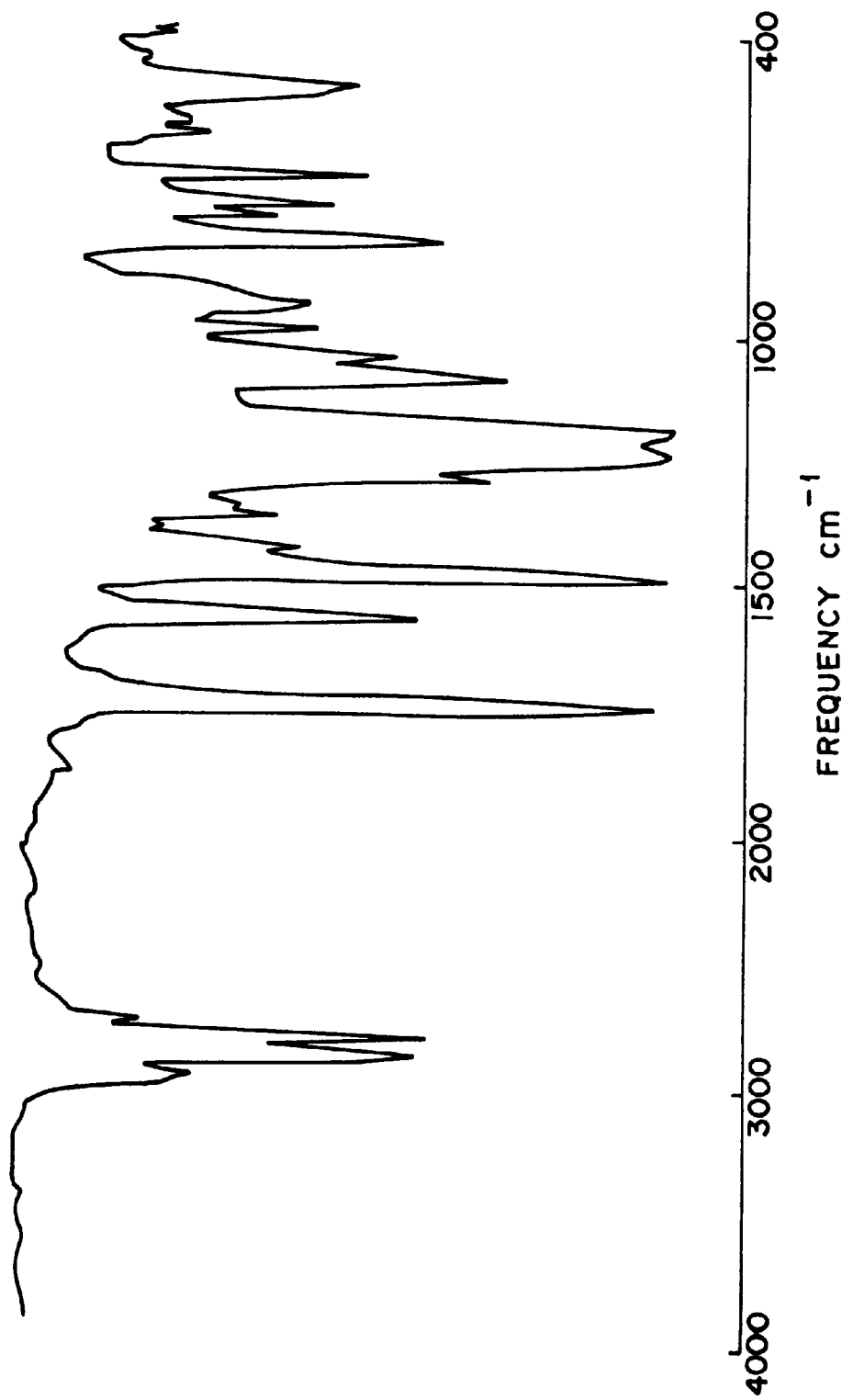

FIG. 18 shows an infrared spectrum of the aromatic polycarbonate resin (Compound No. 12), taken by use of an NaCl film.

The IR spectrum indicates the appearance of the characteristic absorption peak due to C=O stretching vibration of carbonate at 1755 cm$^{-1}$.

EXAMPLE 1-13

Synthesis of Aromatic Polycarbonate Resin (Compound No. 13)

6.52 g (0.01 mol) of 1,4-bis{4-[N-phenyl-N-(4-hydroxyphenyl)amino]phenethyl}benzene obtained in Preparation Example 2, represented by formula (12), and 3.04 g (0.03 mol) of triethylamine were dissolved in 50 ml of dry tetrahydrofuran to prepare a solution (a). A solution (b) prepared by dissolving 0.99 g (0.005 mol) of trichloromethyl chloroformate in 8 ml of dry tetrahydrofuran was added dropwise to the solution (a) over a period of 30 minutes under water-cooled condition.

After completion of the addition, the above obtained viscous reaction mixture was stirred for 15 minutes, and then a solution prepared by dissolving 0.1 g of phenol in 5 ml of dry tetrahydrofuran was added to the reaction mixture, followed by stirring for 5 minutes.

Thereafter, the obtained viscous reaction mixture was caused to precipitate in methanol, and a crude product was removed from the reaction mixture by filtration. The obtained product was purified by repeating the process of dissolving the product in dichloromethane and precipitating it in methanol twice. Thereafter, the precipitated product was filtered off and dried, so that 6.17 g of an aromatic polycarbonate resin (Compound No. 13) according to the present invention having a repeat unit of the following formula (m) was obtained in a yield was 91.0%.

The polystyrene-reduced number-average molecular weight and weight-average molecular weight, which were measured by the gel permeation chromatography, were respectively 38,800 and 176,500.

The glass transition temperature of the above prepared polycarbonate resin was 146° C.

The results of the elemental analysis of the thus obtained compound are as follows:

| | Elemental analysis: | | |
|---|---|---|---|
| | % C | % H | % N |
| Found | 83.4 | 5.7 | 4.1 |
| Calcd. | 83.2 | 5.6 | 4.1 |

Figure 19:
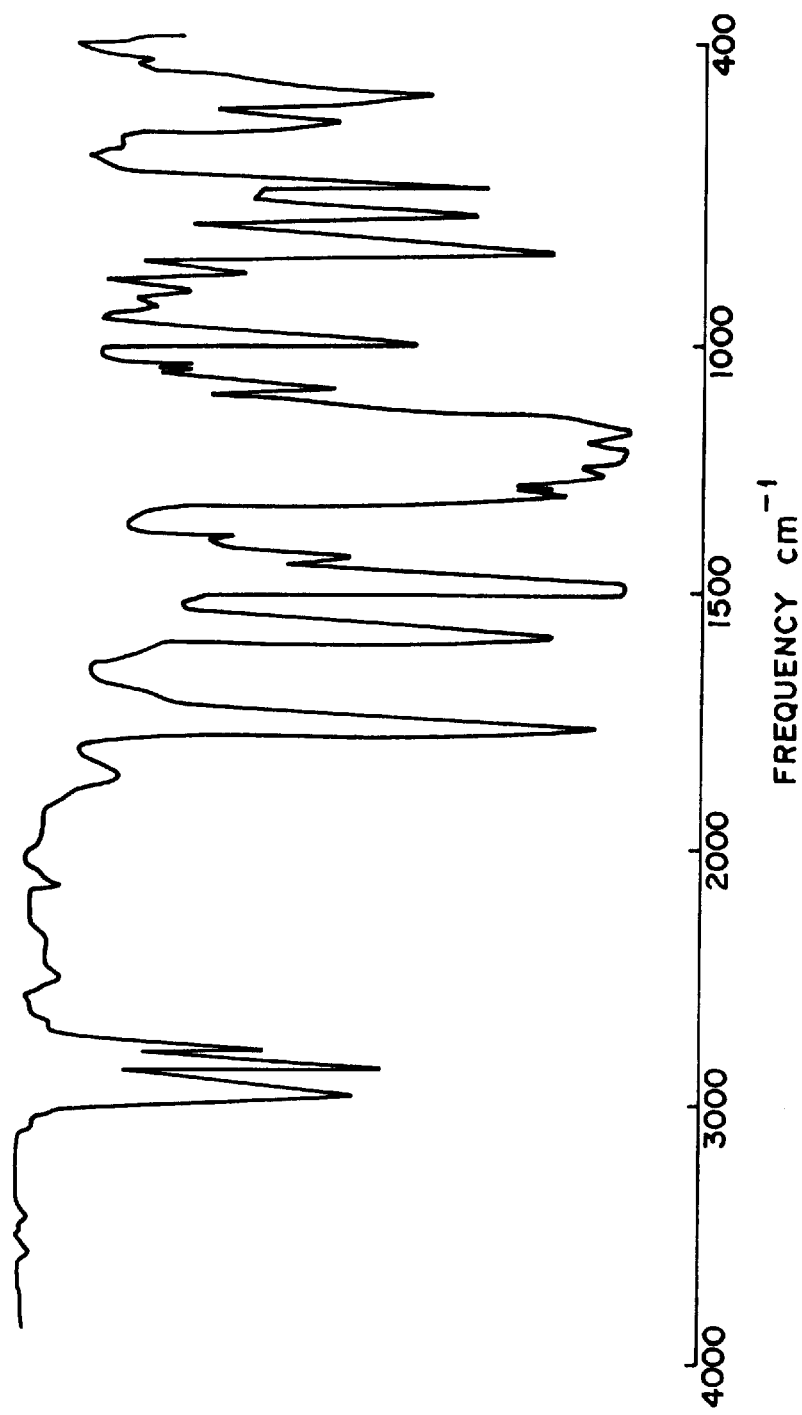

FIG. 19 shows an infrared spectrum of the aromatic polycarbonate resin (Compound No. 13), taken by use of an NaCl film.

The IR spectrum indicates the appearance of the characteristic absorption peak due to C=O stretching vibration of carbonate at 1770 cm$^{-1}$.

EXAMPLES 1-14 AND 1-15

Synthesis of Aromatic Polycarbonate Resins (Compounds No. 14 and No. 15)

The procedure for preparation of the aromatic polycarbonate resin (Compound No. 11) in Example 1-11 was repeated except that diethylene glycol bis(chloroformate) used in Example 1-11 was replaced by the respective bis(chloroformate) compounds.

Thus, aromatic polycarbonate resins (Compound No. 14 and Compound No. 15) according to the present invention were obtained, each having a repeat unit as shown below.

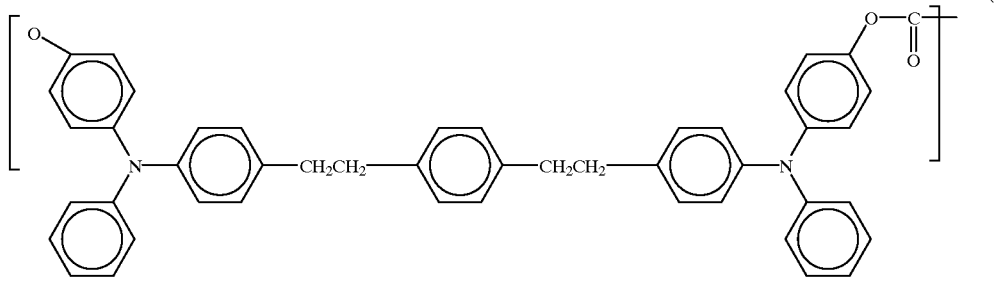

(m)

[Compound No. 14]

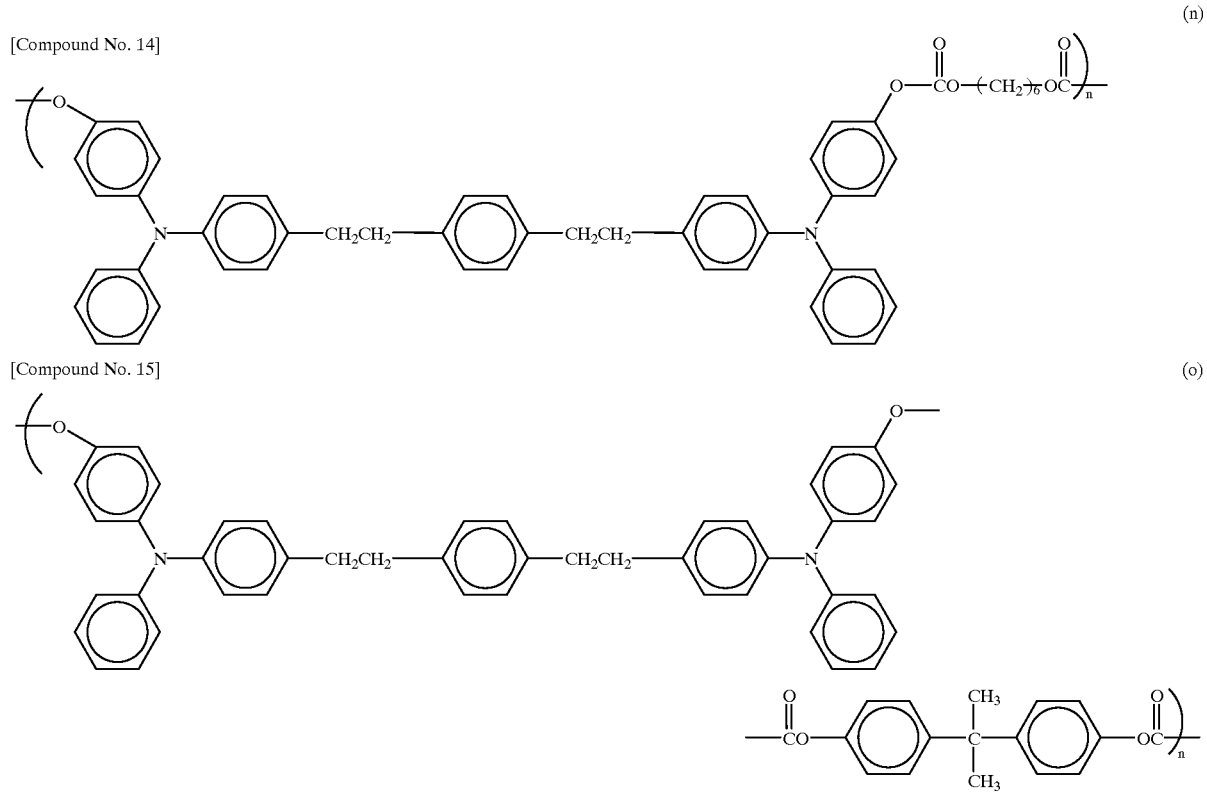

[Compound No. 15]

The glass transition temperature (Tg), the polystyrene-reduced number-average molecular weight (Mn), the polystyrene-reduced weight-average molecular weight (Mw), and the results of the elemental analysis of each of the obtained aromatic polycarbonate resins (Compounds No. 14 and No. 15) are shown in Table 2.

Figure 20:
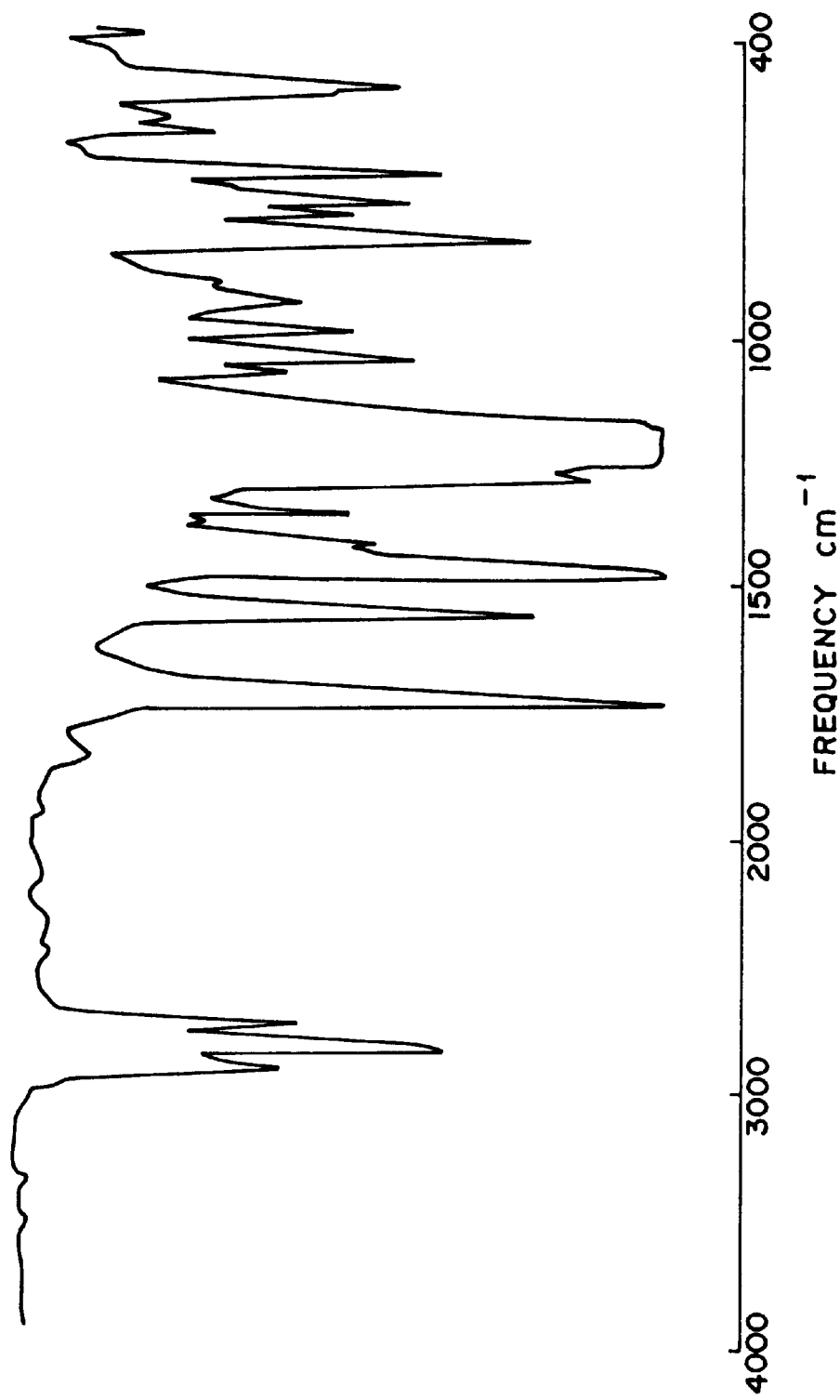
Figure 21:
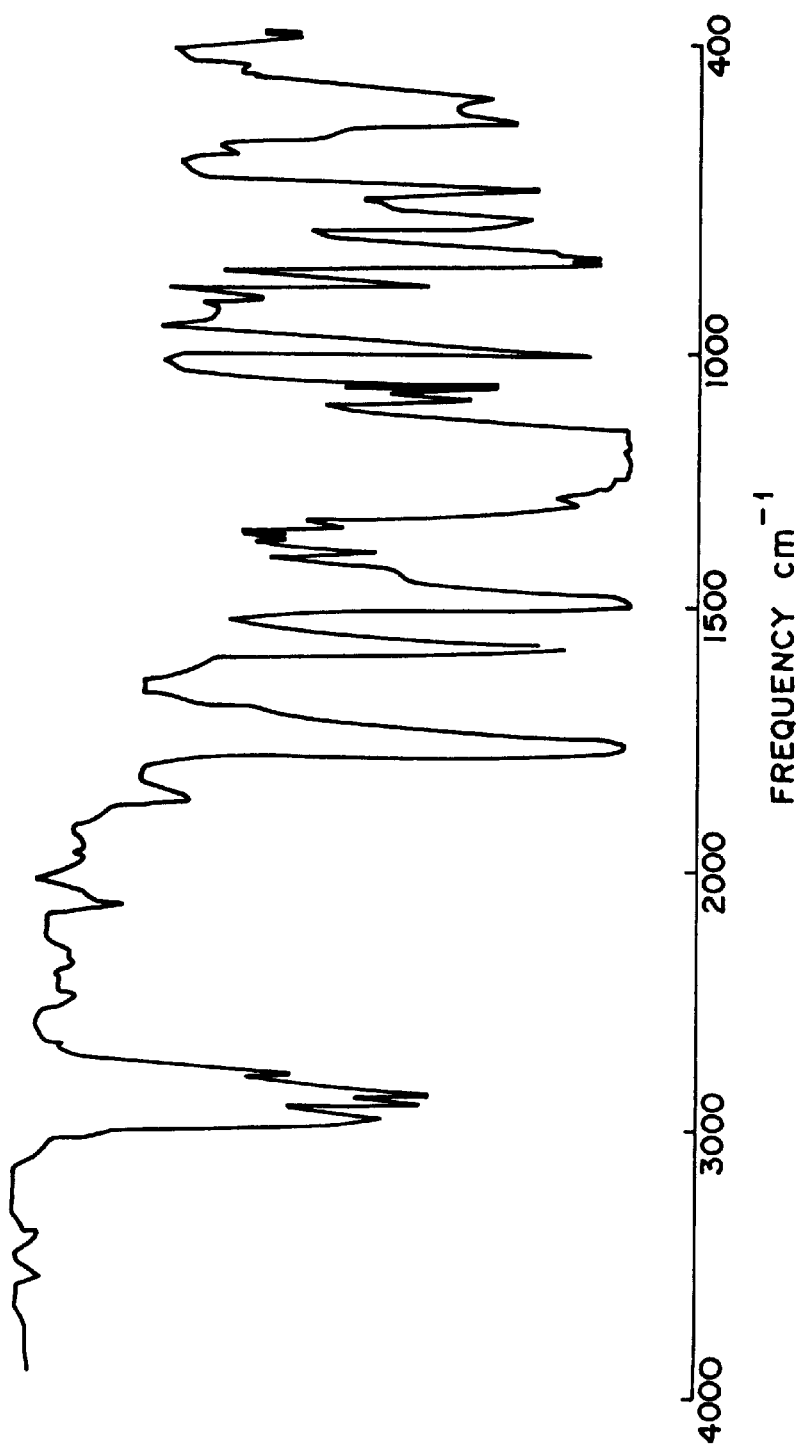

FIGS. 20 and 21 respectively show the infrared spectra of the aromatic polycarbonate resins (Compound No. 14 and Compound No. 15) obtained in Examples 1-14 and 1-15, taken by use of an NaCl film.

TABLE 2

| Example No. | Tg (°C.) | Molecular Weight(*) Mn | Molecular Weight(*) Mw | Elemental Analysis % C Found (Calcd.) | Elemental Analysis % H Found (Calcd.) | Elemental Analysis % N Found (Calcd.) |
|---|---|---|---|---|---|---|
| 1-14 | 97 | 48000 | 160000 | 78.7 (78.8) | 6.2 (6.1) | 3.4 (3.4) |
| 1-15 | 145 | 80000 | 182600 | 81.0 (81.1) | 5.7 (5.6) | 2.8 (3.0) |

(*)The molecular weight is expressed by a polystyrene-reduced value.

EXAMPLE 2-1

Fabrication of Photoconductor No. 1

(Formation of Intermediate Layer)

A commercially available polyamide resin (Trademark "CM-8000", made to Toray Industries, Inc.) was dissolved in a mixed solvent of methanol and butanol, so that a coating liquid for an intermediate layer was prepared.

The thus prepared coating liquid was coated on an aluminum plate by a doctor blade, and dried at room temperature, so that an intermediate layer with a thickness of 0.3 μm was provided on the aluminum plate.

(Formation of Charge Generation Layer)

A coating liquid for a charge generation layer was prepared by dispersing a bisazo compound of the following formula, serving as a charge generation material, in a mixed solvent of cyclohexanone and methyl ethyl ketone in a ball mill. The thus obtained coating liquid was coated on the above prepared intermediate layer by a doctor blade, and dried at room temperature. Thus, a charge generation layer with a thickness of about 1 μm was formed on the intermediate layer.

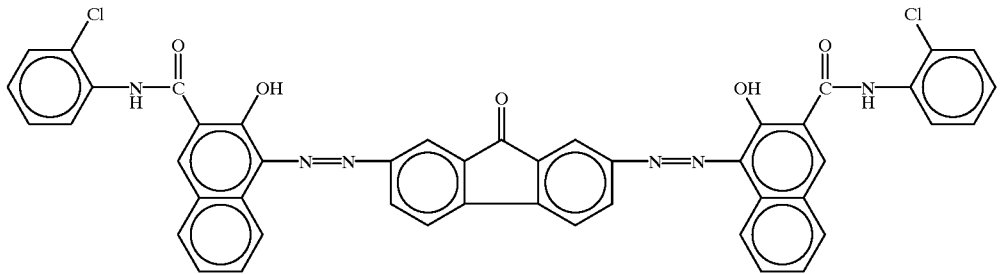

(Formation of Charge Transport Layer)

The aromatic polycarbonate resin (Compound No. 11) of the present invention prepared in Example 1-11, which served as a charge transport material, was dissolved in dichloromethane. The thus obtained coating liquid was coated on the above prepared charge generation layer by a doctor blade, and dried at room temperature and then at 120° C. for 20 minutes, so that a charge transport layer with a thickness of about 20 μm was provided on the charge generation layer.

Thus, an electrophotographic photoconductor No. 1 according to the present invention was fabricated.

EXAMPLES 2-2 TO 2-15

The procedure for fabrication of the layered electrophotographic photoconductor No. 1 in Example 2-1 was repeated except that the aromatic polycarbonate resin (Compound No. 11) for use in the charge transport layer coating liquid in Example 2-1 was replaced by each of the aromatic polycarbonate resins as shown in Table 3.

Thus, electrophotographic photoconductors No. 2 to No. 15 according to the present invention were fabricated.

Each of the electrophotographic photoconductors No. 1 through No. 15 according to the present invention obtained in Examples 2-1 to 2-15 was charged negatively in the dark under application of −6 kV of corona charge for 20 seconds, using a commercially available electrostatic copying sheet testing apparatus ("Paper Analyzer Model SP-438" made by Kawaguchi Electro Works Co., Ltd.). Then, each electrophotographic photoconductor was allowed to stand in the dark for 20 seconds without applying any charge thereto, and the surface potential Vo (V) of the photoconductor was measured. Each photoconductor was then illuminated by a tungsten lamp in such a manner that the illuminance on the illuminated surface of the photoconductor was 4.5 lux, and the exposure $E_{1/2}$ (lux*sec) required to reduce the initial surface potential Vo (V) to ½ the initial surface potential Vo (V) was measured. The results are shown in Table 3.

TABLE 3

| Example No. | Aromatic Polycarbonate Resin (Compound No.) | −VO (V) | $E_{1/2}$ (lux · sec) |
|---|---|---|---|
| 2-1 | No. 11 | 1149 | 1.14 |
| 2-2 | No. 1 | 313 | 0.45 |
| 2-3 | No. 14 | 1218 | 1.15 |
| 2-4 | No. 3 | 849 | 0.85 |
| 2-5 | No. 12 | 1012 | 0.94 |
| 2-6 | No. 2 | 737 | 0.76 |
| 2-7 | No. 15 | 1543 | 1.89 |
| 2-8 | No. 4 | 37 | 0.82 |
| 2-9 | No. 13 | 1432 | 1.43 |

TABLE 3-continued

| Example No. | Aromatic Polycarbonate Resin (Compound No.) | −VO (V) | $E_{1/2}$ (lux · sec) |
|---|---|---|---|
| 2-10 | No. 5 | 299 | 0.40 |
| 2-11 | No. 6 | 978 | 1.03 |
| 2-12 | No. 10 | 848 | 1.01 |
| 2-13 | No. 8 | 1245 | 1.25 |
| 2-14 | No. 9 | 1127 | 1.28 |
| 2-15 | No. 7 | 1257 | 1.31 |

EXAMPLE 1–16

The procedure for fabrication of the layered electrophotographic photoconductor No. 1 in Example 2-1 was repeated except that the bisazo compound serving as the charge generation material for use in the charge generation layer coating liquid in Example 2-1 was replaced by a trisazo compound of the following formula, and that the aromatic polycarbonated resin (Compound No. 11) for use in the charge transport layer coating liquid in Examples 2-1 was replaced by the aromatic polycarbonate resin (Compound No. 2) prepared in Example 1-2.

[Trisazo compound]

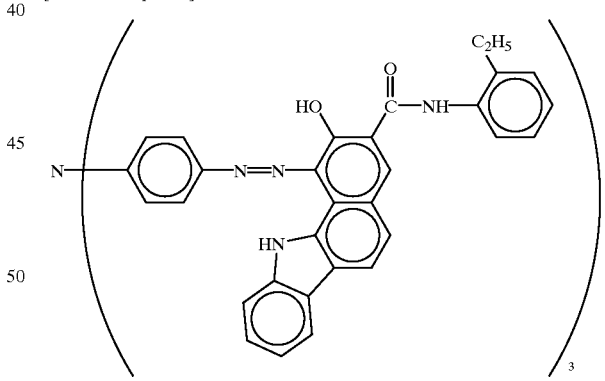

Thus, an electrophotographic photoconductor No. 16 according to the present invention was fabricated.

The thus fabricated electrophotographic photoconductor No. 16 according to the present invention obtained in Examples 2–16 was charged negatively in the dark under application of −6 kV of corona charge for 20 seconds, using a commercially available electrostatic copying sheet testing apparatus ("Paper Analyzer Model EPA-8100" made by Kawaguchi Electro Work Co., Ltd.). Then, the electrophotographic photoconductor was allowed to stand in the dark for 20 seconds without applying any charge thereto, and the surface potential Vo (V) of the photoconductor was measured. Each photoconductor was then illuminated by a monochromatic light of 780 nm in such a manner that the illuminance on the illuminated surface of the photoconductor was 5 μmW/cm$^2$, and the exposure $E_{1/2}$ (μJ/cm$^2$) required to reduce the initial surface potential Vo (V) to ½ the initial surface potential Vo (V) was measured. The results are as follows:

−Vo (V): 1044

$E_{1/2}$ (μJ/cm$^2$): 0.85

Furthermore, each of the above obtained electrophotographic photoconductors No. 1 to No. 16 was set in a commercially available electrophotographic copying machine, and the photoconductor was charged and exposed to light images via the original images to form latent electrostatic images thereon. Then, the latent electrostatic images formed on the photoconductor were developed into visible toner images by a dry developer, and the visible toner images were transferred to a sheet of plain paper and fixed thereon. As a result, clear toner images were obtained on the paper. When a wet developer was employed for the image formation, clear images were formed on the paper similarly.

As previously explained, the polycarbonate resin for use in the photoconductive layer of the electrophotographic photoconductor according to the present invention is: a homopolymer comprising a structural unit of formula (I); a random copolymer comprising a structural unit of formula (I) and a structural unit of formula (II); and an alternating copolymer comprising a repeat unit of formula (III). Any of the above-mentioned aromatic polycarbonate resins have the charge transporting properties and high mechanical strength, so that the photosensitivity and durability of the photoconductor are sufficiently high.

Japanese Patent Application No. 07-165977 filed Jun. 30, 1995, Japanese Patent Application No. 07-207817 filed Jul. 21, 1995, Japanese Patent Application No. 07-199943 filed Aug. 4, 1995, Japanese Patent Application No. 07-223641 filed Aug. 31, 1995, Japanese Patent Application No. 08-166238 filed Jun. 26, 1996, Japanese Patent Application No. 08-167566 filed Jun. 27, 1996 and Japanese Patent Application filed Jun. 28, 1996 are hereby incorporated by reference.

What is claimed is:

1. An aromatic polycarbonate resin comprising a structural unit of formula (I)-1:

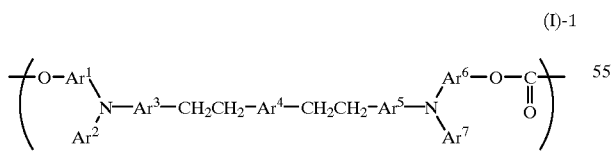

wherein Ar$^1$, Ar$^3$, Ar$^4$, Ar$^5$ and Ar$^6$ each may be the same or different, and is an arylene group which may have a substituent; and Ar$^2$ and Ar$^7$ each may be the same or different, and is an aryl group which may have a substituent.

2. An aromatic polycarbonate resin comprising a structural unit of formula (I)-1 and a structural unit of formula (II):

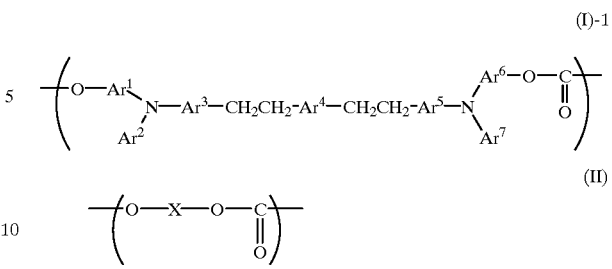

wherein Ar$^1$, Ar$^3$, Ar$^4$, Ar$^5$ and Ar$^6$ each may be the same or different, and is an arylene group which may have a substituent; Ar$^2$ and Ar$^7$ each may be the same or different, and is an aryl group which may have a substituent; and X is a bivalent aliphatic group, a bivalent cyclic aliphatic group, a bivalent aromatic group, a bivalent group prepared by bonding any of said bivalent groups,

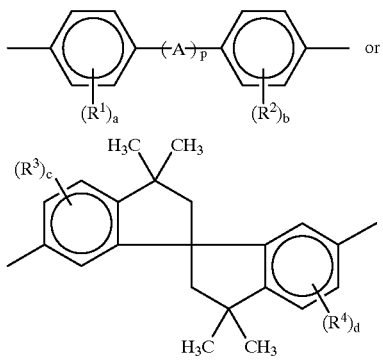

in which R$^1$, R$^2$, R$^3$ and R$^4$ each is an alkyl group which may have a substituent, an aryl group which may have a substituent or a halogen atom; a and b each is an integer of 0 to 4; c and d each is an integer of 0 to 3; and p is an integer of 0 or 1, and when p=1, A is a straight-chain alkylene group having 2 to 12 carbon atoms, —O—, —S—, —SO—, —SO$_2$—, —CO—,

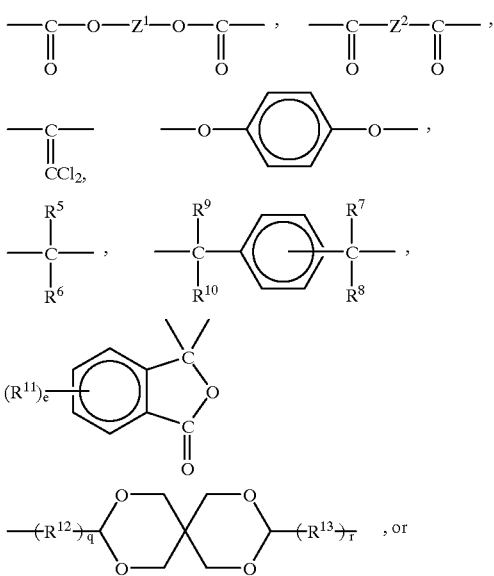

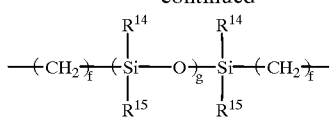

in which $Z^1$ and $Z^2$ each is a bivalent aliphatic group which may have substituent, or an arylene group which may have a substituent; $R^5$, $R^6$, $R^7$, $R^8$, $R^9$, $R^{10}$ and $R^{11}$ each is a hydrogen atom, a halogen atom, an alky group having 1 to 5 carbon atoms which may have a substituent, an alkoxyl group having 1 to 5 carbon atoms which may have a substituent, or an arly group which may have a substituent, and $R^5$ and $R^4$ may form a carbocyclic ring or heterocyclic ring having 5 to 12 carbon atoms, or $R^5$ and $R^6$ may form a carbocyclic ring or heterocyclic ring in combination with $R^1$ and $R^2$; q is an integer of 0 or 1, and when q=1, $R^{12}$ is an alkylene group having 1 to 4 carbon atoms; r is an integer of 0 or 1, and when r=1, $R^{13}$ is an alkylene group having 1 to 4 carbon atoms; $R^{14}$ and $R^{15}$ each is an alkyl group having 1 to 5 carbon atoms which may have a substituent or an aryl group which may have a substituent; e is an integer of 0 to 4; f is an integer of 0 to 20; and g is an integer of 0 to 2,000.

3. An aromatic polycarbonate resin comprising a repeat unit of formula (III)-1:

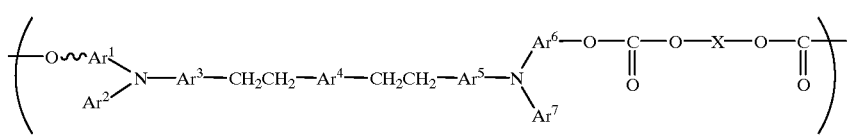

wherein n is an integer of 2 to 5,000; $Ar^1$, $Ar^3$, $Ar^4$, $Ar^5$ and $Ar^6$ each may be the same or different, and is an arylene group which may have a substituent; $Ar^2$ and $Ar^7$ each may be the same or different, and is an aryl group which may have a substituent; and X is a bivalent aliphatic group, a bivalent cyclic aliphatic group, a bivalent aromatic group, a bivalent group prepared by bonding any of said bivalent groups,

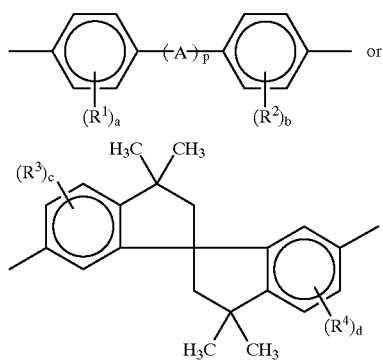

in which $R^1$, $R^2$, $R^3$ and $R^4$ each is an alkyl group which may have a substituent, an aryl group which may have a substituent or a halogen atom; a and b each is an integer of 0 to 4; c and d each is an integer of 0 to 3; and p is an integer of 0 or 1, and when p=1, A is a straight-chain alkylene group having 2 to 12 carbon atoms, —O—, —S—, —SO—, —SO$_2$—, —CO—,

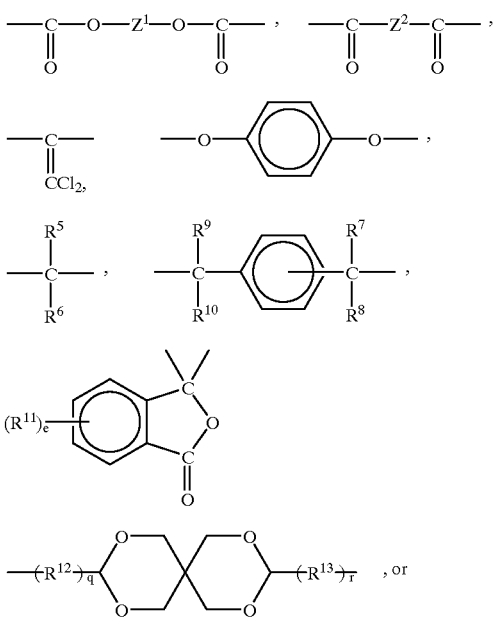

in which $Z^1$ and $Z^2$ each is a bivalent aliphatic group which may have a substituent, or an arylene group which may have a substituent; $R^5$, $R^6$, $R^7$, $R^8$, $R^9$, $R^{10}$ and $R^{11}$ each is a hydrogen atom, a halogen atom, an alkyl group having 1 to 5 carbon atoms which may have a substituent, an alkoxyl group having 1 to 5 carbon atoms which may have a substituent, or an aryl group which may have a substituent, and $R^5$ and $R^6$ may form a carbocyclic ring or heterocyclic ring having 5 to 12 carbon atoms, or $R^5$ and $R^6$ may form a carbocyclic ring or heterocyclic ring in combination with $R^1$ and $R^2$; q is an integer of 0 or 1, and when q=1, $R^{12}$ is an alkylene group having 1 to 4 carbon atoms; r is an integer of 0 or 1, and when r=1, $R^{13}$ is an alkylee group having 1 to 4 carbon atoms; $R^{14}$ and $R^{15}$ each is an alkyl group having 1 to 5 carbon atoms which may have a substituent or an aryl group which may have a substituent; e is an integer of 0 to 4; f is an integer of 0 to 20; and g is an integer of 0 to 2,000.

4. The aromatic polycarbonate resin as claimed in claim 1, wherein said arylene group represented by $Ar^1$, $Ar^3$, $Ar^5$ and $Ar^6$ is phenylene group.

5. The aromatic polycarbonate resin as claimed in claim 4, wherein said phenylene group represented by $Ar^3$ and $Ar^3$ is

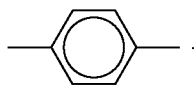

6. The aromatic polycarbonate resin as claimed in claim 1, wherein said aryl group represented by $Ar^2$ and $Ar^7$ is selected from the group consisting of phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidenephenyl group, 5H-dibenzo[a,d]cycloheptenylidenephenyl group, thienyl group, benzothienyl group, furyl group, benzofuranyl group, carbazolyl group, pyridinyl group, pyrrolidyl group, oxazolyl group, and a group represented by formula (IX):

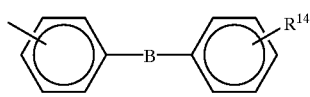 (IX)

wherein $R^{16}$ is a hydrogen atom, an alkyl group which may have a substituent, an alkoxyl group which may have a substituent, a halogen atom, an aryl group which may have a substituent, an amino group, nitro group or cyano group; and B is selected from the group consisting of —O—, —S—, —SO—, —SO$_2$—, —CO—, $-(CH_2)_h-$, and

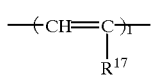

in which h is an integer of 1 to 12; i is an integer of 1 to 3; and $R^{17}$ is a hydrogen atom, an alkyl group which may have a substituent, or an aryl group which may have a substituent.

7. The aromatic polycarbonate resin as claimed in claim 1, wherein said substituent of said aryl group represented by $Ar^2$ and $Ar^7$ is selected from the group consisting of a halogen atom, cyano group, nitro group, an alkyl group having 1 to 5 carbon atoms which may have a substituent, an alkoxyl group having 1 to 5 carbon atoms which may have a substituent, and an amino group represented by formula (X):

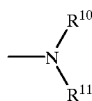 (X)

in which $R^{18}$ and $R^{19}$ each is an alkyl group which may have a substituent, or an aryl group which may have a substituent, and $R^{18}$ and $R^{19}$ may form a ring together or in combination with a carbon atom of the aryl group.

8. The aromatic polycarbonate resin as claimed in claim 2, wherein said arylene group represented by $Ar^1$, $Ar^3$, $Ar^5$ and $Ar^6$ is phenylene group.

9. The aromatic polycarbonate resin as claimed in claim 8, wherein said phenylene group represented by $Ar^3$ and $Ar^5$ is

10. The aromatic polycarbonate resin as claimed in claim 3, wherein said arylene group represented by $Ar^1$, $Ar^3$, $Ar^5$ and $Ar^6$ is phenylene group.

11. The aromatic polycarbonate resin as claimed in claim 10, wherein said phenylene group represented by $Ar^3$ and $Ar^5$ is

12. An aromatic polycarbonate resin comprising a structural unit of formula (I)-2:

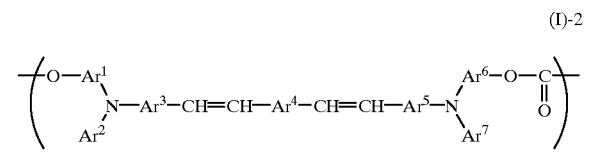 (I)-2 wherein $Ar^1$, $Ar^3$, $Ar^4$, $Ar^5$ and $Ar^6$ each may be the same or different, and is an arylene group which may have a substituent; and $Ar^2$ and $Ar^7$ each may be the same or different, and is an aryl group which may have a substituent.

13. An aromatic polycarbonate resin comprising a structural unit of formula (I)-2 and a structural unit of formula (II):

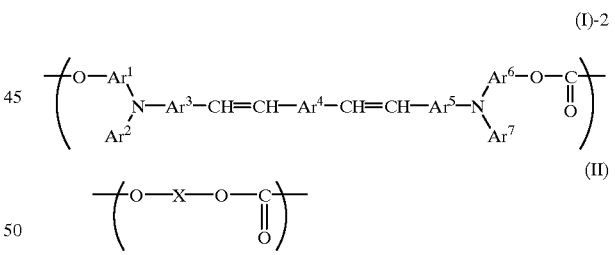

wherein $Ar^1$, $Ar^3$, $Ar^4$, $Ar^5$ and $Ar^6$ may be the same or different, and is an arylene group which may have a substituent; $Ar^2$ and $Ar^7$ each may be the same or different, and is an aryl group which may have a substituent; and X is a bivalent apliphatic group, a bivalent cyclic aliphatic group, a bivalent aromatic group, a bivalent group prepared by bonding any of said bivalent groups,

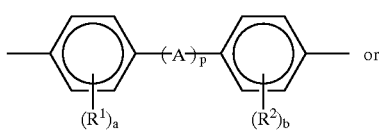 or

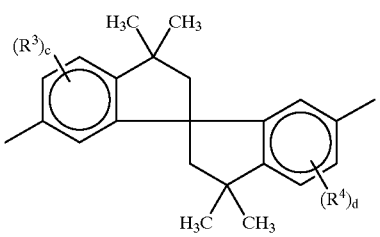

in which $R^1$, $R^2$, $R^3$ and $R^4$ each is an akyl group which may have a substituent, an aryl group which may have a substituent or a halogen atom; a and b each is an integer of 0 to 4; c and d each is an integer of 0 to 3; and p is an integer of 0 or 1, and when p=1, A is a straight-chain alkylene group having 2 to 12 carbon atoms, —O—, —S—, —SO—, —SO$_2$—, —CO—,

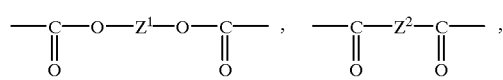

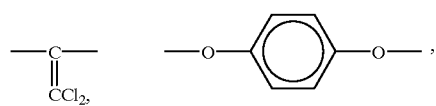

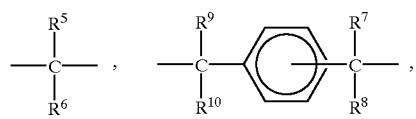

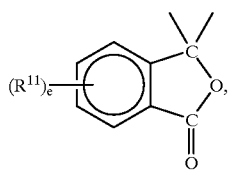

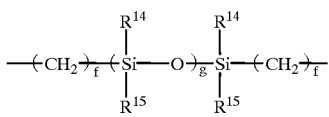

in which $Z^1$ and $Z^2$ each is a bivalent aliphatic group which may have a substituent, or an arylene group which may have a substituent; $R^5$, $R^6$, $R^7$, $R^8$, $R^9$, $R^{10}$ and $R^{11}$ each is a hydrogen atom, a halogen atom, an alkyl group having 1 to 5 carbon atoms which may have a substituent, an alkoxyl group having 1 to 5 carbon atoms which may have a substituent, or an aryl group which may have a substituent, and $R^5$ and $R^6$ may form a carbocyclic ring or heterocyclic ring having 5 to 12 carbon atoms, or $R^5$ and $R^6$ may form a carbocyclic ring or heterocyclic ring in combination with $R^1$ and $R^2$; q is an integer of 0 or 1, and when q=1, $R^{12}$ is an alkylene group having 1 to 4 carbon atoms; r is an integer of 0 or 1, and when r=1, $R^{13}$ is an alkylene group having 1 to 4 carbon atoms; $R^{14}$ and $R^{15}$ each is an alkyl group having 1 to 5 carbon atoms which may have a substituent or an aryl group which may have a substituent; e is an integer of 0 to 4; f is an integer of 0 to 20; and g is an integer of 0 to 2,000.

14. An aromatic polycarbonate resin comprising a repeat unit of formula (III)-2:

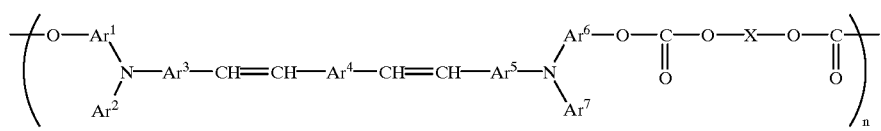

wherein n is an integer of 2 to 5,000; $Ar^1$, $Ar^3$, $Ar^4$, $Ar^5$ and $Ar^6$ each may be the same or different, and is an arylene group which may have a substituent; $Ar^2$ and $Ar^7$ each may be the same or different, and is an aryl group which may have a substituent; and X is a bivalent aliphatic group, a bivalent cyclic aliphatic group, a bivalent aromatic group, a bivalent group prepared by bonding any of said bivalent groups,

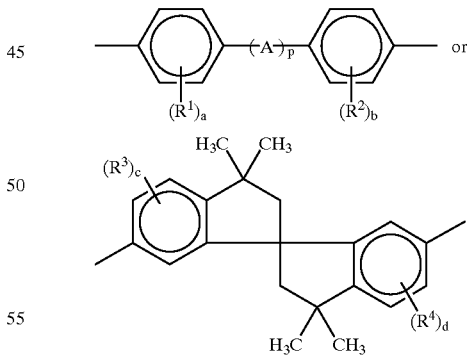

in which $R^1$, $R^2$, $R^3$ and $R^4$ each is an alkyl group which may have a substituent, an aryl group which may have a substituent or a halogen atom; a and b each is an integer of 0 to 4; c and d each is an integer of 0 to 3; and p is an integer of 0 or 1, and when p=1, A is a straight-chain alkylene group having 2 to 12 carbon atoms, —O—, —S—, —SO—, —SO$_2$—, —CO—,

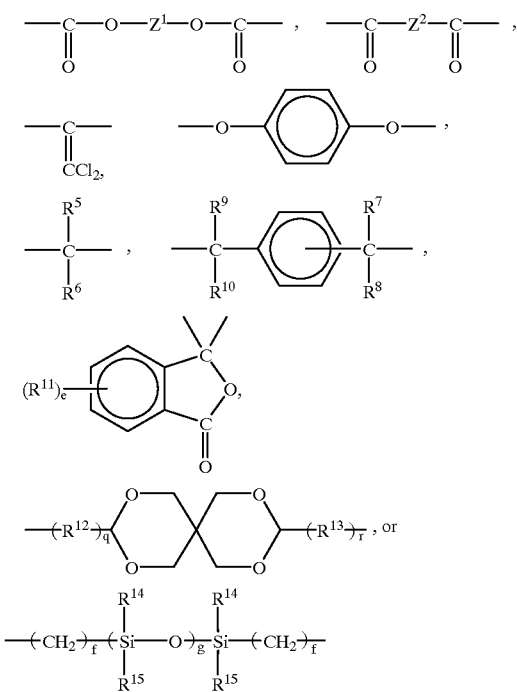

in which $Z^1$ and $Z^2$ each is a bivalent aliphatic group which may have a substituent, or an arylene group which may have a substituent; $R^5$, $R^6$, $R^7$, $R^8$, $R^9$, $R^{10}$ and $R^{11}$ each is a hydrogen atom, a halogen atom, an alkyl group having 1 to 5 carbon atoms which may have a substituent, an alkoxyl group having 1 to 5 carbon atoms which may have a substituent, or an aryl group which may have a substituent, and $R^3$ and $R^6$ may form a carbocyclic ring or heterocyclic ring having 5 to 12 carbon atoms, or $R^5$ and $R^6$ may form a carbocyclic ring or heterocyclic ring in combination with $R^1$ and $R^2$; q is an integer of 0 or 1, and when q=1, $R^{12}$ is an alkylene group having 1 to 4 carbon atoms; r is an integer of 0 or 1, and when r=1, $R^{13}$ is an alkylene group having 1 to 4 carbon atoms; $R^{14}$ and $R^{13}$ each is an alkyl group having 1 to 5 carbon atoms which may have a substituent or an aryl group which may have a substituent; e is an integer of 0 to 4; f is an integer of 0 to 20; and g is an integer of 0 to 2,000.

15. The aromatic polycarbonate resin as claimed in claim 12, wherein said arylene group represented by $Ar^1$, $Ar^3$, $Ar^5$ and $Ar^6$ is phenylene group.

16. The aromatic polycarbonate resin as claimed in claim 15, wherein said phenylene group represented by $Ar^3$ and $Ar^5$ is

17. The aromatic polycarbonate resin as claimed in claim 12, wherein said aryl group represented by $Ar^2$ and $Ar^7$ is selected from the group consisting of phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidenephenyl group, 5H-dibenzo[a,d]cycloheptenylidenephenyl group, thienyl group, benzothienyl group, furyl group, benzofuranyl group, carbazolyl group, pyridinyl group, pyrrolidyl group, oxazolyl group, and a group represented by formula (IX):

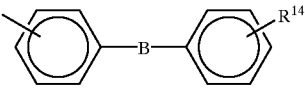

(IX)

wherein $R^{16}$ is a hydrogen atom, an alkyl group which may have a substituent, an alkoxyl group which may have a substituent, a halogen atom, an aryl group which may have a substituent, and amino group, nitro group or cyano group; and B is selected from the group consisting of —O—, —S—, —SO—, —SO$_2$—, —CO—, $-(CH_2)_h$, and

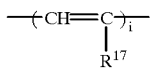

in which h is an integer of 1 to 12; i is an integer of 1 to 3; and $R^{17}$ is a hydrogen atom, an alkyl group which may have a substituent, or an aryl group which may have a substituent.

18. The aromatic polycarbonate resin as claimed in claim 12, wherein said substituent of said aryl group represented by $Ar^2$ and $Ar^7$ is selected from the group consisting of a halogen atom, cyano group, nitro group, an alkyl group having 1 to 5 carbon atoms which may have a substituent, an alkoxyl group having 1 to 5 carbon atoms which may have a substituent, and an amino group represented by formula (X):

(X)

$$-N\begin{matrix}R^{18}\\R^{19}\end{matrix}$$

in which $R^{18}$ and $R^{19}$ each is an alkyl group which may have a substituent, or an aryl group which may have a substituent, and $R^{18}$ and $R^{19}$ may form a ring together or in combination with a carbon atom of the aryl group.

19. The aromatic polycarbonate resin as claimed in claim 13, wherein said arylene group represented by $Ar^1$, $Ar^3$, $Ar^5$ and $Ar^6$ is phenylene group.

20. The aromatic polycarbonate resin as claimed in claim 19, wherein said phenylene group represented by $Ar^3$ and $Ar^5$ is

21. The aromatic polycarbonate resin as claimed in claim 14, wherein said arylene group represented by $Ar^1$, $Ar^3$, $Ar^5$ and $Ar^6$ is phenylene group.

22. The aromatic polycarbonate resin as claimed in claim 21, wherein said phenylene group represented by $Ar^3$ and $Ar^5$ is

* * * * *

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

Column 1,
Line 51, "traiarylamine structure" should read -- triarylamine structure --;
Line 65, "tetraarybenzidine" should read -- tetraarylbenzidine --.

Column 2,
Line 6, "Coventionally known" should read -- Conventionally known --.

Column 3,
Formulas, lines 23-26,

" 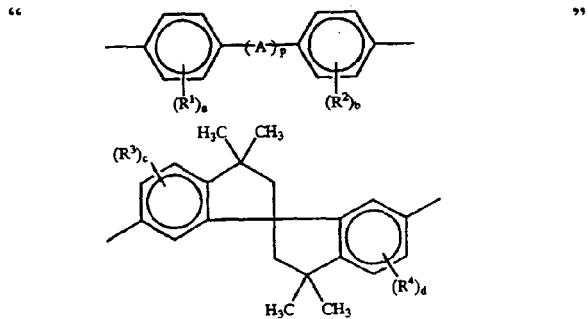 "

should read -- 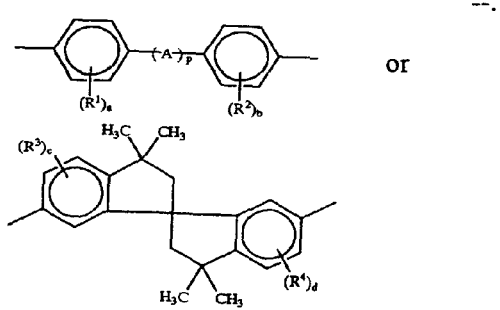 or --.

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

Column 4,
Formulas, lines 1-17,

"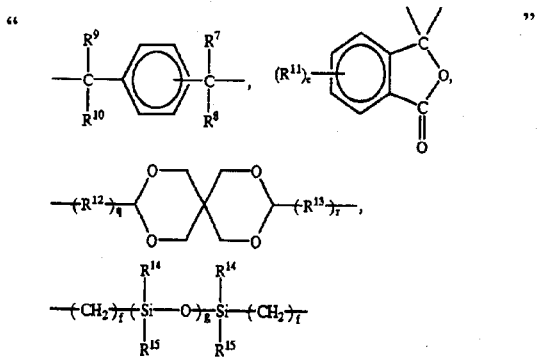"

should read --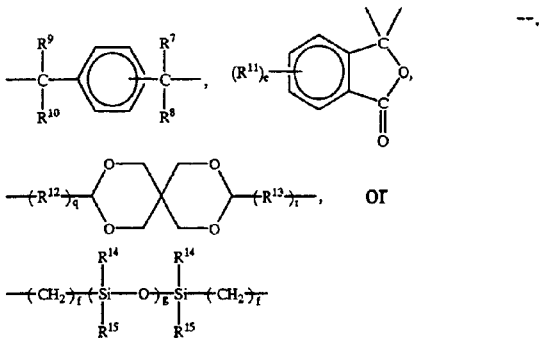--.

Line 36, "integar" should read -- integer --.

Column 9,
Line 45, "two-phased" should read -- two phases --.

Column 10,
Line 22, "N,N,N,',N'-tetramethyl-1,4-" should read -- N,N,N',N'-tetramethyl-1,4- --
Line 24, "N-ethylpiperidene," should read -- N-ethylpiperidine, --.

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

Columns 15 & 16,
Formula (5),
"
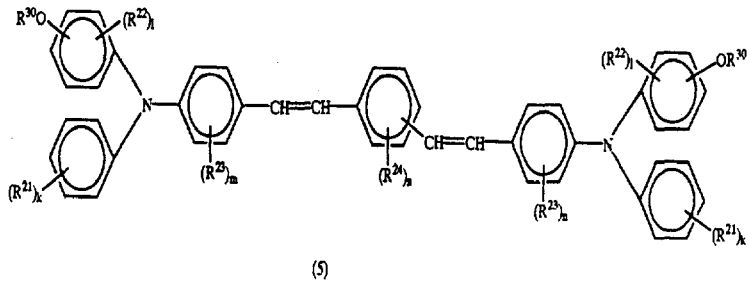
(5)
"

should read --

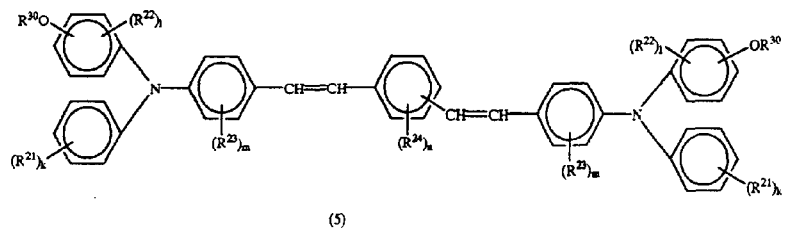
(5)
--.

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

Columns 15 & 16,
Formula (6),
"                                                                                              "

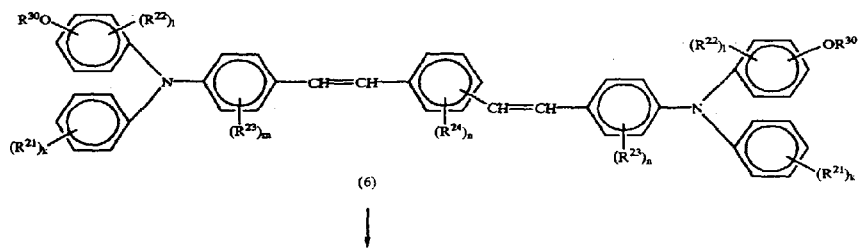

(6)

should read --                                                                            --.

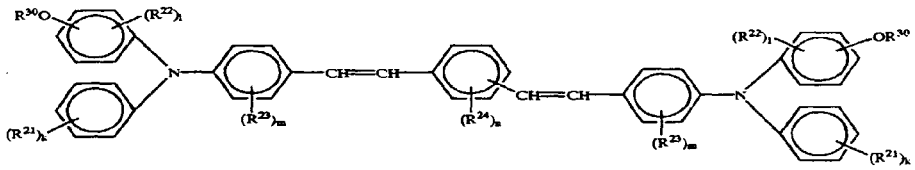

(5)

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

Columns 15 & 16,
Formula (1-a),

"
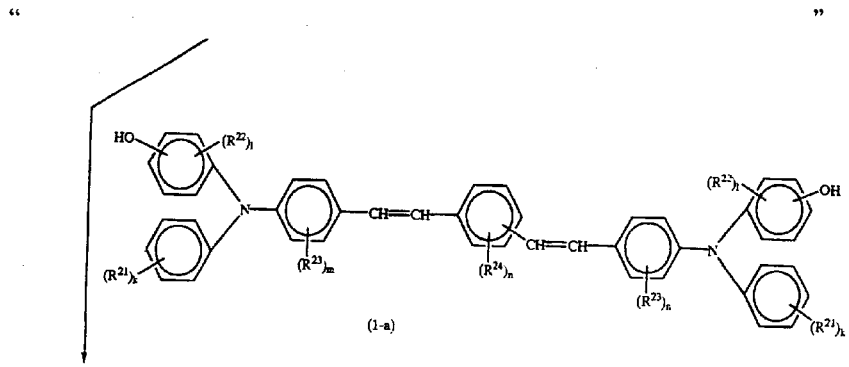
"

should read --
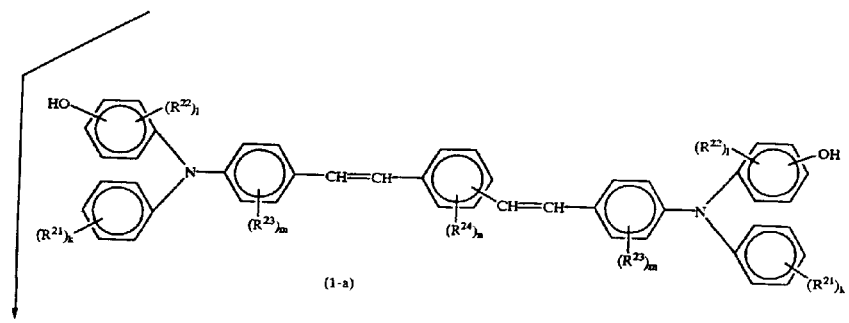
--.

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

Columns 17 & 18,
Formulas (6) and (1-b),

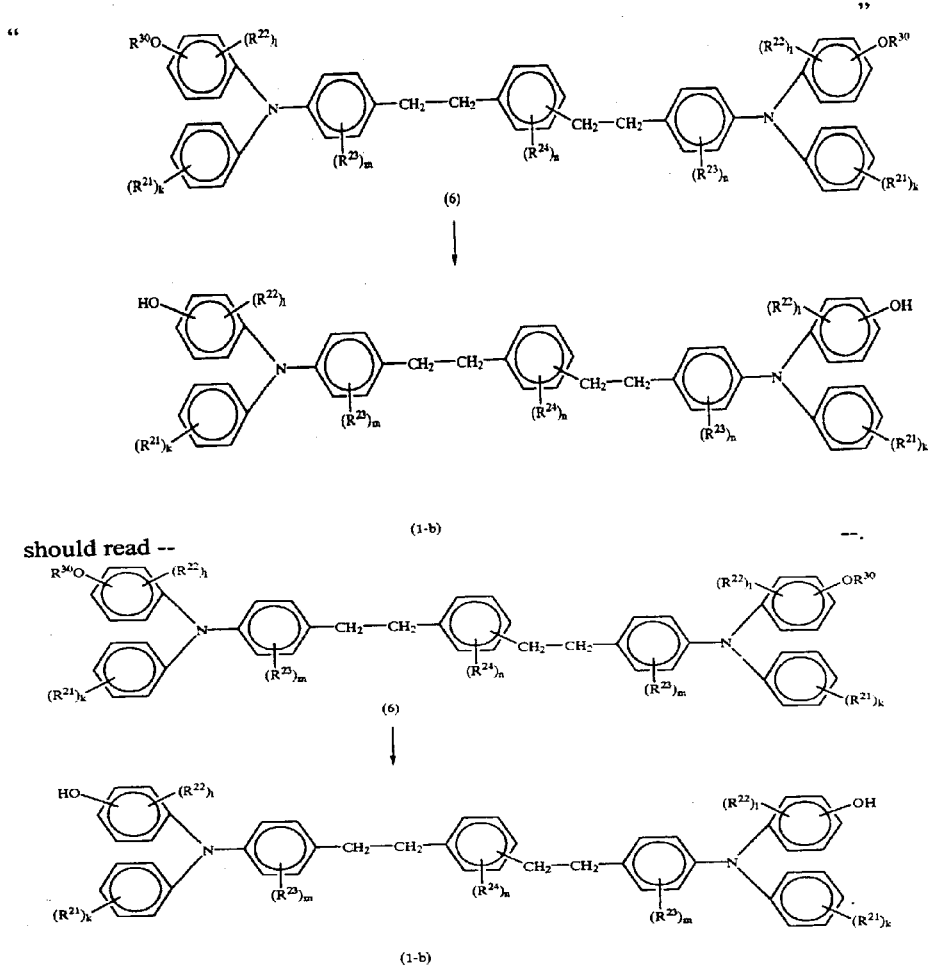

should read --

UNITED STATES PATENT AND TRADEMARK OFFICE
CERTIFICATE OF CORRECTION

PATENT NO.    : 6,316,577 B1
DATED         : November 13, 2001
INVENTOR(S)   : Tomoyuki Shimada et al.

It is certified that error appears in the above-identified patent and that said Letters Patent is hereby corrected as shown below:

Column 18,
Line 27, "In stead of" should read -- Instead of --.

Column 22,
Line 9, "2,2,-bis(4-hydroxyphenyl)hexane," should read -- 2,2-bis(4-hydroxyphenyl)nonane, --.

Column 25,
Line 41, "used in the" should read -- use in the --.

Column 27,
Line 1, "Application 58-58522), should read -- Application 58-58552), --.

Columns 39 & 40,
Compound No. 5

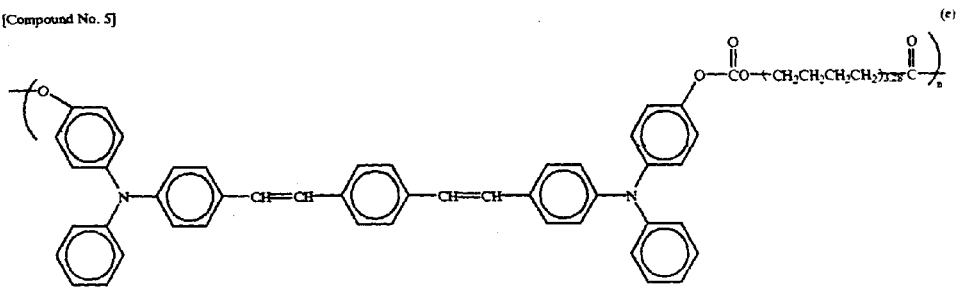

should read --

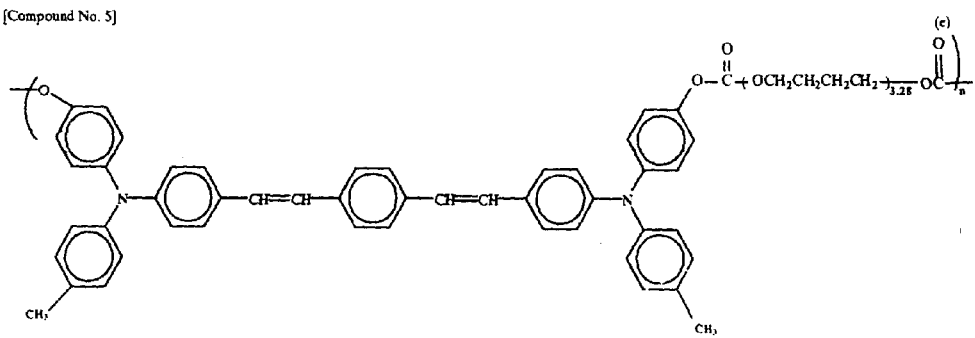

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

Columns 39 & 40,
Compound No. 6,

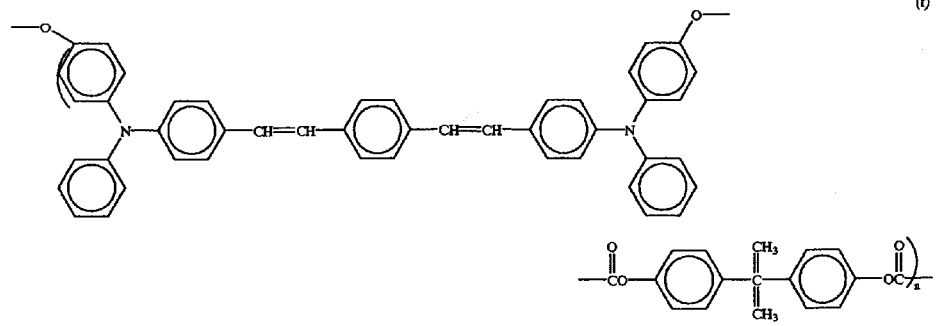

should read --

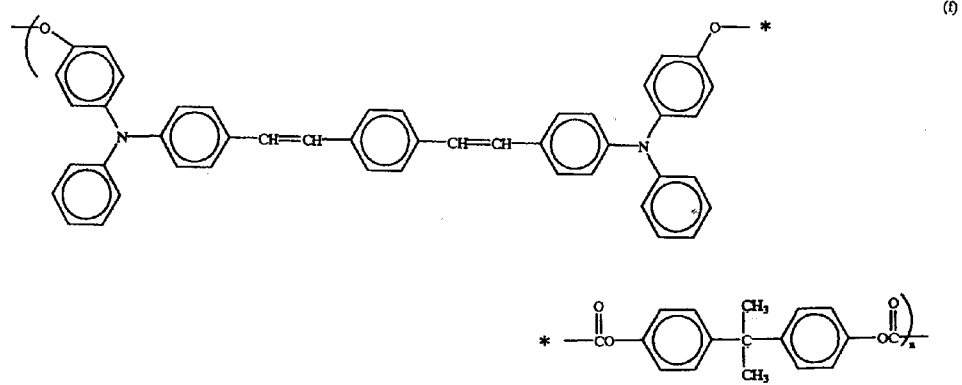

UNITED STATES PATENT AND TRADEMARK OFFICE
CERTIFICATE OF CORRECTION

PATENT NO.    : 6,316,577 B1
DATED         : November 13, 2001
INVENTOR(S)   : Tomoyuki Shimada et al.

It is certified that error appears in the above-identified patent and that said Letters Patent is hereby corrected as shown below:

Columns 39 & 40,
Compound No. 8,

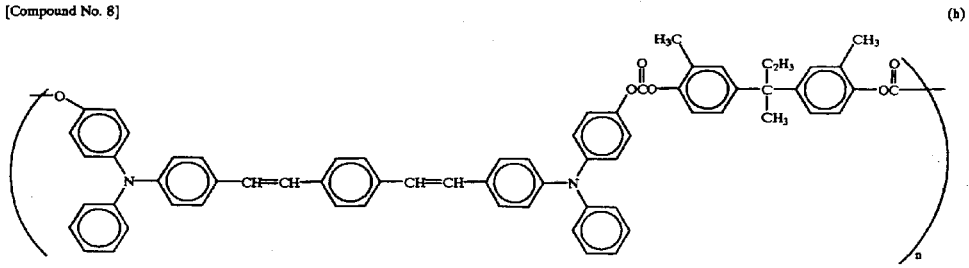

should read --

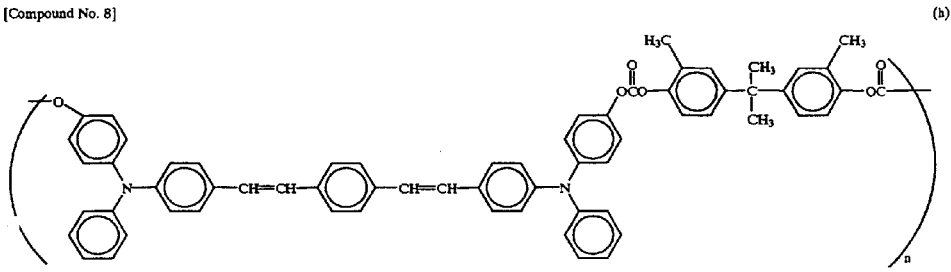

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

Column 49,
Line 43, "Model SP-438 " made" should read -- Model SP-428" made --.

Column 53,
Line 9, "have substituent," should read -- have a substituent, --;
Line 11, "alky group" should read -- alkyl group --;
Line 14, "an arly group" should read -- an aryl group --;
Line 15, "and $R^4$ may form" should read -- and $R^6$ may form --.

Columns 53 & 54,
Formula (III)-1,

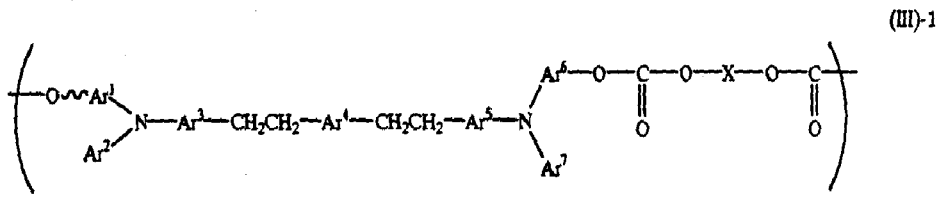

should read

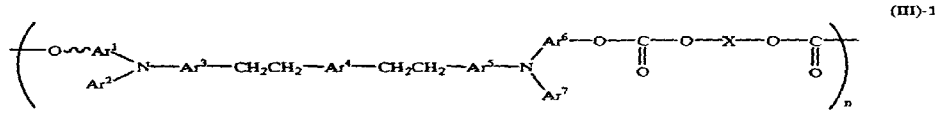

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

Column 54,
Line 66, "and $Ar^3$" should read -- and $Ar^5$ --.

Column 55,
Formula (IX),

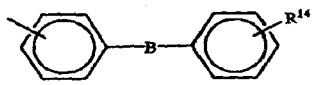
(IX)

should read

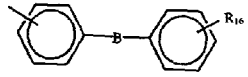
(IX)

Column 55,
Line 31, $$—S—,—SO—,—SO_2—,—CO—,-(CH_2)_n—$$

should read $$—S—,—SO—,—SO_2—,—CO—,-(CH_2)_h—$$

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

Column 55,
Formula at lines 33-35,

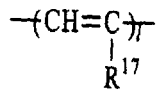

should read

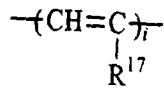

Column 55,
Formula (X)

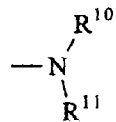

should read

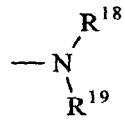

Column 56,
Line 54, "and $Ar^6$ may be" should read -- and $Ar^6$ each may be --;
Line 58, "bivalent apliphatic group," should read -- bivalent aliphatic group, --.

Column 57,
Line 15, "an akyl group" should read -- an alkyl group --.

UNITED STATES PATENT AND TRADEMARK OFFICE
CERTIFICATE OF CORRECTION

PATENT NO. : 6,316,577 B1
DATED : November 13, 2001
INVENTOR(S) : Tomoyuki Shimada et al.

It is certified that error appears in the above-identified patent and that said Letters Patent is hereby corrected as shown below:

<u>Column 59,</u>
Line 37, "and $R^3$ and $R^6$" should read -- and $R^5$ and $R^6$ --;
Line 43, "$R^{14}$ and $R^{13}$" each" should read -- $R^{14}$ and $R^{15}$ each --.

<u>Column 60,</u>
Formula (IX),
"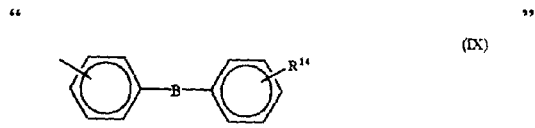"

should read
-- 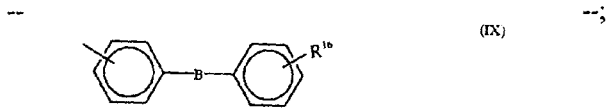 --;

Line 15, ""

should read
-- 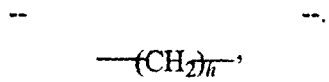 --.

Signed and Sealed this

Twenty-first Day of January, 2003

JAMES E. ROGAN
*Director of the United States Patent and Trademark Office*